United States Patent [19]

Harker et al.

[11] Patent Number: 5,177,684
[45] Date of Patent: Jan. 5, 1993

[54] METHOD FOR ANALYZING AND GENERATING OPTIMAL TRANSPORTATION SCHEDULES FOR VEHICLES SUCH AS TRAINS AND CONTROLLING THE MOVEMENT OF VEHICLES IN RESPONSE THERETO

[75] Inventors: Patrick T. Harker, Cherry Hill, N.J.; Dejan Jovanovic, Fort Worth, Tex.

[73] Assignee: The Trustees of the University of Pennsylvania, Philadelphia, Pa.

[21] Appl. No.: 629,417

[22] Filed: Dec. 18, 1990

[51] Int. Cl.$^5$ ................... G06F 15/48; B61L 27/00
[52] U.S. Cl. ........................ 364/436; 364/424.02; 364/461; 246/5
[58] Field of Search ............. 364/436, 424.01, 424.02, 364/426.05, 446, 468; 340/994; 246/2 R, 3, 5

[56] References Cited

U.S. PATENT DOCUMENTS

| | | | |
|---|---|---|---|
| 4,122,523 | 10/1978 | Morse et al. | 364/436 |
| 4,791,571 | 12/1988 | Takahashi et al. | 364/436 |
| 4,924,386 | 5/1990 | Freedman et al. | 364/402 |
| 4,926,343 | 5/1990 | Tsuruta et al. | 364/513 |
| 5,038,290 | 8/1991 | Minami | 364/436 |
| 5,093,794 | 3/1992 | Howie et al. | 364/468 |
| 5,101,340 | 3/1992 | Nanaka et al. | 395/650 |

OTHER PUBLICATIONS

"Tactical Scheduling of Rail Operations: The SCAN I System", Harker, P. T. and Jovanovic D., *The Wharton School—University of Pennsylvania*, Oct. 31 (1989).
"Rail Tactical Planning: Issues, Models and Tools", Crainic T., *Proceeding of the International Seminar on Freight Transportation Planning and Logistics*, Italy, (1987).
"Data Needs for the SCAN System", Harker, P. T. and Jovanovic D., and Hallowell, S. F., *The Wharton School—University of Pennsylvania*, (1988).
"The Use of ATCS in Scheduling and Operating Railroads: Models, Algorithms and Applications", Harker, P. T., *The Wharton School—University of Pennsylvania*, May, (1989).
"Computer Aided Train Dispatching Decision Support Through Optimization", Sauder, R. L. and Westerman, W. M., *Interfaces* 13, (Dec. 6, 1983).
"'Driver-Assist'—Microprocessor Technology to Aid in the Scheduling of Trains", Duncan, I. B., Winch, K. M. and Bundell, G. A.,*Computers In Railway Management*, (Dec. 31, 1987).
"Railroad Freight Train Scheduling: A Mathematical Programming Formulation", Morlok E. K. and Peterson, R. B., *The Transportation Ctr. & Technology Instit.*, Northwestern Univ., May, 1970.
"Optimal Train Scheduling on a Single Track Railway", Szpigel, B., *Operational Research '72*, Amsterdam, Dec. 31, 1973.
"A Goal-Directed Transportation Planning Model", Morlok, Edward K., *Transportation Research*, vol. 4, pp. 199–213, (Dec. 31, 1970).
"Models For Rail Transportation", Assad, A. A., *Transportation Research* 14B, pp. 101–114, (Dec. 31, 1980).

(List continued on next page.)

Primary Examiner—Thomas G. Black
Assistant Examiner—Thomas S. Auchterlonie
Attorney, Agent, or Firm—Woodcock Washburn Kurtz Mackiewicz & Norris

[57] ABSTRACT

A method of analyzing transportation schedules in a schedule analysis (SCAN) decision support system to determine the feasibility of the schedules is disclosed. In a transportation system, vehicles are delayed to avoid conflicts with other vehicles which would otherwise collide because the vehicles may be travelling along the same travel paths at different speeds or in opposite directions. The invention utilizes information relating to the vehicle travel paths, the vehicle's speed and mobility characteristics, a function based on the vehicle's on-time performance, proposed transportation schedules and real-time data associated with the travel paths and vehicles. This information is used to provide substantially optimal vehicle schedules with respect to cost resulting from vehicle delay.

16 Claims, 28 Drawing Sheets

OTHER PUBLICATIONS

"SCAN: A Decision Support System for Railroad Scheduling", Harker, P. T. and Jovanovic D., *Impact of Recent Computer Advances on Operations Research et al.*, Jan., 1989.

"A Comparison of Two Methods for Tactical Planning in Rail Freight Transportation", Crainic, T., *Operational Research '84*, New York, pp. 707-720, (Dec. 31, 1984).

"An Optimal Scheduling System for the Welland Canal", Taylor, A. J. and Petersen, E. R., *Transportation Science* 22.3, (Aug. 1988).

"Optimal Pacing of Trains in Freight Railroads: Model Formulation and Solution", Kraay, D., Chen, B., and Harker, P. T., *The Wharton School, Univ. of Pennsylvania*, Jun., (1986).

"ATCS: On time, on target", Welty, G., *Railway Age*, Jun., (1987).

"Revolution in Research Will Benefit Railroads and Shippers", Assoc. of American Railroads, *Office of Information and Public Affairs*, Washington, D.C., (Dec. 31, 1986).

"High Technology Rides the Rails", Assoc. of American Railroads, *Office of Information and Public Affairs*, Washington, D.C., (Dec. 31, 1985).

SEARCH TREE REPRESENTATION OF TRAVEL PATH HAVING 3 MEETPOINTS

NODES ENUMERATED USING BRANCH-AND-BOUND
METHOD OF IMPLICIT ENUMERATION ALGORITHM

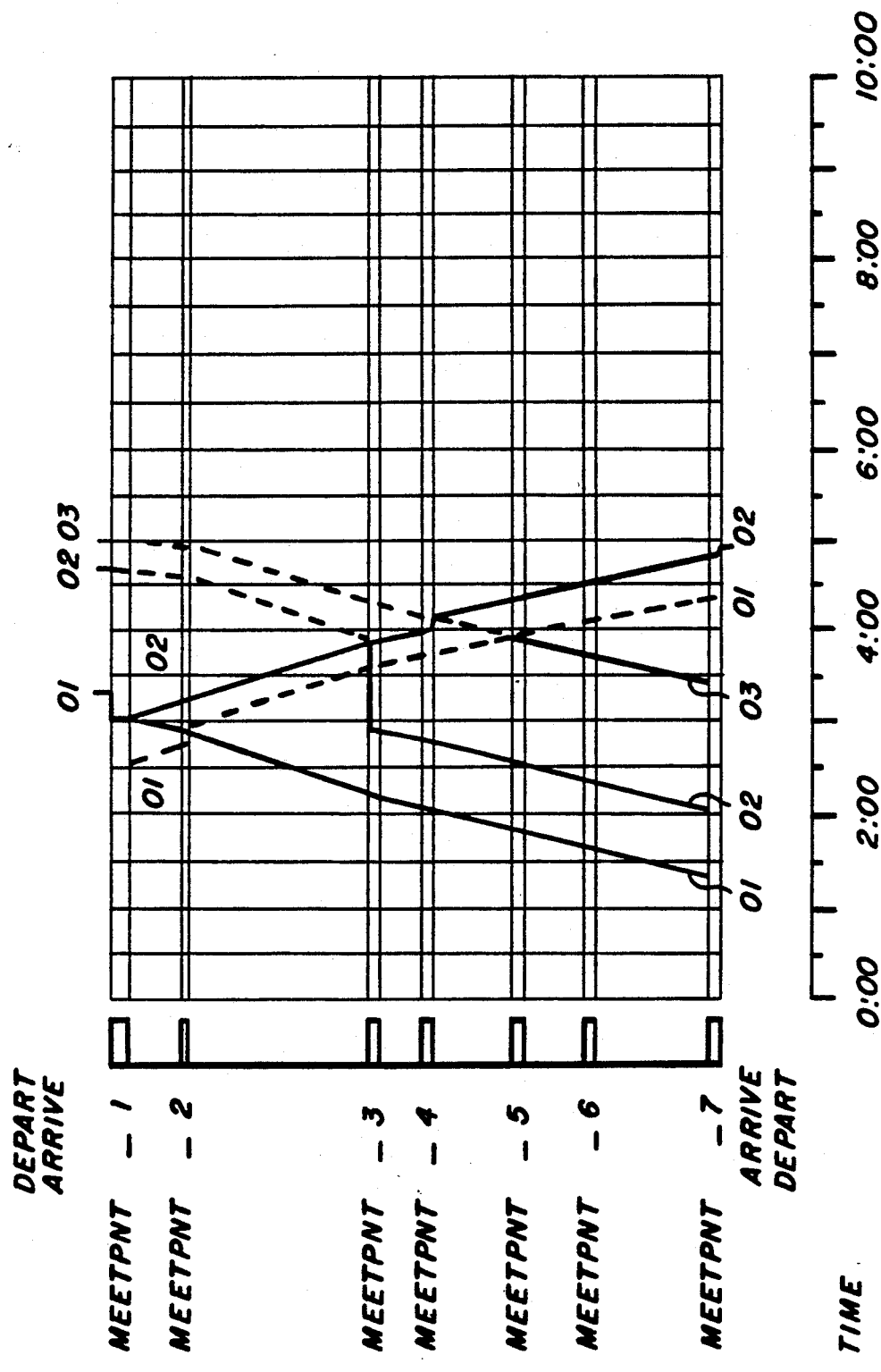
FIG. 8  TIME-DISTANCE DIAGRAM OF INITIAL FEASIBILITY PLAN

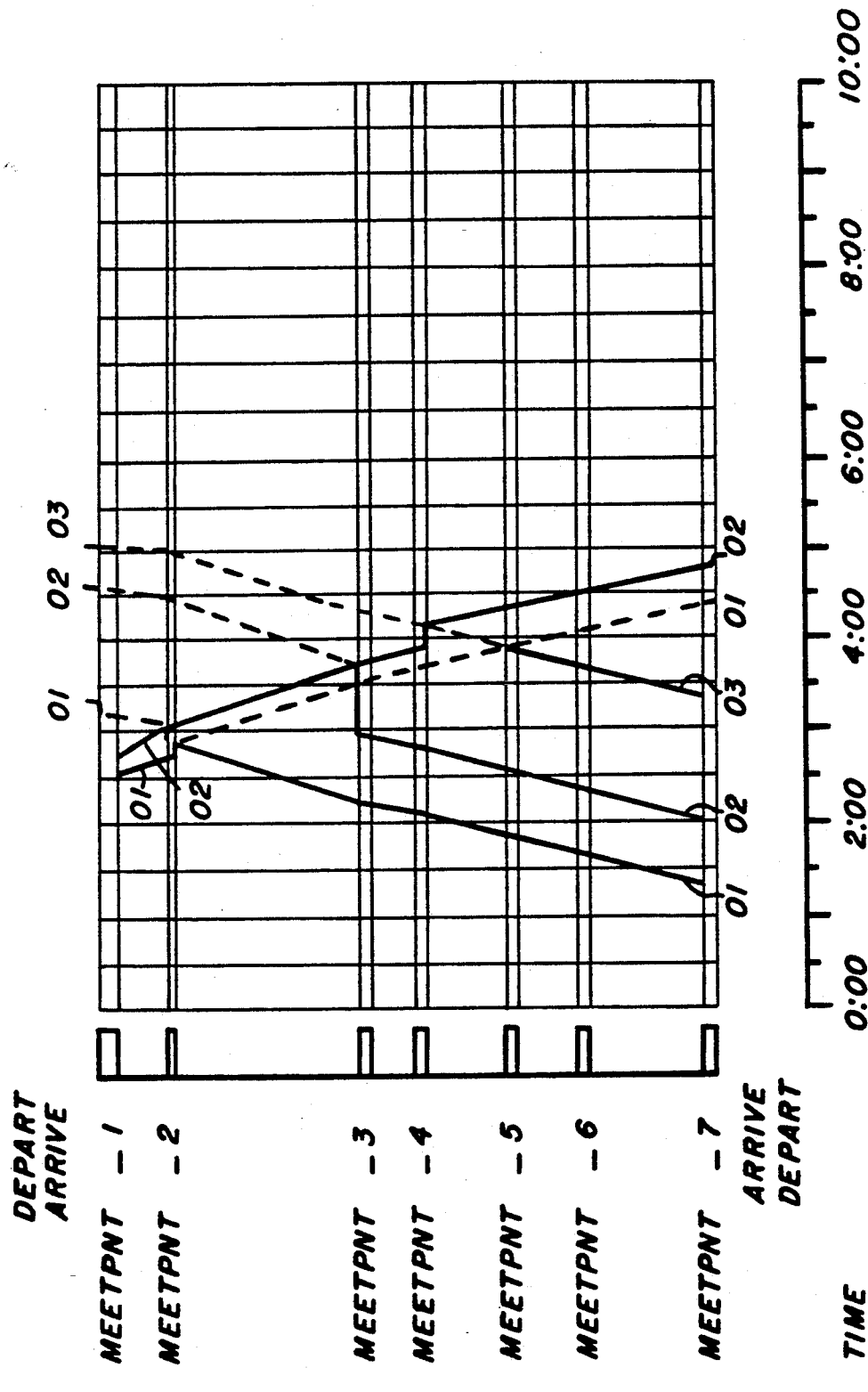

TIME-DISTANCE DIAGRAM OF OPTIMAL MEET-PASS PLAN USING ONE-MEET-SHIFT LOCAL IMPROVEMENT

TIME-DISTANCE DIAGRAM OF AN INITIAL MEET-PASS PLAN

NODES ENUMERATED USING THE BRANCH-AND-BOUND METHOD OF THE ACCELERATED HEURISTIC LOWER-BOUND BASED ALGORITHM

METHOD FOR ANALYZING AND GENERATING OPTIMAL TRANSPORTATION SCHEDULES FOR VEHICLES SUCH AS TRAINS AND CONTROLLING THE MOVEMENT OF VEHICLES IN RESPONSE THERETO

FIELD OF THE INVENTION

The invention relates to a method for analyzing schedule feasibility in a schedule analysis (SCAN) decision support system. In particular, the invention provides substantially optimal vehicle schedules with respect to costs resulting from vehicle delay.

BACKGROUND OF THE INVENTION

Increased traffic volumes, new technologies, and stronger competition have put pressure on railway companies to rethink their management strategies and operating practices to use the wealth of information and control capabilities provided by new systems and, in turn, to increase the level of service offered. In particular, the pressure to increase the reliability of shipments and the use of advanced technologies have forced North American railroads to adhere more closely to a scheduled mode of operation.

The overall medium term operating policies to be implemented by the operating personnel (e.g., train dispatchers, yardmasters, trainmasters) are determined at the tactical planning level, which includes train service design (schedule planning), traffic routing and assignment to trains, and track maintenance policy. The term 'tactical' is used herein in the sense defined by A. A. Assad, *Modelling of Rail Networks.* 14B Transportation Research, at 101-114 (1980) and T. Crainic, *Rail Tactical Planning: Issues, Models and Tools,* (Proceeding of the International Seminar on Freight Transportation Planning and Logistics, Bressanone, Italy, 1987) [hereinafter Crainic-Rail Tactical]. Design of train services or train scheduling at the tactical level consists of the determination of the train's itinerary (origin, destination, major intermediate points, and activity in each of those points), frequency (how many times per day, or per week, the service is offered), and timetable. A timetable provides arrival and departure times for each station (yard) in a train's itinerary.

The main issue involved in tactical train scheduling is a tradeoff between the train arrival/departure times which are driven by the market for transport service (marketing) and/or the need to achieve a fixed amount of work (maintenance, local switching, etc.) in a given period of time, and the reliability of actual schedule performance (i.e., on-time train arrivals) as influenced by the over-the-line and yard delays incurred by trains. Shorter transit times are more attractive to the customers and can result in better equipment utilization; however, these gains can be more than offset by the resulting higher frequency of late train arrivals and the deterioration of the reliability of the transportation service offered to the customer. One cannot overemphasize the importance of on-time shipment arrivals in today's transportation market, and the fact that the trains' schedule performance plays a vital role in the overall reliability of railroad services. See W. B. Allen, M. M. Mahmoud & D. McNeil, *The Importance of Time in Transit and Reliability of Transit Time for Shippers, Receivers, and Carriers,* 19B Transportation Research, at 447-456 (1985); J. Bouley, *Just in Time,* 2 Railway Gazette International, February 1987, at 93-95. In practice, train schedulers have almost no means (aside from their past experience) to predict the on-time performance of their new or revised schedules. The adjustments of timetables are usually myopic in nature and dictated by historic train performance; in other words, rather than setting goals, the tactical scheduling function simply reflects the actual train operating practices defined by the oftentimes uncoordinated actions of train and yard dispatchers and engineers.

No existing model of rail operations is appropriate to support the task of tactical rail scheduling as defined above. A large number of the models developed to support railroad operations, (see A. A. Assad, supra, 14B, at 101-114; A. A. Assad, *Models For Rail Transportation,* 14A Transportation Research, at 205-220 (1980); Crainic-Rail Tactical, supra) can be categorized as either goal or action-oriented, borrowing the classification given by E. K. Morlok, *A Goal-Directed Transportation Planning Model,* 4 Transportation Research, at 199-213 (1970). Representative of the goal-oriented models are optimization models which, in the context of rail operations, are either network oriented models. See T. Crainic, *A Comparison of Two Methods for Tactical Planning in Rail Freight Transportation,* at 707-720 (Operational Research '84: Proceedings of the 10th International Conference on Operational Research, Elsevier Publishing Co., New York (1984)), or focus on the real-time operations of a single railway line. While network optimization models are useful in determining yard and blocking policies and train routes, these models do not explicitly deal with schedules; instead they use train frequencies. A notable exception to this statement is work by Morlok and Peterson in E. K. Morlok & R. B. Peterson, *Railroad Freight Train Scheduling: A Mathematical Programming Formulation,* (The Transportation Center and the Technological Institute, Northwestern University, Evanston, Ill. 1970)) which assigns slots with explicitly stated departure and arrival times to freight trains using binary variables representing the decision whether a specific train is run in a given schedule slot; however, for any real-sized rail network this model is computationally infeasible.

In the real-time category, there are few operational models of optimal line operations (or train dispatching) to date. See R. L. Sauder & W. M. Westerman, *Computer Aided Train Dispatching: Decision Support Through Optimization,* 13 Interfaces, at 24-37 (1983); P. T. Harker, *The Use of Satellite Tracking in Scheduling and Operating Railroads: Models, Algorithms and Applications.* (Decision Sciences Department, The Wharton School of the University of Pennsylvania, Philadelphia, Pa., Working Paper 89-04-01, May, 1989). Even if many such real-time systems were available, the short-term scope of such a model would make it impractical for planning purposes. Another problem with the optimization models, both network and line-oriented, is that they are usually based on relatively rigid and simplified mathematical formulations of the problem; at present, it is a challenge just to understand and define all the details involved in the tactical train scheduling problem, let alone produce a detailed mathematical formulation of the problem.

Train dispatching is of crucial importance in the operation of a railroad network because dispatching decisions, through meeting and overtaking delays, greatly influences trains' transit times and on-time performance. According to one study, A. S. Lang & C. D. Martland,

*Reliability in Railroad Operations: Studies in Railroad Operations and Economics,* 8 MIT Report No. R, at 72-74 (Transportation Systems Division, M.I.T., Cambridge, Mass., 1972), 45% of the variance of train arrival times is due to the variance in over-the-line transit times. Unfortunately, dispatchers do not have at their disposal the information that shows system-wide effects of their decisions; their main incentives (besides safety) are to avoid delaying a 'hot' high priority train. As reported in Sauder & Westerman, supra. at 24-37, a common response of dispatchers was to clear the low-priority trains into a siding far in advance of incoming high-priority trains, thus minimizing the chance of delaying a 'hot' train while causing unnecessary delays to low priority trains. During periods of very dense traffic, this strategy can often backfire; delaying a cluster of low priority trains would soon create an area of congestion in which all trains would be delayed regardless of their priority.

Dispatchers monitor plant (track and trains) status on the visual displays that show train location and switch and signal setting. They can communicate via telephone with train crews, yard personnel, and maintenance-of-way (MOW-track maintenance) personnel. Besides safety and prevention of line-blockage, dispatchers are not given explicit objectives. When resolving train conflicts, dispatchers are guided by fixed train priorities, set by higher management, that remain the same irrespective of whether the train is late, early, or on-time. Once the dispatcher makes a decision of which train is routed onto a siding and which remains on the main track, the actual aligning of switches and clearing of signals is done automatically by specialized, commercially available hardware and software.

Due to a high workload and insufficient information concerning future traffic on their territory and neighboring dispatching territories, dispatchers are forced to cope with incoming traffic as it arrives with little ability to make planes, i.e., the function of a train dispatcher is, now, reactive rather than proactive. Another recent research effort aimed at the reduction of fuel consumption and the increase in the capacity of the railway line is described in I. B. Duncan, K. M. Winch & G. A. Bundell, *Driver-Assist-Microprocessor Technology to Aid in the Scheduling of Trains,* (T. K. S. Murthy, L. S. Lawrence & R. E. Rivier eds. 1987, Computer in Railway Management, Springer Verlag, Berlin, proceedings of COMPRAIL 87 Conference, Frankfurt, W. Germany) [hereinafter Duncan & Winch]. An implicit-enumeration optimal train dispatching algorithm developed in this project is only one module of a more comprehensive real-time system for control of line-haul railway operations.

Finally, there are reports of two proprietary computer-aided dispatching systems under development: the meet-pass planner developed by Rockwell International as a part of Advanced Railroad Electronics System (ARES) project that attempts to minimize a weighted linear combination of train delay, lateness, and fuel consumption, (See R. D. Burns & D. B. Turner, *Safety and Productivity Improvement of Railroad Operations by Advanced Train Control Systems,* (Proceedings of 1989 joint IEEE/ASME Railroad Conference, Philadelphia, Pa., April 1989)), and the Union Switch and Signal meet-pass planner that does not have an explicit objective function. See *CSX: Welcome to the 21st Century, Railway Age,* May, 1989.

The state-of-the-art in optimal train dispatching algorithms can handle only low traffic densities and a short time horizon within a reasonable amount of computational time. See B. Szpigel, *Optimal Train Scheduling on a Single Track Railway,* at 343-361 (M. Ross ed., Operational Research '72, North Holland, Amsterdam, 1973); Sauder & Westerman, supra, at 24-37; E. R. Petersen, A. J. Taylor & C. D. Montlanol, *An Introduction to Computer-Assisted Train Dispatching.* 20 Journal of Advanced Transportation, at 63-72 (1986). The only published applicable heuristic algorithm was not empirically tested and can only be used with a linear objective function. See E. R. Petersen & A. J. Taylor, *An Optimal Scheduling System for the Welland Canal,* 22.3 Transportation Science, at 173-185 (1988). It is interesting to note that almost all published formulations of the problem incorporate only one time variable per train (usually a departure time) and per track segment; such formulations could either lead to infeasible solutions (e.g., a train entering a side track that is still occupied by a preceding train) or to an overly restrictive model in which trains are not allowed to enter a single track segment before the preceding train leaves that segment, although, in the real-world, trains can often follow each other on much shorter headways which depend on the signalling system. See D. Kraay, P. T. Harker & B. Chen, *Optimal Pacing of Trains in Freight Railroads: Model Formulation and Solution,* (Decision Sciences Department, The Wharton School of the University of Pennsylvania, Philadelphia, Pa., Working Paper 88-03-03, June 1986); D. Jovanovic & P. T. Harker, *SCAN: A Decision Support System for Railroad Scheduling,* (Impact of Recent Computer Advances on Operations Research: Proceedings of the Conference of the Computer Science Technical Section of the Operations Research Society of America, Williamsburg, Va., January 1989); D. Jovanovic & P. T. Harker, *Tactical Scheduling of Rail Operations: The SCAN I Decision Support System,* (Decision Sciences Department, The Wharton School of the University of Pennsylvania, Philadelphia, Pa., May 1989), Duncan & Winch, supra; Burns & Turner, supra.; and, Railway Age, supra, May 1989.

There is, therefore, a need for a decision support system for tactical railroad scheduling that meets all of the needs discussed above that is relatively simple to use and is reliable. The present invention achieves these goals.

SUMMARY OF THE INVENTION

The present invention overcomes the problems in the prior art by providing a method for analyzing vehicle schedules in a real-world scenario for a transportation system within a time which is computationally practical when processed by a computer system. As is common, the transportation system comprises a plurality of vehicles which are scheduled by a departure time from an origin and an arrival time at a destination. Travel paths between the origin and destination form a routing network. Delay points along the travel paths provide locations for one vehicle to wait for another to pass by or overtake it so as to avoid a collision.

The method analyzing the vehicle schedules utilizes the following input information: a description of the routing network, speed and mobility characteristics of each vehicle; proposed transportation schedules for each vehicle specifying scheduled departure and arrival times; a vehicle tardiness function for each vehicle indicative of the importance of each vehicle arriving at its destination on time; any changes in the routing network; any changes in a physical characteristic of any path in the routing network; and the vehicle traffic status in the routing network. The method, based upon this information, determines whether the proposed transportation schedules may be met by the vehicles without the addition of any substantial cost due to delays of the vehicles at the delay points. Once this determination is made an output is provided indicating the feasibility of the proposed transportation schedules.

The method of analyzing the transportation schedules further comprises a method for determining a substantially optimal feasibility plan. A substantially optimal feasibility plan is a plan comprising the vehicle delays at specified locations which would result in the least cost due to vehicle delays. Based on the information input as listed above, alternative plans are analyzed to determine which is the most optimal of these plans.

BRIEF DESCRIPTION OF THE DRAWINGS

The present invention will be better understood, and its numerous objects and advantages will become apparent by reference to the following detailed description of the invention when taken in conjunction with the following drawings, in which

FIG. 8 illustrates graphical output for an initial feasibility plan provided in accordance with the invention.

FIG. 9 illustrates graphical output for an optimal feasibility plan provided in accordance with the invention.

DETAILED DESCRIPTION OF THE PREFERRED EMBODIMENT

I. The Schedule Analysis (SCAN) Decision Support System

Figure 1:
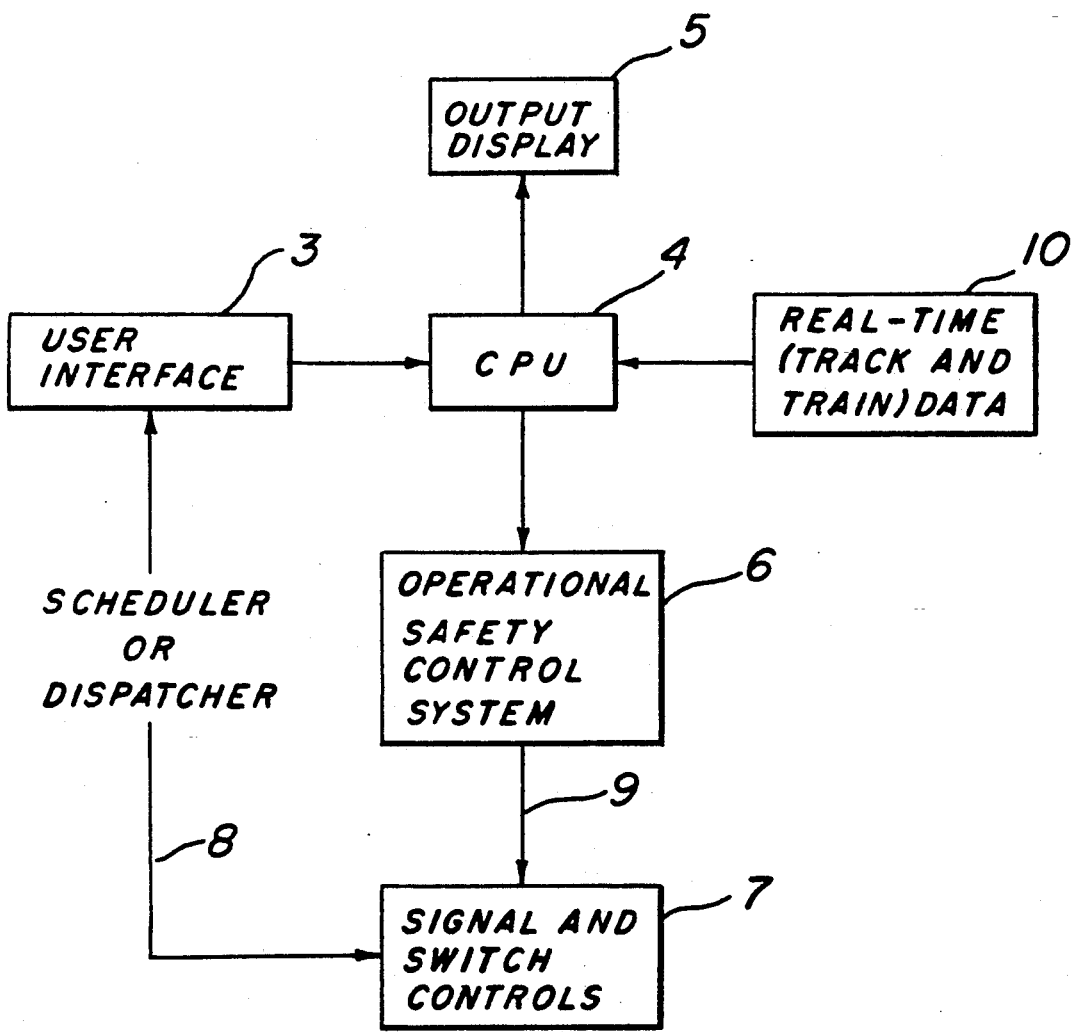
FIG. 1 is a block diagram of a schedule analysis (SCAN) decision support system according to the present invention.

Shown in FIG. 1 is a block diagram of the SCAN decision support system which can be used, for instance, by either a scheduler in creating schedules or by a dispatcher in dispatching trains to meet these schedules. For illustrative purposes, the SCAN decision support system will be described in its analysis of train schedules although, the system may generally be used to analyze schedules of any transportation system. In the drawings, like numerals represent like elements.

A preferred embodiment of the SCAN system is implemented within the Apollo Domain Workstation (manufactured by Apollo Computer Corporation, Massachusetts) environment using a Motorola 68030 shown as CPU 4. The SCAN user interface 3 is both mouse-controlled and menu driven with some elements of graphics-oriented direct manipulation. The output is presented on a display 5 as time-distance diagrams representing the movement of the trains. SCAN uses two types of diagrams: a schedule diagram in which the scheduled (desired) train departure and arrival times at the reporting stations are connected by a straight line, and the meet-pass plan diagrams which represent one possible realization of the proposed set of schedules or show why it is not possible to achieve the given schedules. The operational safety control system 6 evaluates the schedules to assure safety, and other regulatory guidelines are complied with by the schedules when the SCAN Decision Support System is used by a dispatcher. The controls 7 may be set manually 8 or automatically 9 to effectuate the dispatching plan. CPU 4 runs the algorithms which determine the feasibility of the schedules.

Figure 2:
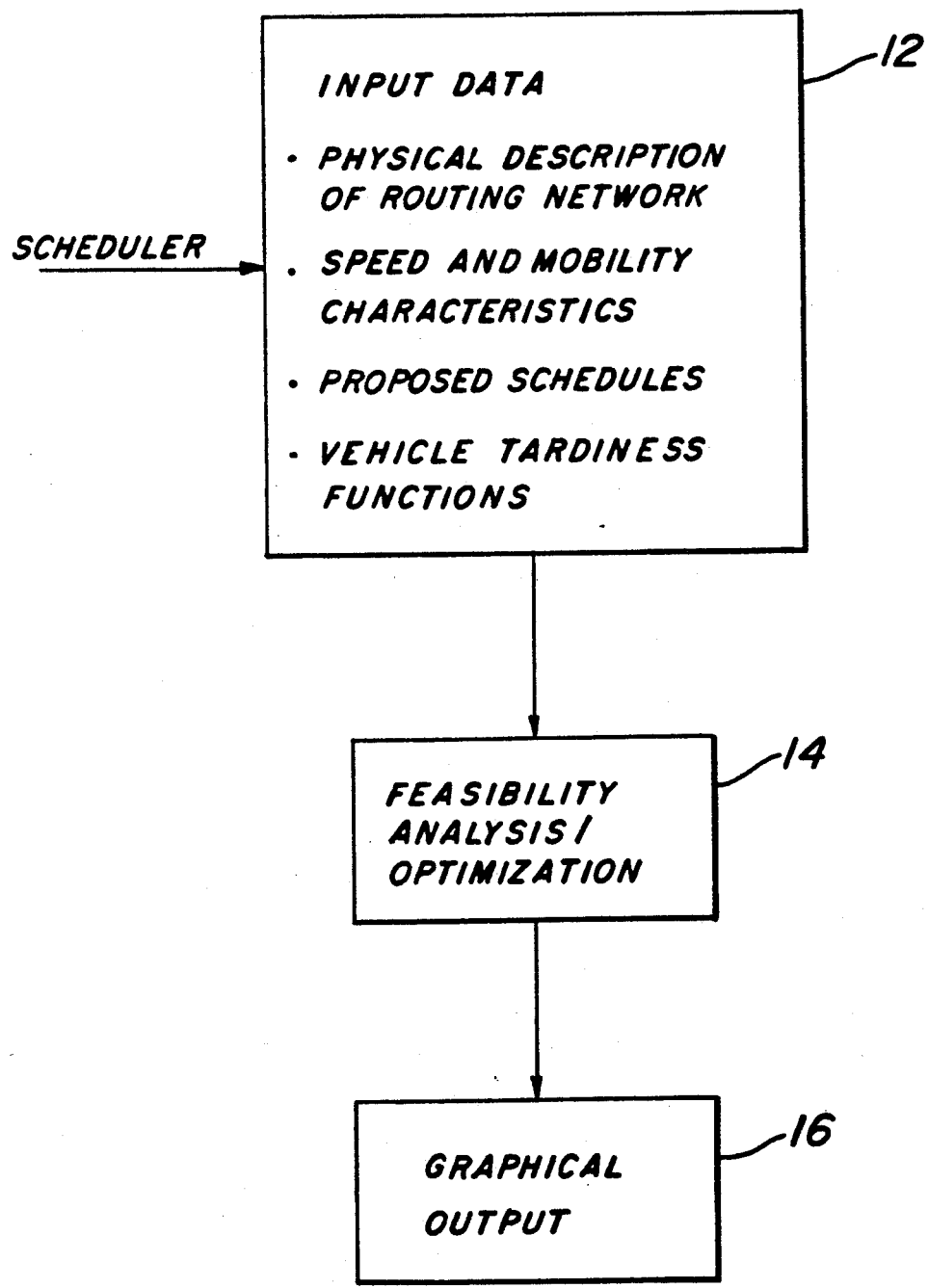
FIG. 2 is a data flow diagram of the decision support system according to the invention.

FIG. 2 is a data flow diagram of the SCAN decision support system. The feasibility analysis 14 may be performed by algorithms which may be coded in any suitable programming language such as Pascal, although, any portable and structured language that allows for dynamic memory allocation and recursive routines, such as C, Ada, or PROLOG can be used. Pascal is preferred because of its readability and built-in data structures for mathematical sets. Mostly integer arithmetic, logical and set operations need to be used in the code.

The input data 12 required by the model for scheduling can be classified into three basic categories: track description, train travel times, and proposed train schedules. The track description for a given traffic lane lists all points where trains can meet or pass (i.e., overtake) each other; such points are side tracks, yards, points, at the ends of double-track sections and crossovers these points may interchangeably be referred to as meetpoints or delay points. In addition, any points where trains can leave or enter the line, make a scheduled stop or change their crews, such as junctions and stations, should be included as potential meetpoints.

The feasibility analysis is based on a "super-rational" dispatcher. The SCAN decision support system can be thought of as answering the following question: given a "super-rational" dispatcher, would he or she be able to operate the given schedules, and if not, what is the set of feasible schedules closest to the given set?

Figure 3:
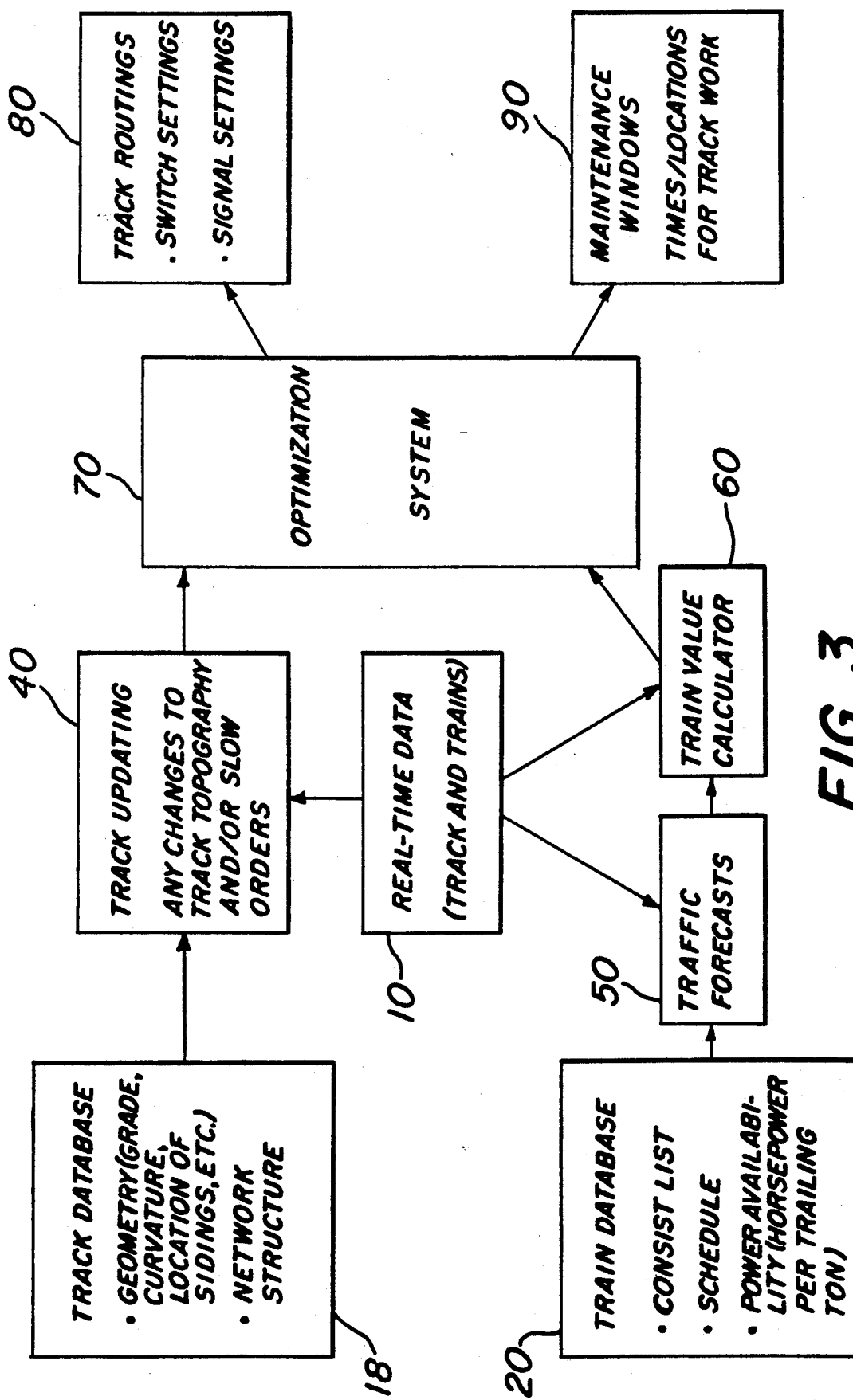
FIG. 3 is a data flow diagram for a computer-aided dispatching algorithm according to the invention.

II. Detailed Description of Optimal Minimum Vehicle Tardiness Cost Algorithms Referring to FIG. 3, a data flow diagram for an optimal computer-aided dispatching (CAD) process is shown. The track database 18 and the train database 20 are combined with real time track and train information 10, respectively. The real time data 10 may include information on the status of each train on the line, the various management priorities which are used to determine which trains are the most important, and a model to compute the economic value of time associated with each train defined as the train's tardiness cost function. The CAD processor which is implemented on the CPU 4 then provides traffic forecasts 50, train value calculations 60 and a track update 40 to the dispatcher. The optimization system 70 comprises algorithms to provide the dispatcher with a substantially optimal solution in terms of cost for dispatching trains from various locations on the line and for assigning track maintenance time windows to sections of the track requiring maintenance. These functions are shown in FIG. 3 as train routing 80 and maintenance time windows 90.

The description of the present invention will be enhanced by reference to the example provided in Table 1 appearing at the end of this specification. This example uses two outbound trains and three inbound trains which must travel along the same single-track line. There are seven points called meetpoints in this example, which are defined as points along the track where side tracks (sidings) are available for a train to wait for another to pass by and thereby accomplish a meet. As indicated in Table 1, each train has a predetermined schedule for departure and arrival, with a fixed amount of slack time, the difference between the scheduled and minimum travel time. The outbound trains depart from meetpoint 1 while the inbound trains depart from meetpoint 7. The minimum travel time between meetpoints and the train's tardiness cost functions are also provided in Table 1.

Figure 4:
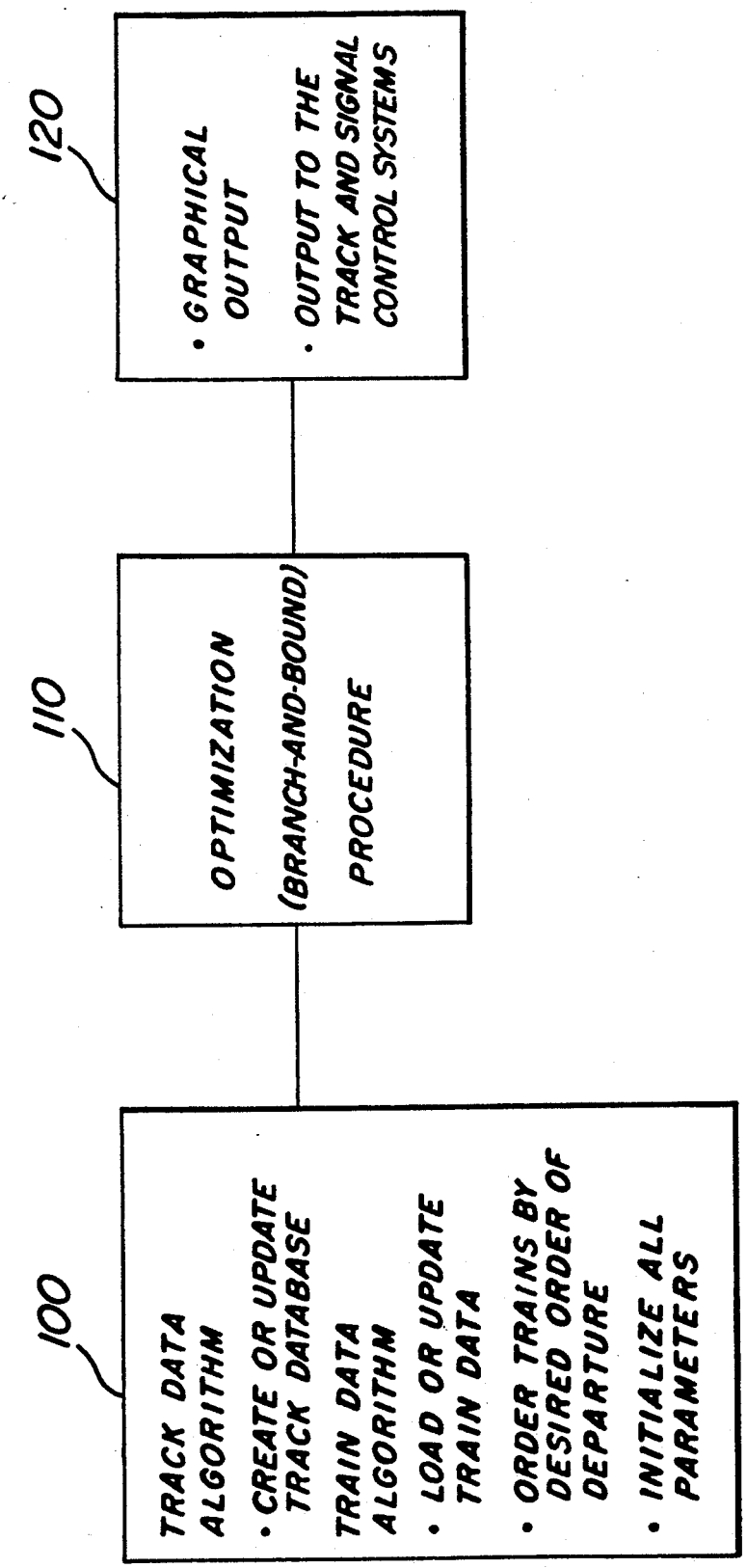
FIG. 4 is a block diagram of a software structure employed in the computer-aided dispatching algorithm according to the invention.

The basic software structure is shown in FIG. 4. Prior to optimization 110, track and train data are updated by real-time data using the track and train algorithms 100 as described herein above. Optimization algorithm 110 provides the dispatcher with a substantially optimal dispatching and maintenance schedule. The results of the optimization algorithm 110 are output as graphical output 120 to the dispatcher enabling the dispatcher to set track signals and switches 120 accordingly.

A. Implicit Enumeration Algorithm

Figure 5:
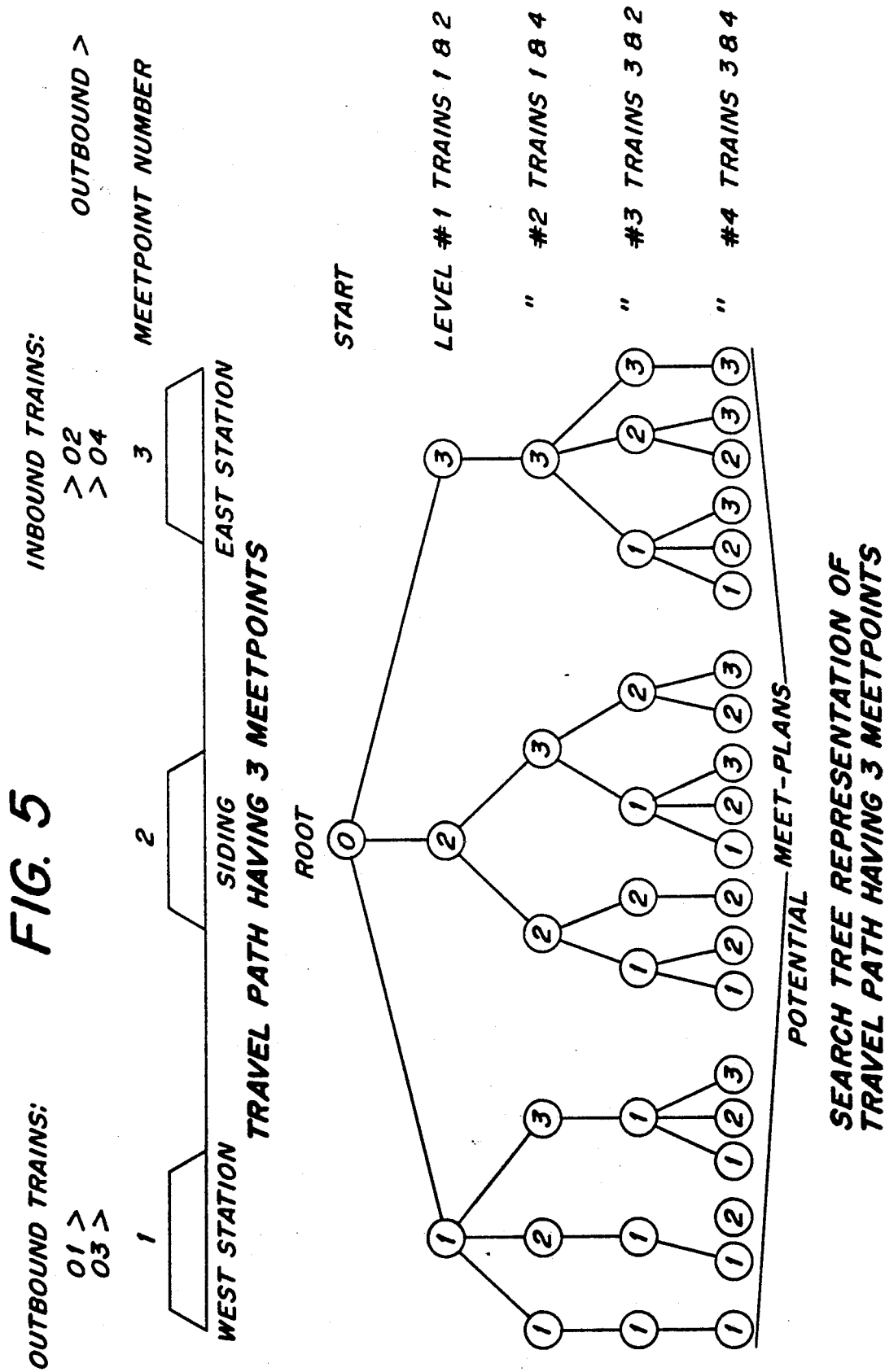
FIG. 5 is an example of a search tree employed in connection with the present invention.
Figure 6:
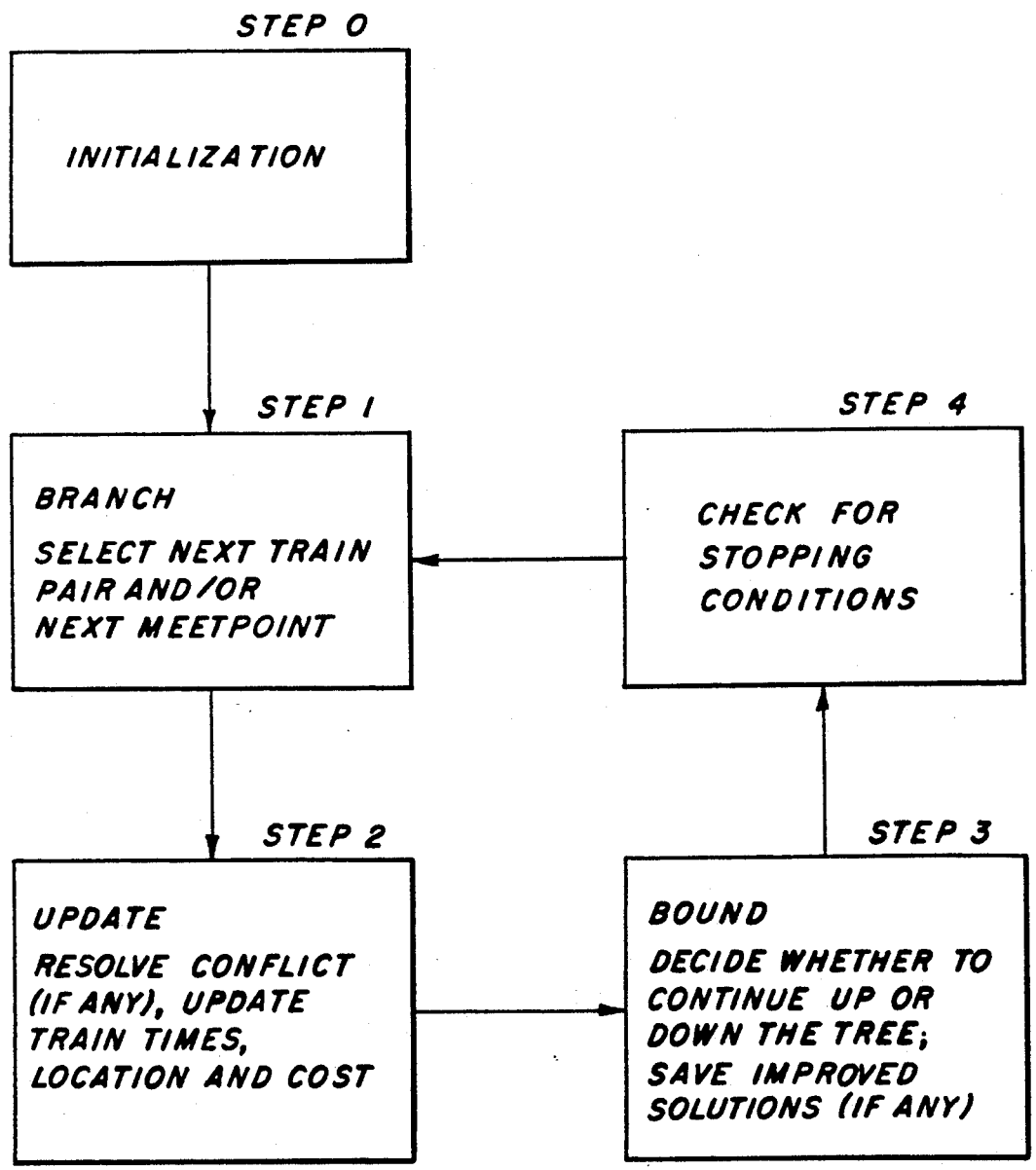
FIG. 6 is a generalized functional flow-diagram of a basic implicit enumeration algorithm according to the invention.

This algorithm is conceptually based on the branch-and-bound algorithm widely used in integer optimization but is specialized for the minimum train tardiness problem and in specifics it differs extensively from the standard branch-and-bound algorithm. The algorithm is based on the depth-first search of a branch-and-bound or a search tree. This search tree could be imagined as an inverted tree-like structure with the root (start of the search) at the top and branches developing downward. Nodes are the points where additional branches diverge. A vertex is a branch connecting two and only two nodes. A path in the search tree is a directed sequence of nodes and nonintersecting connecting vertices that starts at the root node. The level of the tree at which a particular node is in is measured in the downward direction and represents the number of nodes in the path leading to that node, inclusive of that node. An example of a search tree is presented in FIG. 5. In FIG. 5, numbers in the nodes represent the number of the meetpoint that can be potentially used to resolve the train meet at that level. A basic flowchart of the algorithm is presented in FIG. 6. Steps in this flowchart correspond to the steps in the pseudocode listing in Appendix A.

Each branch from a node in the tree represents a choice among feasible (zero, one, two or more) conflict resolution points (meetpoints) for the potential conflict of a train pair being considered at the level below the node. It is possible that the trains in the selected pair are not in conflict; i.e., they do not occupy the same line segment at the same time—they are separated in space and time, safety margins included. At some levels there may be only one feasible conflict resolution point, either because of trains' current position, the other points are already occupied or do not provide adequate capacity. In such case there is only one vertex or branch leading from the node at the level above, indicating a single possible meetpoint choice.

After branching, the conflict (if any) between the selected train pair is resolved and various train parameters such as location, remaining slack, arrival/departure times are updated, along with additional tardiness and tardiness cost (if any).

After the current state of the algorithm parameters has been updated a bounding step determines whether to continue the search for a better solution down the search tree or to stop the search down the current path and retrace up in search of promising new branches. This is the critical step of the algorithm.

Finally, conditions for the algorithm termination are checked for, before continuing the search.

The special structure of the problem allows for almost exclusive use of integer arithmetic in this algorithm, which is much more computationally efficient than the floating point arithmetic.

The algorithm is designed to provide a depth-first search with heuristic branching rules, so that a good initial feasible solution and an upper bound can be found quickly.

1. Example of the Implicit Enumeration Algorithm

The workings of the enumeration algorithm are best illustrated on a small, 5-train, 6-meet example. Except as noted, in this example, references to step numbers are to the flowchart of FIGS. 10A through 10C. The data for this small example are summarized in Table 1, appended hereto. For the sake of simplicity, there are only two scheduled points for each train; MeetPoint_1 and MeetPoint_7, with Outbound trains originated at MeetPoint$_{i}$31 and Inbound trains at MeetPoint_7. Also there are no scheduled overtakes in this example; i.e., all trains retain the same ordering, indicated by the index i or j, from the origin to the destination. The trains have been ordered in the initialization step 110 in FIG. 10A.

Figure 7:
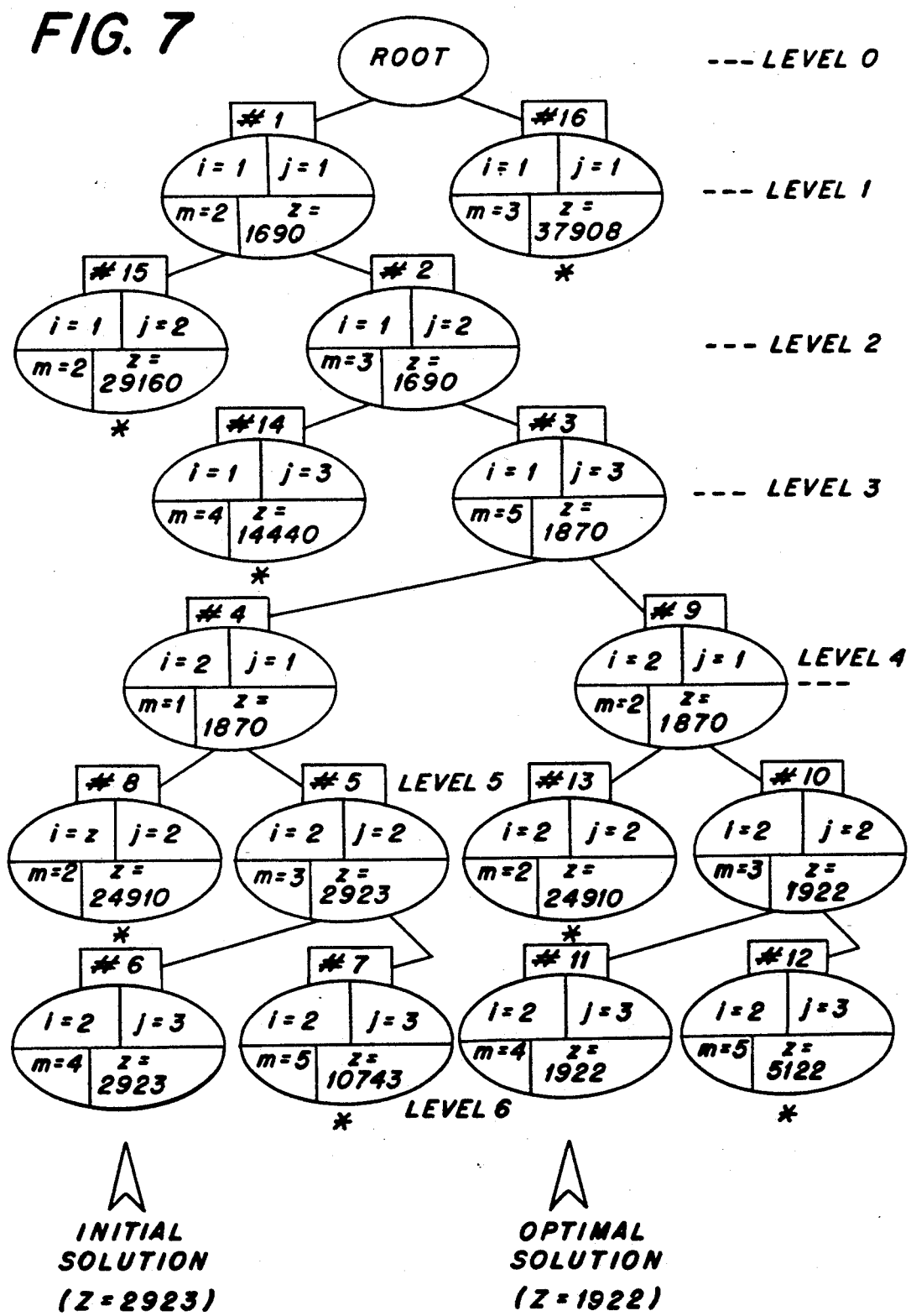
FIG. 7 illustrates node branches employed by the basic implicit numeration algorithm according to the invention.

The complete search tree for the 5-train, 6-meet example using the enumeration algorithm is presented in FIG. 7. In FIG. 7, numbers after the "#" sign represent the order in which the nodes were enumerated. Each level in the tree corresponds to the meet of a particular train pair; hence, there are 6 levels in this example.

Figure 10A:
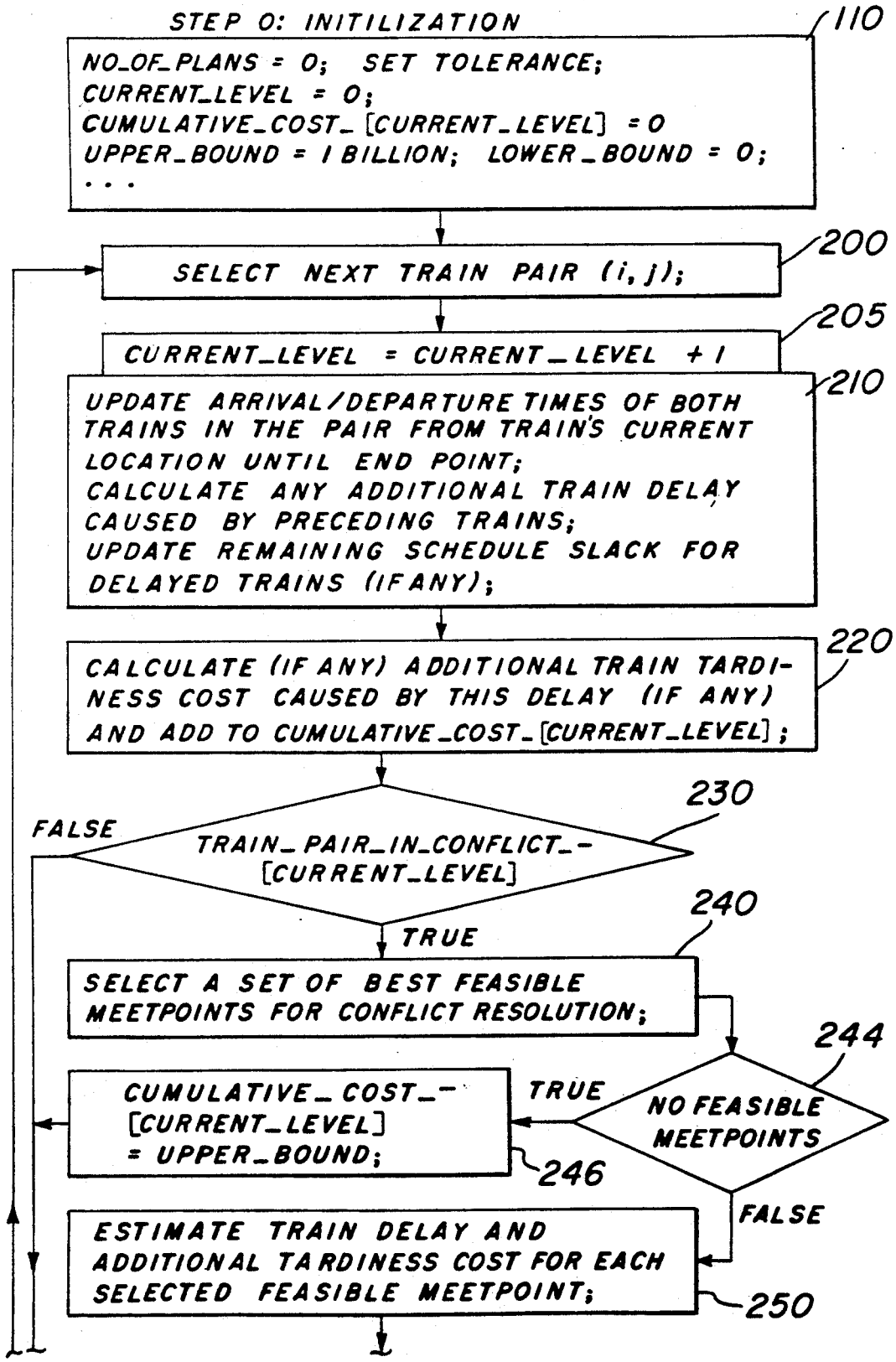
FIGS. 10A through 10C are a more detailed functional flow diagram of the basic implicit enumeration algorithm of the present invention.
Figure 10B:
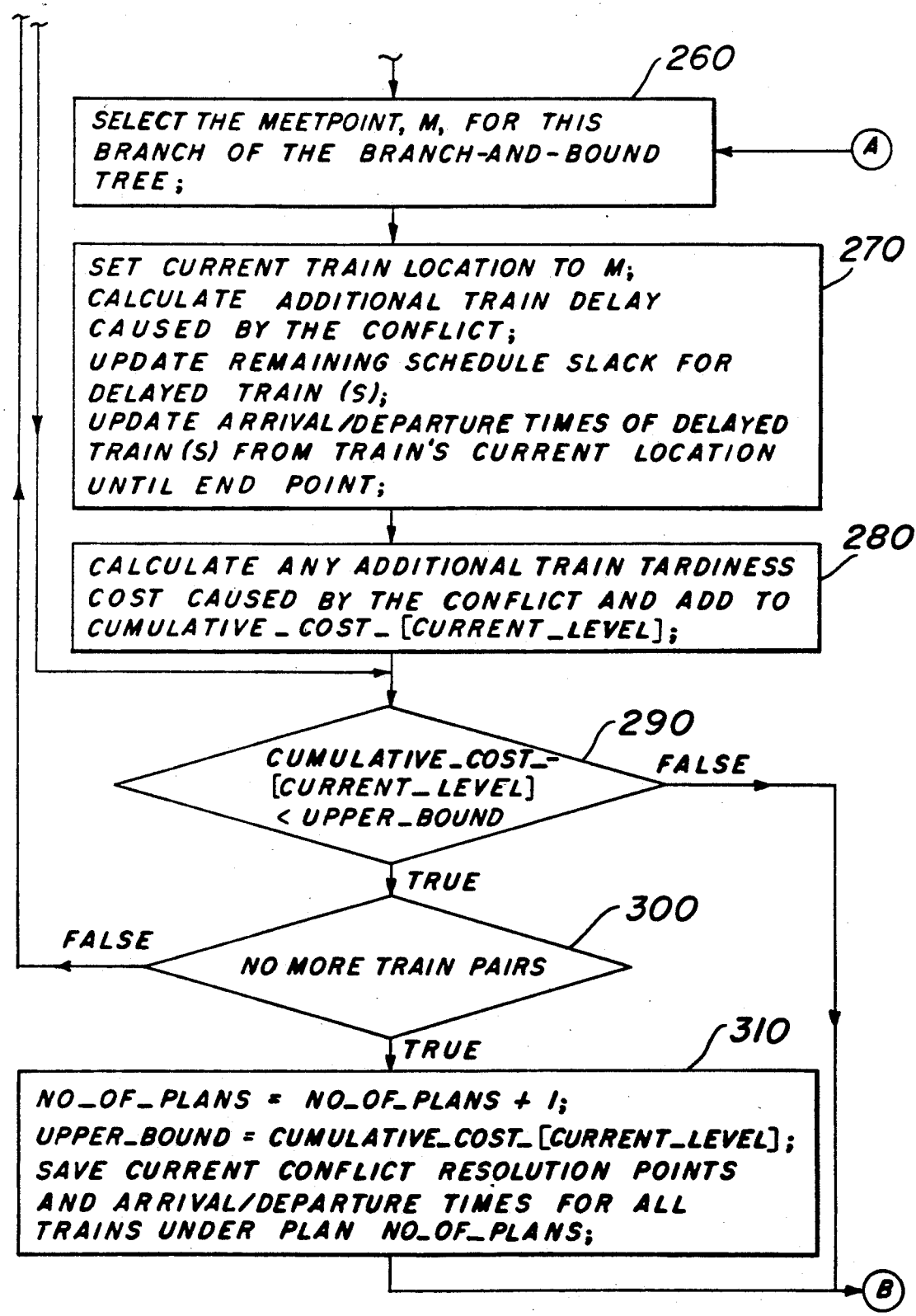
Figure 10C:
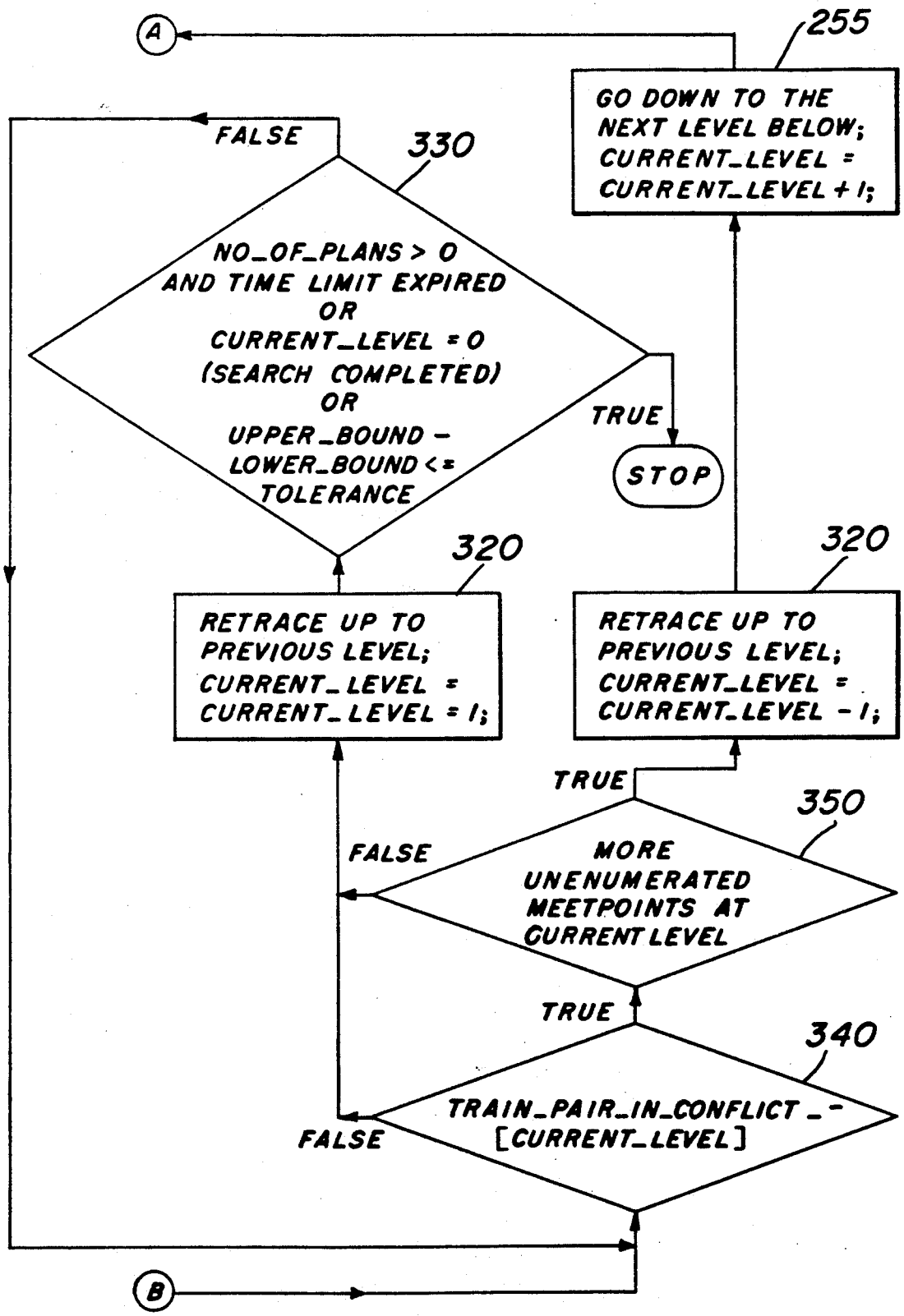
Figure 11A:
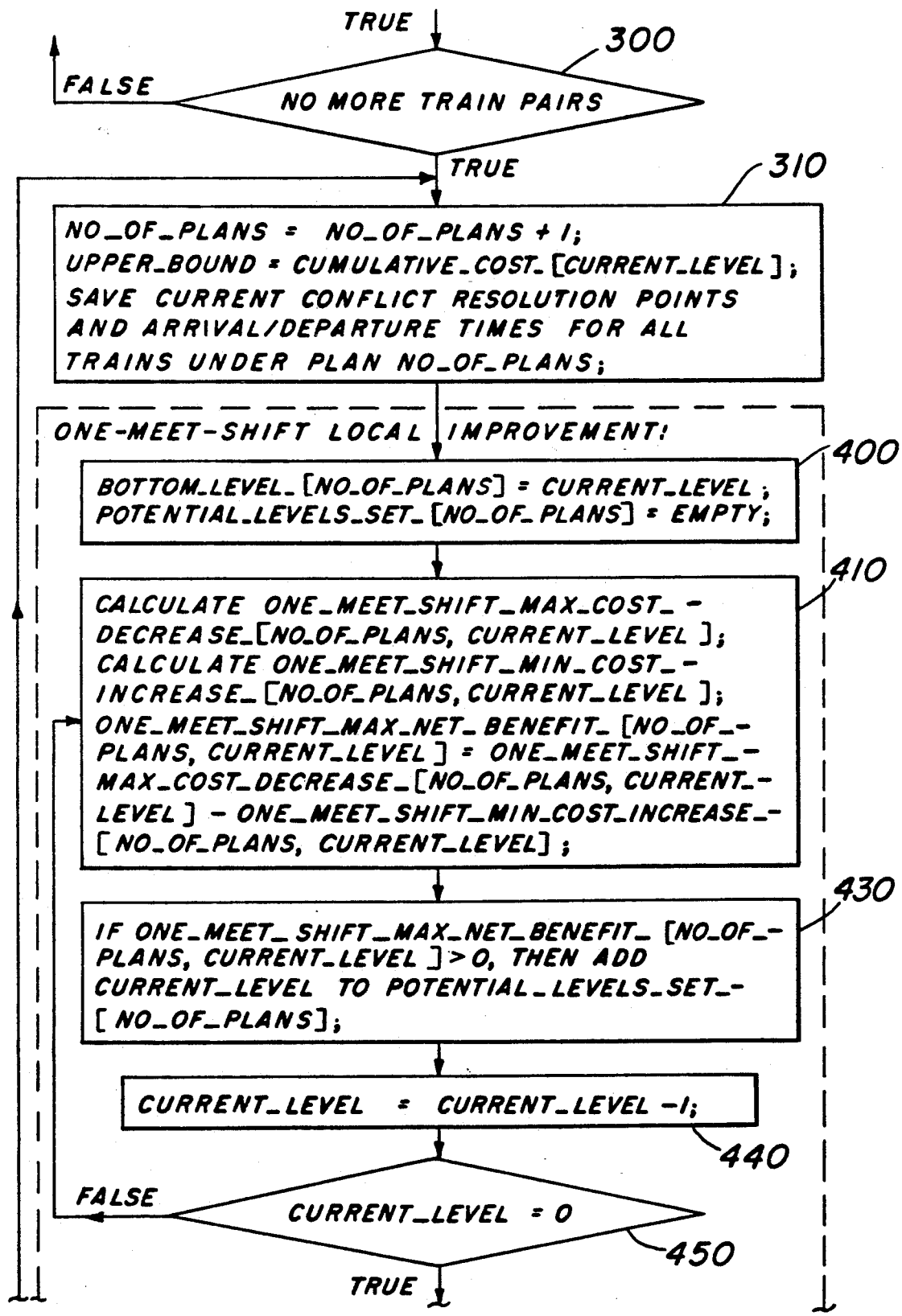
FIGS. 11A and 11B are a functional flow diagram of a one-meet-shift local improvement routine, representing an addition to the flowchart of FIGS. 10A through 10C, according to the invention.
Figure 11B:
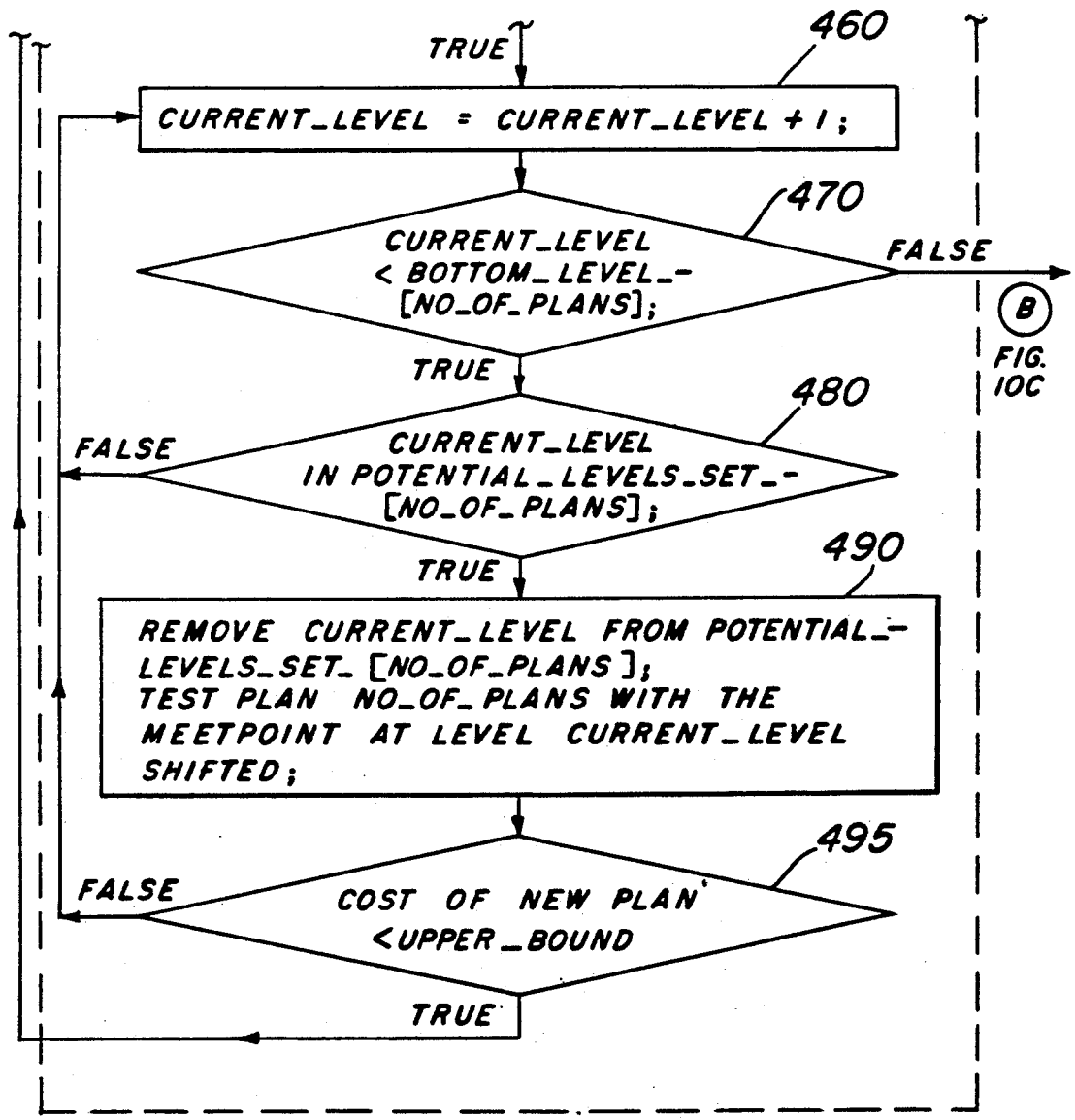

Referring to FIGS. 10A through 10C, the potentially conflicting train pair, i, j, is selected at step 200. In this particular algorithm implementation, the potential conflicting train pairs are selected starting with the Outbound train 1 and Inbound train 1 and proceeding with consecutive potential meets of Outbound train 1; after all conflicts involving Outbound train 1 have been resolved, the meets of Outbound train 2 are resolved, etc. Other train pair selection rules are possible.

At each new tree level, (step 205), both trains involved in the potential conflict are moved in order to calculate and update their arrival/departure times at all meetpoints from their current meetpoint until the endpoint without the constraints imposed by the conflict at current level (step 210). The train times are updated respecting physical constraints concerning maximum train speeds and maintaining at least the specified minimum headway from trains in front. At the same time, any delays caused to the train pair by the need to preserve a minimum headway between trains going in the same direction are calculated and the current schedule slack of delayed trains in the pair is decreased by the amount of delay.

If the remaining schedule slack of delayed trains (if any) in the pair is negative, then these train(s) have incurred new or additional tardiness (lateness), and the cost of additional tardiness is calculated, using the formula* assigned to the strain (step 220). The additional tardiness cost "AddTardinessCost" for any additionally late trains in the pair is added to the cumulative cost at the current level, "CumulativeCost [CurrentLevel]". * "AddTardinessCost"="f(Additional Tardiness)−f(-Previous Tardiness)", where "f(.)" is the tardiness cost function At the next step, step 230, the existence of the conflict between the train pair is checked for. If the paths of the two trains in space and time (e.g., as in the time-distance diagram in FIG. 9, which represents graphical output provided by the implicit enumeration algorithm and shows the optimal feasibility plan), do not intersect, there is no conflict to resolve and the algorithm proceeds to step 290. (Note that a train path is not connected to a path in the algorithm search tree; the former refers to a physical path specified by time and space coordinates.)

If there is a conflict to resolve, the best feasible meetpoints for conflict resolution are selected (step 240). In this particular application of the algorithm, for the sake of efficiency only the two meetpoints closest to the intersection of train paths on the time-distance diagram are considered. More than two meetpoints can be considered if advantageous using the same general algorithm. At some levels there may be only one feasible conflict resolution point, either because the others are already occupied or do not provide adequate capacity.

At some levels there may be no feasible meetpoints available at all for the conflicting train pair, in which case, (step 244), there is no need to continue the search down that path of the search tree since it cannot lead to feasible solutions. In order to prevent continuation of the search and branches (vertices emanating from the mode at the level above the current level in the tree), "CumulativeCost [CurrentLevel]" is set to the current "UpperBound" in step 246 and the algorithm proceeds to step 290 where the current path of the search tree is closed (fathomed) and, at step 320, the algorithm retraces to the levels above looking for a potential new branch.

More often, a node can also be fathomed, at step 320, if the cumulative cost at that node exceeds the best known solution, even if there are feasible meetpoints for conflict resolution or if there is no conflict between the train pair.

If there is conflict ("TRUE" at step 230), and there is at least one feasible conflict resolution point ("FALSE" at step 244), the selected feasible meetpoints are evaluated at step 250. This evaluation depends on the branching rules employed in the algorithm. Very good results have been obtained using the branching rules based on the additional estimated, conflict resolution caused, delay and tardiness cost. For this approach, additional delay deadly for each of the two conflicting trains is calculated for each of the selected feasible meetpoints. Meetpoints are then ranked pairwise according to following rules:

a. if the two meetpoints would both cause additional tardiness cost to one or both of the two conflicting trains, the one causing less total additional tardiness cost is ranked higher;

b. if one of the two meetpoints would cause additional tardiness cost to one or both of the two conflicting trains, and the other one would not cause any additional tardiness cost, the one causing no total additional tardiness cost is ranked higher;

c. if neither of the two meetpoints would cause additional tardiness cost to either any the two conflicting trains, the one causing less total additional delay to the two conflicting trains is ranked higher.

The meetpoint, m, is chosen at step 260, according to the branching rule. The branching rule implemented to select the highest ranking unenumerated (not used in a branch) meetpoint.

After the meetpoint has been selected at step 260, current locations of the two conflicting trains are set to the selected point and the conflict constraints (e.g., the two opposing trains cannot meet on the same track) including any safety margins, are applied and train delay calculated at step 270. Generally, the train that arrives first at the selected meetpoint is switched on the side track and delayed until the arrival of the other train. Appropriate train deceleration and acceleration delays may be incorporated for greater reliability and precision. Arrival/departure time of delayed train(s) are updated starting with the new current location and remaining schedule slack of the delayed train(s) is decreased by the amount of delay.

Finally, the cost of eventual tardiness caused by the conflict resolution delays at this level is calculated for each of the two trains and added to "CumulativeCost [CurrentLevel]" at step 280.

Bounding is performed at step 290, where the cumulative cost of the current tree path is compared to the cost of best previous solution. Initially, "UpperBound" is set to a very high number at step 110, so that the algorithm will proceed down the search tree without retracing in order to quickly find the initial solution (depth-first search). Before the initial solution is found, retracing up the search tree can occur only if no feasible meetpoints can be found at for some conflict (steps 244, 246, 290, 320). After the initial solution is found, bounding at step 290 ensures that a tree path is fathomed (closed) when it is not possible to find a solution with a lower cost than the best currently known solution by continuing down the current tree path ("FALSE" at step 290).

If the bounding test is passed ("TRUE" at step 290), a check is made for remaining potentially conflicting train pairs at step 300. This check depends on the train pair selection rule employed in step 200. Specifically, the algorithm then determines if i is equal to the index of last Outbound train and j equal to the index of last Inbound train. If this condition is met ("TRUE" at step 300), we have a new solution, either the initial one or one with a cost lower than any previous solution. (Terms "solution", "meet-pass plan" and "plan" are used as synonyms.) At step 310 the solution counter "NoOfPlans" is incremented, and the solution is saved for eventual future reporting and output to the graphic user interface and the track and signal interface (step 120 in FIG. 4).

If a new meet-pass plan has been found or the current tree path has been fathomed, the algorithm stops downward directed search in the branch-and-bound tree and retraces up the tree at step 320. Retracing to the previous level above the current level includes decrementing the level counter, "CurrentLevel", and setting the train pair, i, j, the train pair current location, arrival/departure times, remaining schedule slack and the meetpoint, m, to the values they had at the level number "CurrentLevel". It is equivalent to restoring the system state to that one that existed at the previous level of the tree.

After retracing up by one level, the algorithm checks for stopping conditions at step 330. Various stopping rules can be included. The basic ones include time limit, completion of the search through the branch-and-bound tree which also ensure that the optimal solution has been found, and finding a solution with a cost within the prespecified tolerance. Note that the time limit is not enforced until the initial solution has been found. Also note that the lowest possible cost is 0, indicating no late trains in the plan; thus, a solution with a total cost of 0 is optimal, or one of the optimal solutions and there is no need to continue the search once such a solution has been found.

If stopping conditions have not been met, the algorithm checks if the train pair at the new current level are at conflict at step 340. If there is no conflict, there is no choice of meetpoints—branching—to be performed at current level and the algorithm retraces up the tree by one more level.

A check for remaining unenumerated meetpoints from the selected feasible set at the new current level is made at step 350. If there are no remaining meetpoints, there is no choice of meetpoints—branching—to be performed at current level and the algorithm retraces up the tree by one more level.

Retracing at step 320, stopping checks at step 330, checking for a need for branching at step 340, and checking for remaining meetpoints to be considered in branching at step 350 are repeated until one of the conditions have been met. If there is an enumerated branch to be explored, the algorithm proceeds to the next meetpoint selection at step 260.

The enumeration of the search tree for the 5-train, 6-meet example starts with the meet of Outbound train 1 and Inbound train 1 at level 1 (step 200).

The arrival times in minutes for Outbound train 1 unconstrained by the meeting constraints corresponding to the meet at level 1 are as follows: meetpoint 1: 150, meetpoint 2: 150+10=160, meetpoint 3: 160+41=201, meetpoint 4: 201+7=208, meetpoint 5: 208+14=222, meetpoint 6: 222+10=232, meetpoint 7: 232+16=248. The arrival times in minutes for Inbound train 1 unconstrained by meeting constraints corresponding to the meet at level 1 are as follows: meetpoint 7: 80, meetpoint 6: 80+10=90, meetpoint 5: 90+21=111, meetpoint 4: 111+14=125, meetpoint 3: 125+7=132, meetpoint 2: 132+41=173, meetpoint 1: 173+7=180 (step 210).

There are no preceding trains and no delay or tardiness caused by preceding trains (step 220).

In the unconstrained case, the paths of Outbound 1 and Inbound 1 would cross between meetpoints 2 and 3 since the Outbound train could arrive first at meetpoint 2 (160 versus 173 minutes) and the Inbound train could arrive first at meetpoint 3 (132 versus 201 minutes). (See step 230.)

Meeting at meetpoint 2 would result in 13 minutes delay to the Outbound train which, given the schedule slack of 0 minutes, would produce the tardiness cost of $10 \cdot 13^2 = 1690$; meeting at meetpoint 3 would result in 69 minutes delay to the Inbound train which, given the Inbound train's schedule slack of 15 minutes, would result in the tardiness cost of $13 \cdot (69-15)^2 = 37908$. (See steps 240, 250.)

All meetpoints are of adequate capacity (sidetrack length, weight limit) and not occupied since there are no preceding trains ("FALSE" at step 244).

Thus, according to the branching rules, the meet at meetpoint 2 is enumerated first. (See step 260.)

Outbound 1 arrives at meetpoint 2 at 160 minutes (02:40 hrs) and Inbound 1 arrives at meetpoint 2 at 173 minutes (02:53 hrs); thus, Outbound 1 is delayed at meetpoint 2 by 13 minutes waiting for Inbound 1 (see step 270).

Since Outbound 1 has no slack in it schedule (see Table 0.1), 13 minutes of delay results in 13 minutes of tardiness at a cost of $10 \cdot 13^2 = 1690$, which is the objective value at node 1 in FIG. 7 (see step 280).

The search proceeds in a similar manner down to the next level corresponding to the meeting of Outbound train 1 and Inbound train 2 at level 2. Meetpoints 2 and 3 are the two closest points for this meet as well, and meetpoint 3 is chosen for the first branch. Outbound 1 arrives at meetpoint 3 at 214 minutes (03:34 hrs) and Inbound 2 at 173 minutes (02:53 hrs); thus, Inbound 2 is delayed at meetpoint 3 by 41 minutes waiting for Outbound 1. The 41 minutes of delay to Inbound 2, given its schedule slack of 49 minutes, results in no tardiness for Inbound 2; thus, the objective value of node 2 remains at 1690, the same as in its predecessor, node 1. The search proceeds in this manner until the initial feasible solution is found, and the algorithm then retraces to enumerate branches from non-fathomed nodes.

Only 16 nodes have been explicitly enumerated out of a maximum number of 126, and 2 meet-pass plans have been evaluated out of a maximum of $2^6 = 64$ in this example. The initial meet-pass plan is shown in FIG. 8 (which also represents graphical output provided by the implicit enumeration algorithm) and the optimal plan is shown in FIG. 9. In these FIGS., the paths of the late trains are drawn using dashed line from the point where they were delayed over and above their scheduled slack. For example, FIG. 8 shows that Outbound train 01 was delayed at meet at meetpoint 2 by 13 minutes, and since this train has no slack built into it schedule (see Table 1), from this point on this train was late as is indicated by the dashed line. Thus, for conflicting train pair, the one-meet-shift solution is uniquely defined, and can be tested, as shown at step 490.

If the cost of the new solution with the meet-shift is lower, as tested at step 495, we have a better solution and a lower upper bound; otherwise, the new solution is discarded and another meet-shift, if any, is tested ("FALSE" at step 495).

As can be seen in the flowchart of FIGS. IIA and 11B, an improved one-meet-shift solution does not alter the search logic of the enumeration algorithm, it only decreases the value of the upper bound in step 310. (A lower upper bound results in fast fathoming of tree paths in step 290.) The one-meet-shift routine is activated after a plan has been found and stored by the enumeration algorithm in step 310 (coming from step 300, "TRUE"). After the one-meet-shift routine has completed, the algorithm proceeds to retracing in step 320 as it would without the routine.

The problem with testing for one-meet-shift at each conflicting level of a given meet-pass plan is that the number of potential new one-meet-shift improvements can be quite high—equal to the number of conflicts in the plan. A method was developed to screen all meets in a given solution and identify those that hold some potential for improvement. This method will be illustrated on the example of the initial meet-pass plan shown in FIG. 12. Dashed lines denote trains delayed above their scheduled slack; i.e., trains that are running late. By observing the meet of Outbound train 02 and Inbound train 01 at point 2, we can notice that the Outbound train has been delayed about 10 minutes in its meet, which made it late (this train has very little slack in its schedule); furthermore, as we follow Outbound train 02 down its path, we can notice that it has, in turn, delayed Inbound train 02 at point 3 by about 40 minutes (this Inbound train was later additionally delayed by Outbound 03 at the same point), and Inbound train 03 at point 5 by about 5 minutes, which made Inbound train 03 late.

If the meetpoint for this meet was shifted down to point 3, then the Outbound 02 would not be late departing from point 2, Inbound 03 would not be made late by Outbound 02 at point 5, and the delay to Outbound train 04 at point 2 due to Inbound 03 would be reduced by about 5 minutes; continuing down the path of Outbound train 04, the delay to Inbound train 04 at point 5 would be reduced by about 5 minutes, which in turn means that the lateness of Outbound train 05 departing from point 2 would be by reduced by 5 minutes, furthermore, if Inbound 05 was not delayed by Outbound train 06, its delay and lateness due to Outbound train 05 would be 5 minutes less.

This example shows the "ripple effect" that a shift in a meeting point may have on the conflicts that come after the shifted meet and on the delay of the trains involved. The sum of all potential cost reductions associated with the decrease in train lateness, "OneMeetShiftMaxCostDecrease" represents the maximum benefit from a particular one-meet-shift and is calculated in step 410.

If we also include potential lateness reductions for trains that are additionally delayed after incurring the delay that could be decreased by a particular meet-shift, then this sum would represent the maximum cost decrease, relative to the current solution, that could be achieved by shifting the meeting point of the meet under considerations, regardless of the meeting points chosen for other meets; i.e., the maximum cost decrease that can be achieved in any solution with a shifted meet, not just the local improvement solution. Such cost decrease is called a general meet-shift maximum cost decrease and is used in the lower bound-based pruning algorithm described later.

Figure 12:
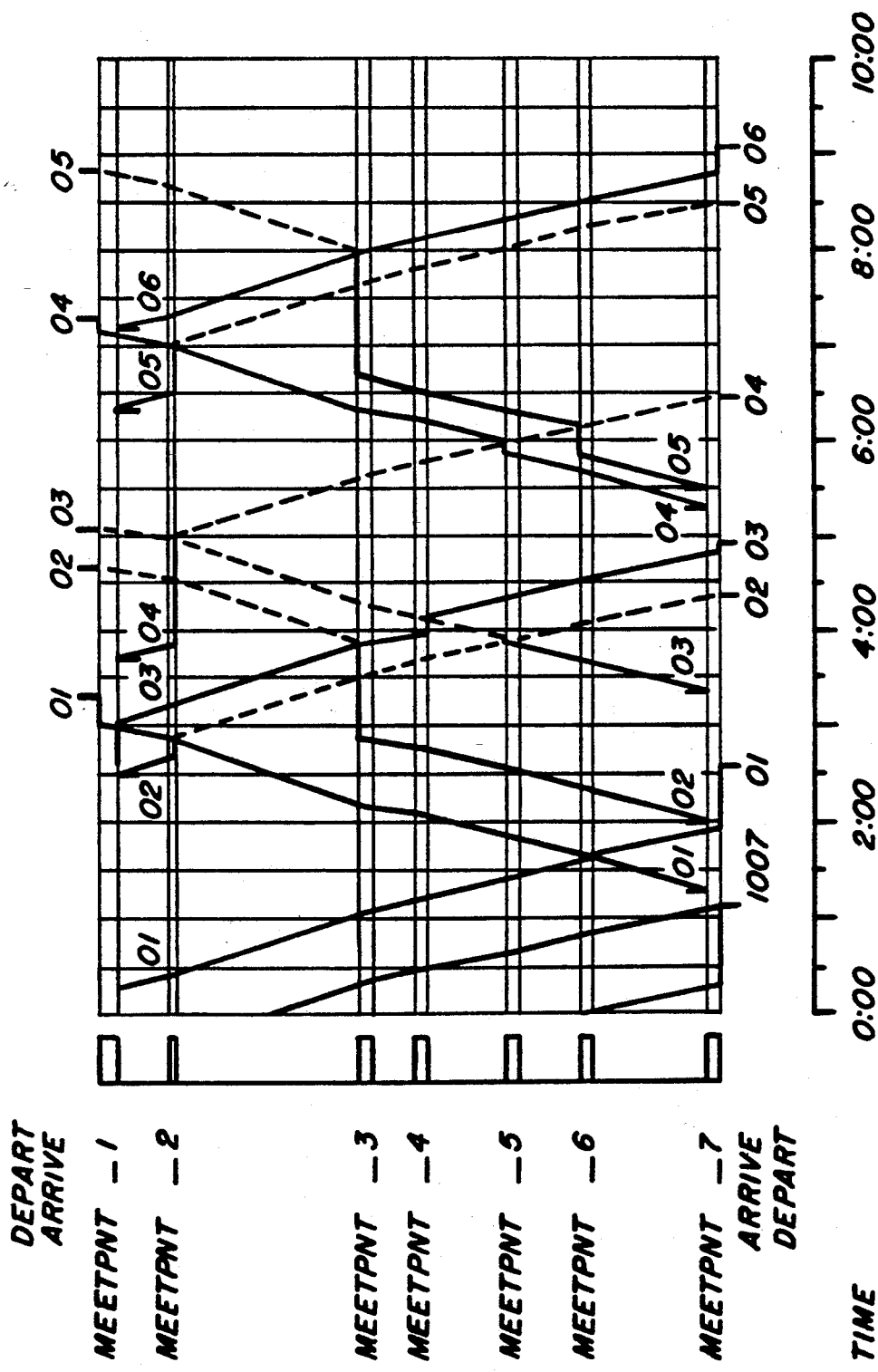
FIGS. 12 and 13 are additional examples of graphical output from the basic implicit enumeration algorithm, as modified by FIGS. 11A and 11B.

An example of a delay that cannot be reduced by just one meet-shift is a delay of Inbound train 02 at meet with Outbound train 02 at meetpoint 3 in FIG. 12. Since Inbound train 02 was further delayed at the same meetpoint by Outbound train 03 after the delay it incurred at meet with Outbound train 02, shifting the meet of Outbound train 02 and Inbound train 01, which would in turn make Outbound train 02 arrive earlier at its meet with Inbound train 02 at meetpoint 3, is not enough to decrease the arrival time (and lateness) of Inbound train 02 at its destination at meetpoint 1. It is also necessary to reduce the latest delay that Inbound train 02 has incurred before arriving at its destination, which is the delay caused by the meet with Outbound train 03. Thus, the reduction of intermediate delays that a train has incurred is possible only in conjunction with the reduction of the train's last delay and cannot be achieved by shifting just one meet in the given plan.

Of course, there is also a minimum additional cost associated with shifting the meet: the cost of additionally delaying the other train in the given conflicting pair. In the example presented in FIG. 12, this cost would be the cost of delay that Inbound train 01 would incur if its meet-with Outbound train 02 was shifted from point 2 to 3; this delay would be about 70 minutes which, after subtracting 15 minutes of scheduled slack, would result in 55 minutes of tardiness. This is one-meet-shift minimum cost increase, calculated in step 410 for all conflicting levels in a given plan.

There are other potential costs associated with a delay of Inbound train 01, such as delay of the following Inbound train 02 at point 3, however, finding the minimum of these additional costs could lead to solving a time-consuming combinatorial problem and is not performed.

By finding the maximum cost reduction and the minimum cost increase associated with shifting a meeting point and by subtracting the latter from the former, it is possible to find a maximum potential net benefit that can be achieved by shifting a given meet as is done at the end of step 410.

In our example, the cost of making Inbound train 01 55 minutes late outweighs the potential cost reduction that could be achieved by shifting the meet to point 3 and decreasing the lateness and delay of Outbound train 2 and the associated ripple effect. Thus, the level number of this conflict was not entered in "PotentialLevelsSet" in step 403.

In fact, after checking all previous conflicts by incrementing "CurrentLevel" in step 460 and testing in step 430, the only meet that has positive potential maximum net benefit associated with a shift in its meeting point is that of Outbound train 03 and Inbound train 01 at meetpoint 1; shifting this meet to point 2 would decrease the delay of Outbound 03 by 9 minutes, which would in turn decrease the lateness of Inbound 02 after its meet at point 3 by the same amount. Inbound train 01 would be delayed by 10 minutes if this meet was shifted to point 2 but, since this train has 15 minutes of slack, there is no additional cost associated with this shift. Thus, only the level number of this meet was included in "PotentialLevelsSet" in step 430, tested for one-meet-shift improvement, and the level number was removed from "PotentialLevelsSet" in step 490.

Figure 13:
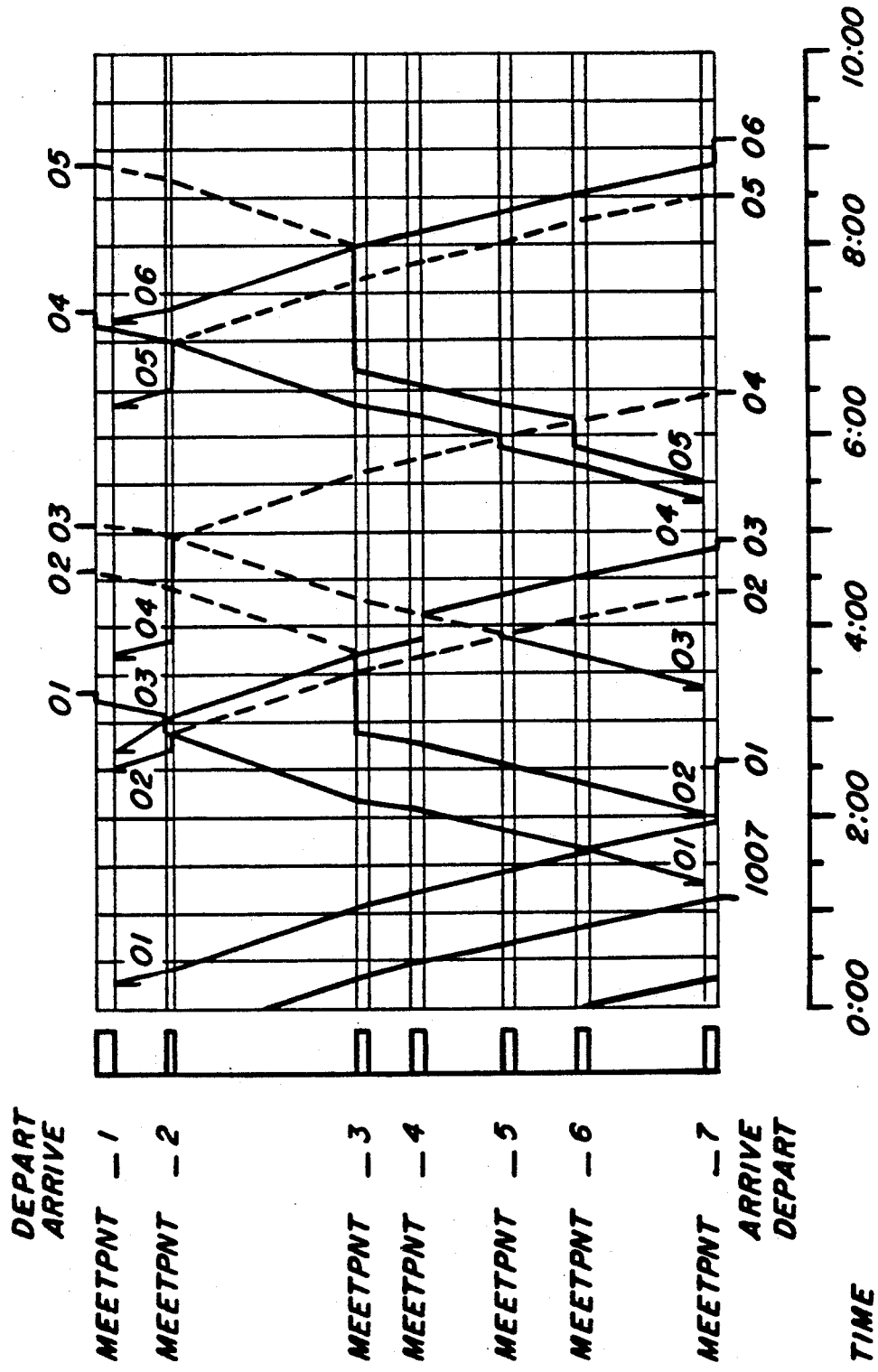
Figure 14A:
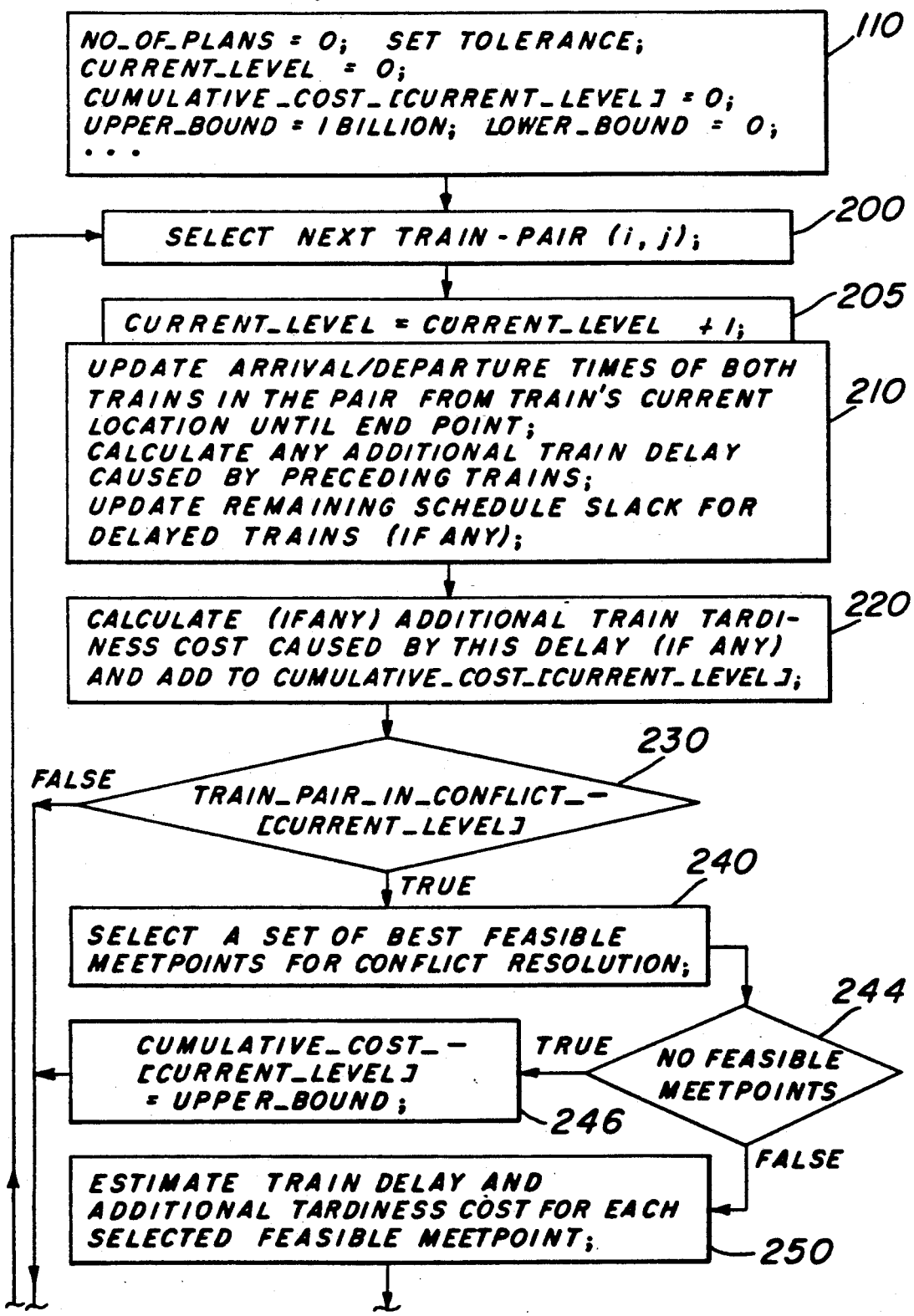
FIG. 14A through 14H are a detailed functional flow diagram of a lower bound-based (exact) pruning algorithm with one-meet-shift local improvement heuristic according to the present invention.
Figure 14B:
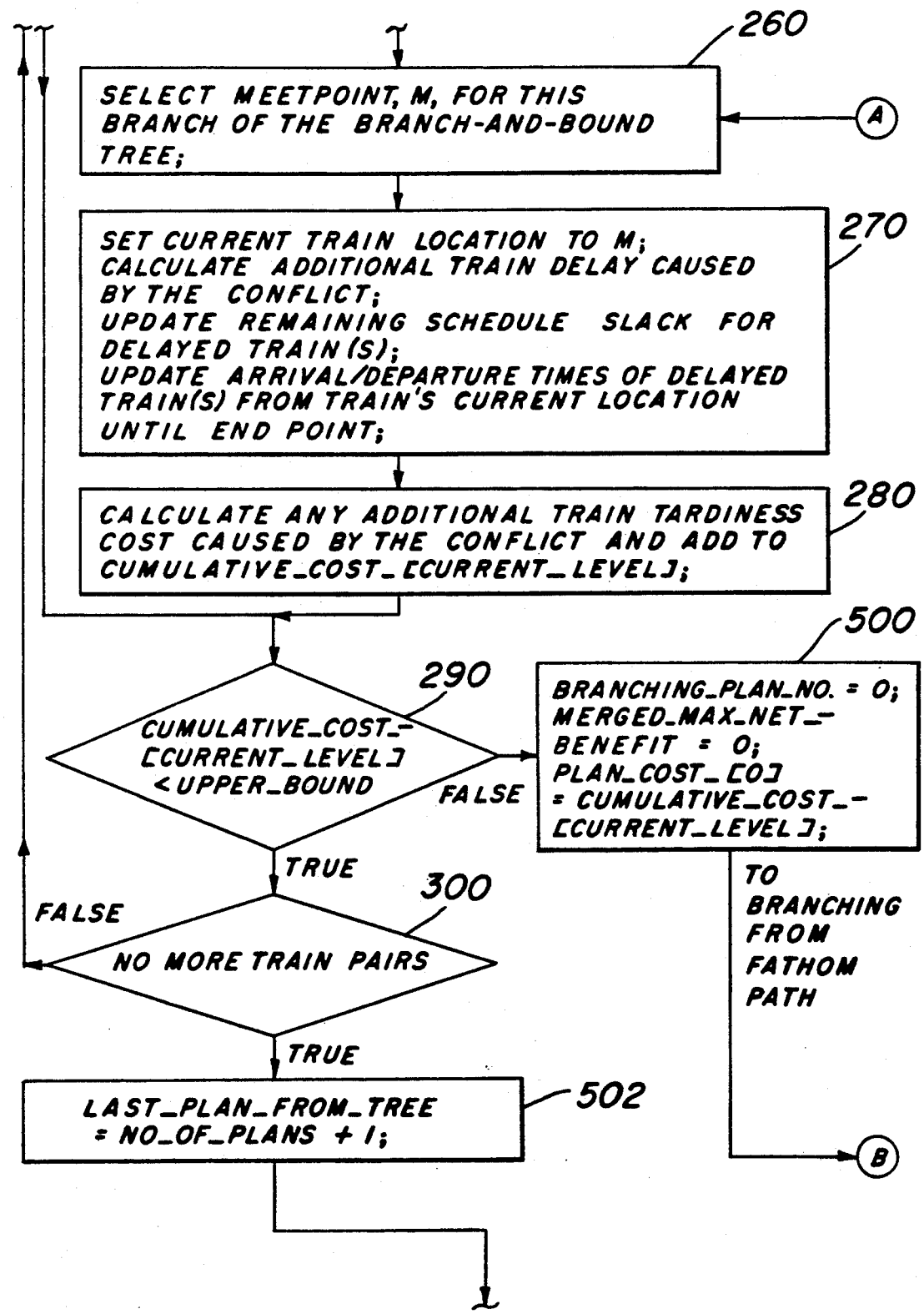
Figure 14C:
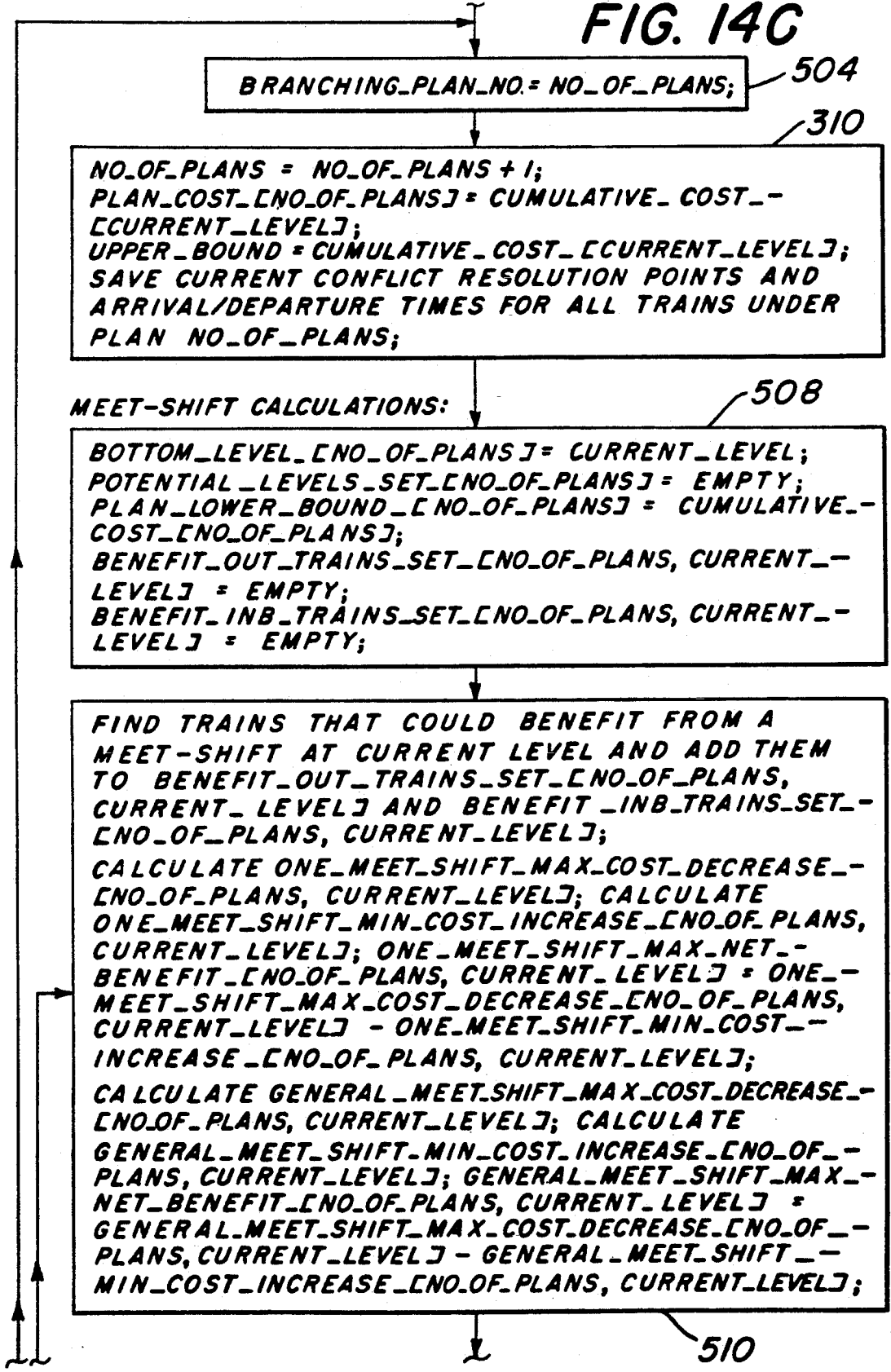
Figure 14D:
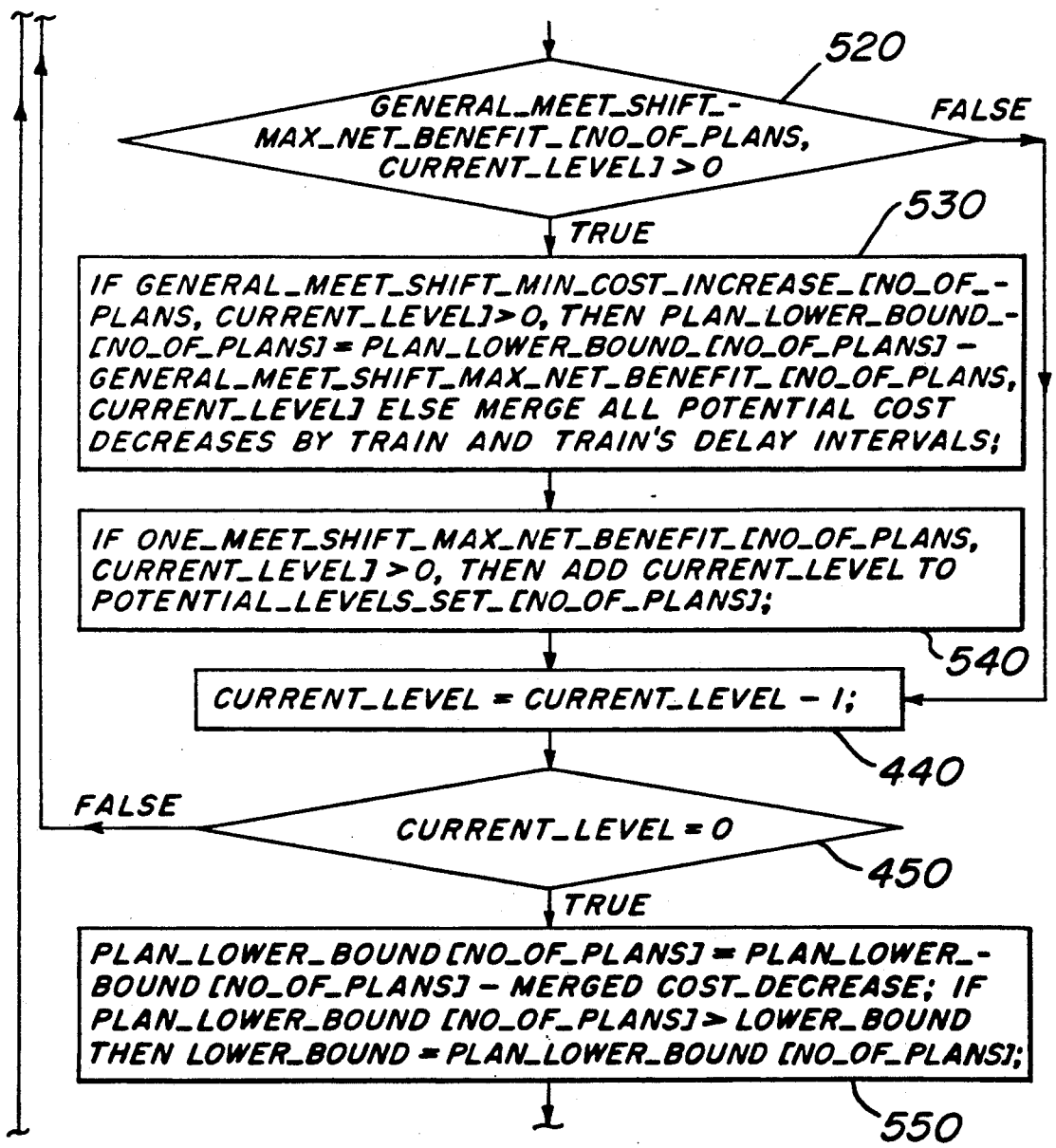
Figure 14E:
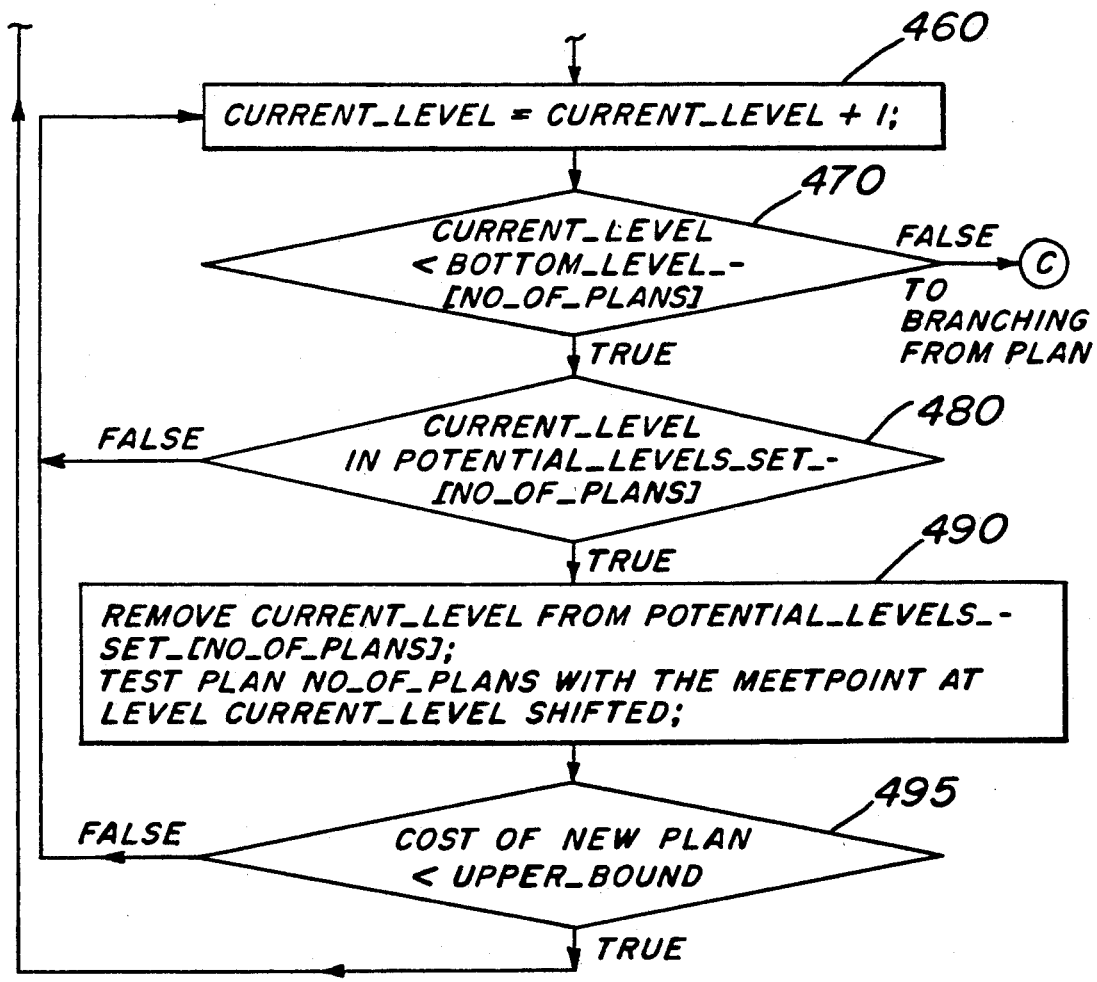
Figure 14F:
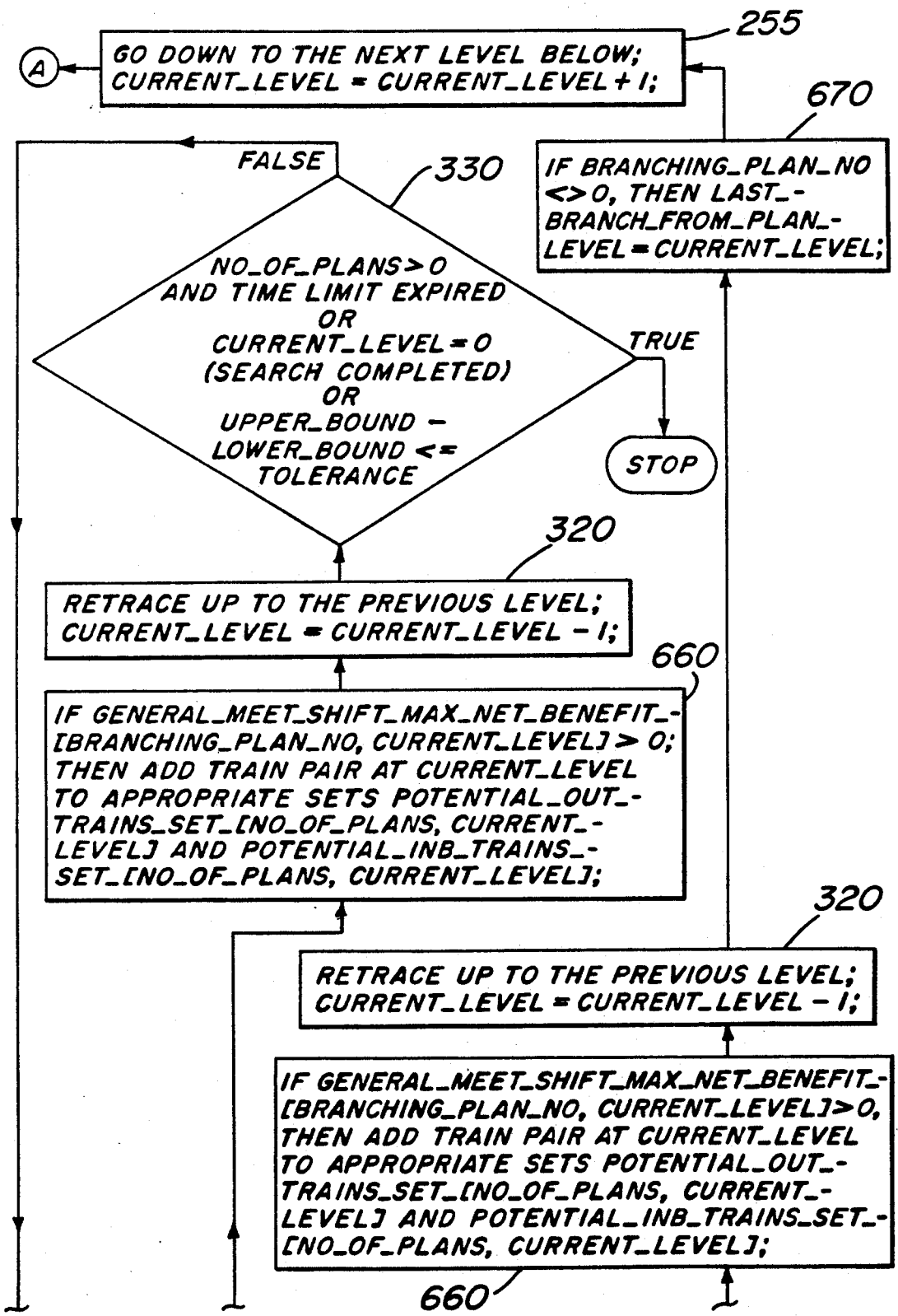
Figure 14G:
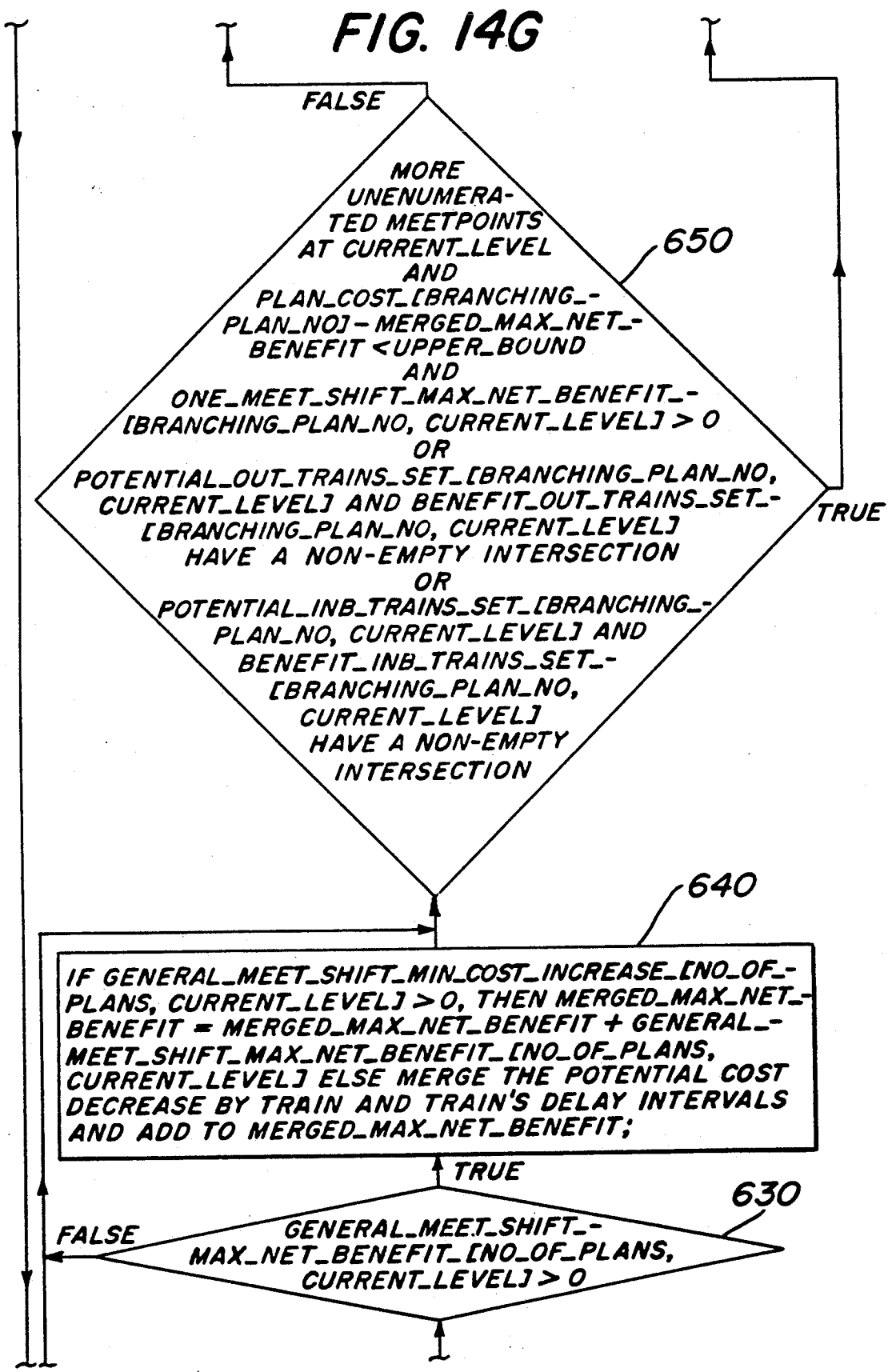
Figure 14H:
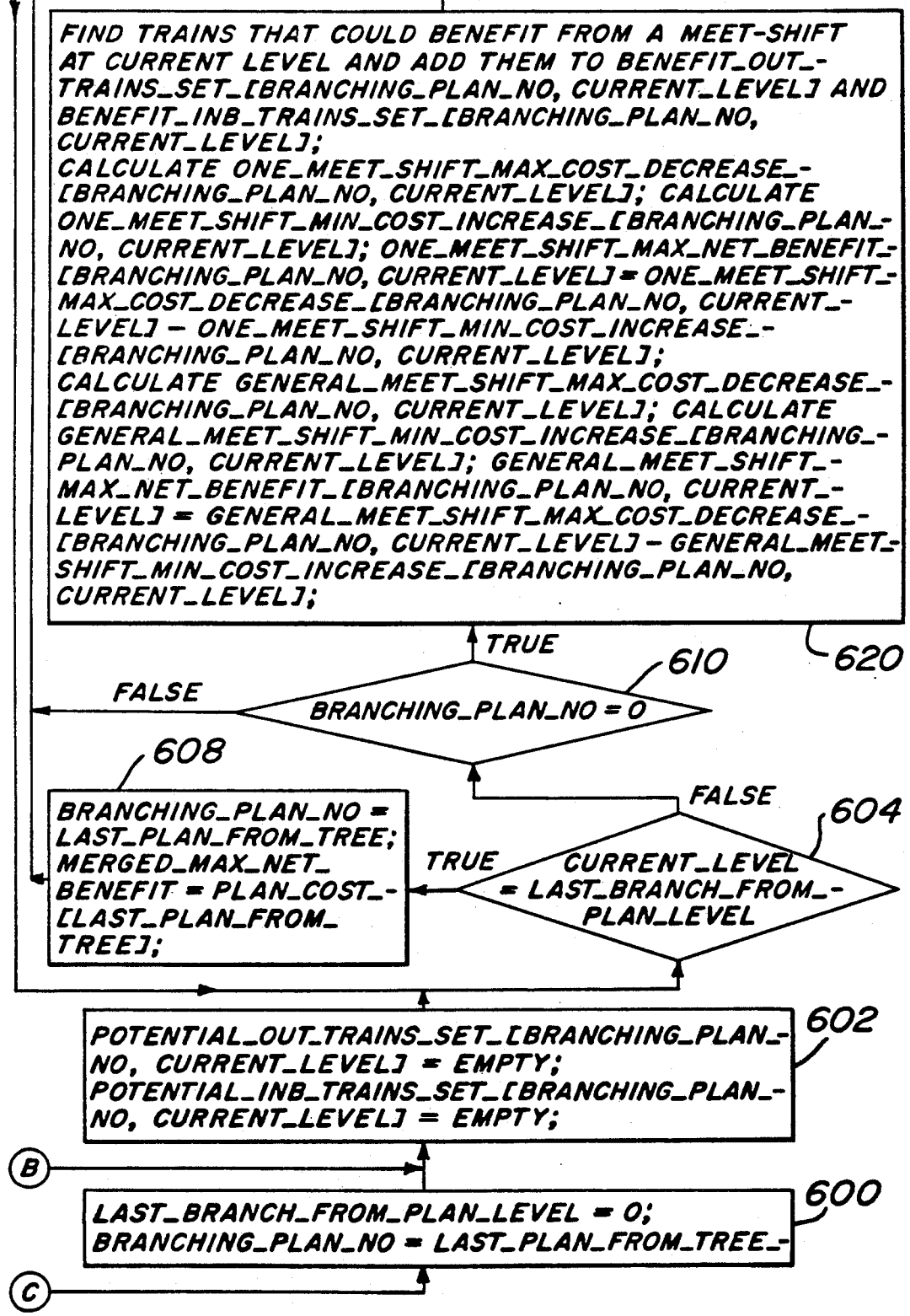

The improved solution that was found in this way was found to have lower cost than the previous solution in step 495, TRUE, and was stored in step 310. It is shown in FIG. 13, which shows the Meetpoint_1—Meetpoint_7 example. FIG. 13 is the second meet pass plan, the result of one meet-shift local optimization routine, objective value 66066. The only difference from the initial solution is in the location of the meet of Outbound train 03 and Inbound train 01. Since "PotentialLevelsSet" is now empty, the algorithm does not test any other meet shifts as ensured by step 480. After the bottom level of the previous plan was reached in step 470, the algorithm proceeds to step 320 and begins to retrace up the search tree.

C. Lower Bound-Based Exact Pruning Algorithm

The flowchart for the lower bound-based (exact) pruning algorithm is illustrated in FIGS. 14A through 14H. It will be seen that many of the steps are identical to those of the basic implicit enumeration algorithm of FIGS. 10A through 10C described above. The explanation of those steps need not be repeated here. Only the new and/or different steps will be described. Except as noted, references to flowchart steps are to the flowchart of FIGS. 14A through 14H.

The improved lower bounding and tree-pruning methods used in the lower bound-based exact pruning algorithm are based on notions, introduced in the description of one-meet-shift local improvement routine, of the maximum cost decrease and the minimum additional cost associated with each meet-shift in a given solution (meet-pass plan).

A meet-shift does not necessarily set the exact meetpoint for a considered meet; it just shifts that meet in the new solution to occur either above or below the current meetpoint, depending on the direction of travel of the train(s) currently delayed. If, in the current solution, the train delayed in the considered meet is going down (i.e., Outbound as in the case of train 04 that is delayed in meet with Inbound train 03 at meetpoint 2 in FIG. 0.5), then, in order to avoid delaying this train, the shifted meet must occur below the current meetpoint; i.e., in the case of Outbound train 04 and Inbound train 03, their shifted meet would be constrained to any meetpoint between 3 and 7, not just meetpoint 3.

However, the meetpoint that is going to be used for a shifted meet in a potential new meet-pass plan will be one of the points from the best feasible set selected at step 240. The highest ranked point from that set that satisfies meet-shift constraint (i.e., above or below a certain meetpoint) will be used for the shifted meet. For a considered meet-shift from a given meet-pass plan, if no conflicts have been shifted at any level before the current conflict, then the best feasible meetpoint set remains the same as in the given plan, as is the case when testing potential new plans in one-meet-shift routine in step 490.

There are two distinct to define the minimum additional cost associated with shifting a meet; a one-meet-shift and a general meet-shift minimum additional cost. The one used in the one-meet-shift routine assumes that the meetpoints used for all conflicts in the search tree preceding the considered meet will remain unchanged. Therefore, if the train that is delayed in the considered meet was previously delayed at some preceding conflict as well (e.g., Inbound train 02 in FIG. 8 is delayed by 41 minutes at MeetPoint_3 by Outbound train 01 before getting delayed by Outbound train 02 at the same point by additional 20 minutes), it is assumed that it will remain delayed by the same amount arriving at the considered meet in the new plan. In the example in FIG. 8, if the meet of Outbound 02 and Inbound 02 is shifted from meetpoint 3 to meetpoint 2, Outbound 02 would get additionally delayed by 65 minutes waiting for Inbound 02 to arrive at meetpoint 2, and incur additional tardiness cost of 23040.

However, if Inbound 02 was not delayed by Outbound 01 prior to this meet, Inbound 02 could arrive earlier at meetpoint 2 and the additional delay to Outbound 02 caused by this meet shift would be only 44 minutes instead of 65, and the additional cost to Outbound 02 would be 490. The complete calculations are presented in Table 5, appended hereto, under meet at level 5. The first procedure, which retains all previous delays of the two trains involved in a conflict to be shifted, is used for the calculation of the one-meet-shift minimum additional cost. The second procedure, which assumes no previous delays for the two trains involved in the meet to be shifted, is used to calculate the general meet-shift minimum cost. The general meet-shift minimum additional cost represents the minimum cost increase associated with a shift of the considered conflict in any new solution, with possible changes in meet resolution locations at the levels of the search tree both above and below the considered conflict. Thus, we must allow for the possibility that one or both trains involved in the considered conflict may have incurred no delay before the considered meet in a new, potentially better solution, and that the additional cost of shifting the meet may be lower than if only the considered meet was shifted in a new solution. Obviously, general meet-shift minimum additional cost is equal to or lower than the one-meet-shift minimum additional cost. It is used primarily for the calculation of lower bounds on which the exact pruning algorithm is based.

In both cases (one and general meet-shift), the additional cost is calculated only in the amount necessary to determine the tardiness cost to the train that is not, or less, delayed at the considered meet in the current plan. The difference between the tardiness cost for this train in the new solution, with the meet shifted, and the current solution is the minimum cost increase associated with shifting the meet.

Accordingly, there are two kinds of maximum net benefits associated with each meet; the one-meet-shift net benefit, applicable to local improvements, and the general meet-shift net benefit, applicable to any new solution. Each of these values are used in the calculation of several types of lower bounds or branching rules on which the algorithm is based.

1. Numerical Examples of Costs and Benefits Associated with Meet-Shift

Tables 2 and 3, appended hereto, present the calculation and the value of maximum meet-shift cost reductions for all meets of plan number 1 for the 5-train, 6-meet example presented in FIG. 8. The data for the 5-train, 6-meet small example are given in Table 1. The structure and calculation of one-meet-shift and general meet-shift minimum cost increase for all 6 meets of plan number 1 for the 5-train, 6-meet example are presented in Tables 4 and 5, appended hereto. These calculations are performed in step 510 of the algorithm flowchart of FIGS. 14A through 14H. The maximum cost reductions and minimum cost increase, as well as net benefits associated with one- and general meet-shifts for plan 1 are summarized in Table 6, appended hereto. The one-meet-shift net benefit for each meet is calculated by subtracting one-meet-shift minimum additional cost from meet-shift maximum cost decrease; the general meet-shift net benefit is calculated by subtracting the general meet-shift minimum additional cost from meet-shift maximum cost decrease.

2. Calculation of the Global Lower Bound From a Plan

A rather weak lower bound on the total tardiness cost can be calculated from any given meet-pass plan by subtracting the sum of all positive general meet-shift maximum net benefits from the objective value of the plan (lower bound is set to 0 if the result is negative).

An improved lower bound can be obtained by "merging" maximum cost reductions train by train rather than just summing them up. The notion of "merging" cost reductions is based on the fact that the total plan cost is separable by trains; cost reductions from a meet-shift consist of lateness reductions for individual trains. Without merging, if two meet-shifts could reduce the lateness for a particular train by the same amount in the same time interval, then both of these cost reductions would be subtracted from the best known solution in the calculation of the lower bound, although they refer to the same cost reduction that can be achieved only once. With merging, double counting of cost reductions is avoided.

The concept of global lower bound calculation and merging will be illustrated on the initial meet-pass plan for the 5-train, 6-meet small example. From Table 6, we can observe that only two meets, at levels 4 and 5, have positive maximum general meet-shift net benefits, equal to 1053 and 563, respectively. This means that any potentially better solution must include at least one of these two meet-shifts. At best, both meet-shifts (at levels 4 and 5) would bring the maximum benefits; thus, the optimum cannot be lower than 2923−(1053+563)=1307. This is the global lower bound without merging.

However, if we look at the structure of meet-shift maximum cost decrease for meets at levels 4 and 5, we can see that both decreases consist of decreasing the delay of Inbound train 2 at meetpoint 3 by 17 minutes and eliminating its lateness of 9 minutes (the meet-shift at level 4 can also reduce the delay of Outbound train 2 but, since this delay did not cause any tardiness to Outbound train 2, this delay reduction would not produce any direct cost reductions). Since both meet-shifts could at best reduce the Inbound train 2 delay by the same amount in the same real-time interval (i.e., by changing its departure time from meetpoint 3 from 231 minutes (03:51 hours) to 214 minutes (03:34 hours)), they are actually decreasing the same cost. Thus, the maximum total cost decrease for both meet-shift cannot exceed 1053 and the global lower bound with merging is 2923−1053=1870, which is quite close to the optimum of 1922.

Note that if the two meet shifts could reduce the delay to Inbound train 2 in two non-overlapping real-time intervals, than the potential cost reductions would have been simply added together. An example of this would be merging cost reductions of meet-shifts at levels 1 and 4. A meet-shift at level 1 would reduce the delay of Outbound train 1 by 13 minutes which could, in turn, reduce the delay interval of Inbound train 2 at meetpoint 3 (see Table 4), from 173 minutes (02:53 hours)-214 minutes (03:34 hours) in current solution, by 13 minutes to 173 minutes (02:53 hours)-201 minutes (03:21 hours) interval, corresponding to a reduction interval of 201 minutes (03:21 hours)-214 minutes (03:34 hours). A meet-shift at level 4 could reduce the delay of Outbound train 2 by 20 minutes which could, in turn, reduce the delay interval of Inbound train 2 at meetpoint 3, from 214 minutes (02:53 hours)-231 minutes (03:51 hours) in current solution, by 17 minutes to possible departure at 214 minutes (02:53 hours), corresponding to a reduction of 214-231 minutes. Since the delay reduction intervals for Inbound train 2 corresponding to the meet shifts at levels 1 and 4 do not overlap, the total delay reduction from two meet shifts is 13+17=30 minutes. If the two reduction intervals were overlapping, then the intersection of these two intervals would represent the total delay reduction—the intervals would have to be merged. I.e., if the two intervals were 201-220 and 214-231 minutes, the total possible delay reduction would be 30 minutes, corresponding to the merged reduction interval of 201-231 minutes, although the sum of individual delay reductions is 19+17=36 minutes.

Calculation of merged maximum cost decrease is performed at step 530 of the flowchart of FIGS. 14A through 14H.

In this algorithm, only partial cost reduction merging is used—only those meets without an associated general meet-shift minimum additional cost are merged. Trying to merge the cost reductions for meets with a positive general meet-shift minimum additional cost in order to maximize the total merged benefits (which is necessary for a valid lower bound) would lead to a potentially computationally intensive combinatorial problem and is not performed. In the 5-train, 6-meet initial solution example, there were only 2 combinations: the meet-shift at level 4 alone, or both meet-shifts at level 4 and 5 together. The meet-shift at level 4 along, with maximum cost reduction 1053 and minimum additional cost of 0 results in a lower bound of 1870. The combination of both meet-shifts results in a total merged maximum cost decrease of 1053 and minimum additional cost associated with meet-shift at level 5 of 490; thus, this combination would result in an obviously invalid lower bound of 2923−1053+490=2360. (It is invalid because it is higher than the optimal solution, which contradicts the definition of the lower bound—a value lower than or equal to the optimum solution.) For large examples, finding a valid lower bound with merging of maximum cost reductions of meet-shifts with non-zero minimum cost increase would require solving a combinatorial minimization subproblem the size of which is a function of number of meets with a positive maximum net benefit and a non-zero minimum additional cost.

An alternative approach, implemented in the algorithm, is to only merge the maximum cost reductions of those meets with general meet-shift minimum additional costs of zero increase since they are always going to be incorporated in a valid lower bound. Meets with a positive maximum net benefit and a non-zero general meet-shift minimum additional cost increase are incorporated in the lower bound by directly adding up their net benefits, adding the merged cost decrease, and subtracting the total sum from the best known solution in order to calculate a valid, partially-merged, lower bound. This is done at step 550 of the flowchart of FIGS. 14A through 14H. If the lower bound calculated from the current plan is higher than the current global lower bound, global "LowerBound" is updated, at step 550.

The global lower bound calculated from a plan is used to stop the algorithm when the desired optimum is reached at step 330 and, thus, decreases the algorithm search space and computational time.

3. Calculation of the Lower Bound From a Plan Path

A plan path in the search tree contains the nodes that resolve all train conflicts and it can be represented by a meet-pass plan. The lower bound from a plan path is used to discard "unpromising" branching points when continuing the search after an initial or improved solution is found. Under the depth-first search rule used in the implicit enumeration algorithm, each time an improved (or initial) solution is found ("TRUE" at step 300), and saved, at step 310, the search progresses by going one level up to the previous tree level, at step 320, and then trying the branch at that level if there is a conflict and there are remaining nonenumerated meetpoints from the best feasible set at that level. If the new branch from the plan ends up in a node with the objective value higher than the upper bound, as checked at step 290, the current path is fathomed, the algorithm proceeds by retracing up the fathomed path at step 320 looking for the next branching point, and so on (see FIG. 7).

It is possible that the whole initial branch from the plan gets enumerated (i.e., all paths containing the new branching vertex are fathomed) without finding a better solution. For example, in FIG. 7, the whole branch at level 5 starting with node number 8 was fathomed with the fathoming of node 8. In bigger, real-life examples, branches can contain thousands of enumerated nodes before they are fathomed, which makes the minimum train tardiness problem computationally difficult.

However, it is possible to assess a branch from the plan path with regard to potential, better, solutions contained in the branch, without explicitly enumerating the branch the, thus reduce the search tree. Using this method, as shown in the flowchart of FIGS. 14A through 14H, the first level from which to branch from a plan path after a new plan has been saved at step 310 and some parameters initialized at step 600, is chosen as the one where the one-meet-shift net benefit of the meet at that level is positive or where a meet-shift could benefit (decrease the delay of) some train(s) involved in a meet with a positive general meet-shift benefit at some level of the tree below the current level.

If neither of the two conditions are met at a given level of the plan path, a branch from such a level cannot contain a node with the cumulative cost lower than the cost of the plan from which it branches. This is because shifting any of the meets at the levels below and including the given level cannot result in a positive cost decrease or one larger than the potential cost increase.

These conditions are checked at step 650, namely if "OneMeetShiftMaxNetBenefit[BranchingPlanNo,CurrentLevel]" is positive, and if at least one train from "PotentialOutTrainSet[BranchingPlanNo,CurrentLevel]" can benefit from the meet shift at the given level. Train indices of the conflicting train pair at the given level are added to the potential train sets if the general meet shift maximum net benefit at the given level is positive, as shown at step 660.

Actually, the first condition checked at step 650 eliminates branching at the given level if there are no remaining meetpoints to be enumerated, i.e., if there are no remaining branches at this level, otherwise is equivalent to step in the enumeration algorithm. The second condition at step 650 is always met if there are levels with a positive general meet-shift maximum net benefit in the plan below and including the given level; this condition is used to prune branches when branching from a fathomed path, as will be described in the next section.

4. Calculation of the Lower Bound From a Fathomed Path

A path is fathomed when the cumulative cost at the node at the end of the path is greater than or equal to the cost of the best known solution, as shown at step 290. However, the nodes in the path are not necessarily fathomed, except for the end node. The discussion of how to choose the first "promising" level of the fathomed path from which to branch is completely analogous to the discussion of branching from a plan path with one addition: the lower bound on the cost of any potential plan contained in the considered branch is also calculated ("MergedMaxNetBenefit" shown in step 640) and compared to the current upper bound (i.e., the best known solution) at step 650, second condition.

All branches with a lower bound higher than the best known solution are discarded, since they do not satisfy the second condition of step 650. This additional step is not necessary in the case of branching from a plan path since the objective value at the bottom of a plan path is the best known solution and any, however small, cost decrease would produce a lower bound lower than the upper bound.

An additional distinction of branching from a nonplan (fathomed) path is that distinct values of maximum net benefits and benefitting trains associated with meet-shifts must be calculated from the fathomed path, in step 620, and these values and sets, rather than those calculated from the latest plan, must be used for the determination of promising branches from the fathomed path in step 650. That is the reason for indexing train sets and meet-shift benefits with the plan number. Plan number 0 was designated to represent a fathomed path rather than a plan.

Once the algorithm has retraced from the bottom level of the fathomed path to the level where the fathomed path branches from the latest tree-generated plan without finding an improved solution, that means that this whole branch has been fathomed, either by enumeration or by the lower bound-based elimination rule, and the algorithm must continue to retrace up the search tree, looking for a promising branch from the latest tree-generated plan again. This is accomplished by checking current level versus the level of the latest branch from a plan in step 604, and, if necessary, changing "Branch Plan No" from 0 to the latest tree-generated plan in step 608.

5. Numerical Examples of the Lower Bound-Based Exact Algorithm

Figure 15:
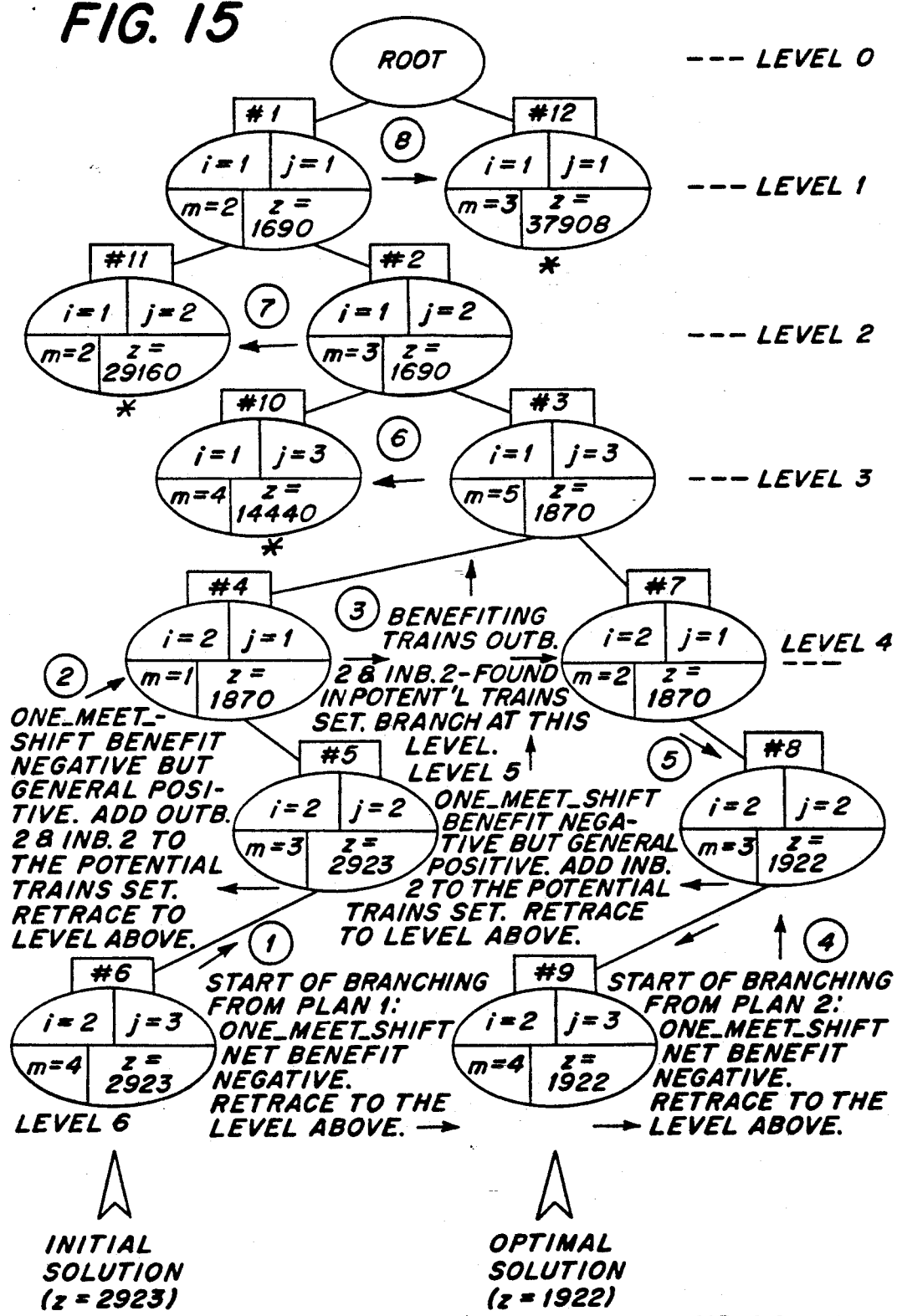
FIG. 15 illustrates node branches employed by the lower-bound based (exact) pruning algorithm according to the present invention.

The complete search tree for the 5-train, 6-meet example using the lower bound-based exact pruning algorithm is presented in FIG. 15. Down through node number 6, which contains the same manner as the implicit enumeration algorithm. The difference between the two algorithms can be noticed in the process of retracing up the initial plan path (the path from Root to node 6) in search of a next branching point. Instead of explicitly enumerating the second branch from node 5, level 6, the pruning algorithm examines the one-meet-shift and general meet-shift maximum net benefits of shifting the meet at level 6 from plan number 1 (Table 6 appended hereto). The 'potential' trains sets are a set of Outbound and a set of Inbound trains involved in meets with a positive general meet-shift maximum net benefit and a negative one-meet-shift net benefit at levels, below the current level, which have been eliminated as potential branching levels. The sets are updated in step 660. Reducing the delay to a 'potential' train could decrease the minimum cost increase associated with a meet-shift for one of the meets below the current level and could lead to an improved solution.

Since the one-meet-shift benefit for level 6 from plan 1 is nonpositive (i.e., −7820 in Table 0.6) and the 'potential' trains sets are empty (because level 6 is the bottom level), branching at level 6 is eliminated, according to the rules of branching from the plan path. Furthermore, since the general meet-shift benefit at level 6 is also nonpositive (i.e., 0), trains involved in this meet are not inserted in 'potential' trains sets in step 660.

The search retraces to level 5 in step 320, and passes through stopping conditions check in step 330. Since the one-meet-shift benefit at level 5 of plan 1 is nonpositive (−21987) and 'potential' trains sets are still empty, branching from plan 1 at level 5 is also eliminated at step 650. However, because the general meet-shift benefit at level 5 is positive (+563), trains involved in the meet at level 5, Outbound 2 and Inbound 2, are inserted in their respective 'potential' trains sets in step 660.

The search retraces to level 4. The shift of meet at level 4 can benefit Outbound train 2 and Inbound train 2, which are now 'potential' trains, therefore a branch from plan 1 at level 4 is opened and the first node of this branch, node 7, is enumerated. Another reason for branching at this level would be that the one-meet-shift net benefit at this level is positive (+1053). The objective value at node 7 is 1870, which is below the upper bound of 2923, as checked in 290. Thus, the search progresses down through the new nodes 8 and 9, to the level 6, where it finds an improved solution with the total tardiness cost of 1922.

The algorithm now calculates meet-shift costs and benefits for plan number 2, which are presented in Table 7, and the search retraces up the path of plan number 2 looking for a 'promising' branch. Branching from plan 2 at level 6 is eliminated because both one-meet and general net benefits at this level (−3200 and 0) are nonpositive. Branching at level 5 is eliminated because the one-meet-shift benefit is nonpositive (22988). However, the general meet-shift benefit is positive (+12) and thus Outbound train 2 and Inbound train 2 are added to their respective 'potential' trains sets in step 660.

The search retraces to level 4. The other branch at this level (starting with node 4) has already been explored. Since both meet-shift benefits are nonpositive (0 and 0), no new trains are added to the 'potential' trains sets, and the search retraces to level 3. Outbound train 2 is one of the benefitting trains at level 3, and since this train is in the Outbound 'potential' trains set, a new branch at level 3 is opened at node number 10. Since the cumulative cost at node 10 of 14440 exceeds the upper bound of 1922, node 10 and the branch level 3 are fathomed.

Branches at level 2 and 1 are fathomed in a similar manner and the search is completed with the optimal solution of 1922, after explicitly enumerating only 12 nodes versus 16 for the implicit enumeration algorithm. The difference in the number of nodes enumerated by the two algorithms increases with the size of the problem and this difference offsets the additional work performed by the lower bound-based pruning algorithm in calculating meet-shift costs and benefits.

Some of the concepts of the exact lower bound-based pruning algorithm can be also illustrated on the somewhat larger MeetPoint$_1$31-Meetpoint_7 example used in previous sections. The second plan, shown in FIG. 3, was the only improved plan found by the one-meet-shift local improvement heuristic. The search now continues from the bottom node of the path corresponding to the most recent solution, which is meet-pass plan number 1 shown in FIG. 12.

The bottom node of plan 1 corresponds to the meeting of Outbound 06 and Inbound 05 at point 3. The one-meet-shift maximum benefit of this meet is negative because the shift of the meet to point 2 would delay Outbound train 06 by about 90 minutes, and the 'potential' trains sets are empty; thus, this potential branching point is discarded. The general meet-shift maximum benefit for this meet, however, is positive because if Inbound 05 was not delayed previous to this meet, shifting this meet to a point above point 3 would not delay Outbound train 06 and the minimum cost increase would be 0. Thus, Outbound 06 and Inbound 05 are added to the 'potential' trains sets and the search retraces to the previous level above which corresponds to the meeting of Outbound 05 and Inbound 05 at point 3. The one-meet-shift maximum benefit of this meet shift is also negative; however, since it would decrease the delay of Inbound 05 which is a 'potential' train, the meet-shift at this level is chosen for the first branching point from the path of plan number 1. Enumeration of the first node in the branch results in the objective value higher than the upper bound obtained from plan 2, and the search process continues from the bottom node of this fathomed path.

This time, all branches until the meet of Outbound 04 and Inbound 04 at point 5 were discarded a priori. This meet was chosen for a new branch, although the one-meet-shift maximum benefit of shifting this meet above point 5 is negative, since this was the first node where the lower bound on the cost of a potential branch was below the upper bound and because this meet-shift would decrease the delay of a 'potential' Outbound train 05.

Figure 16:
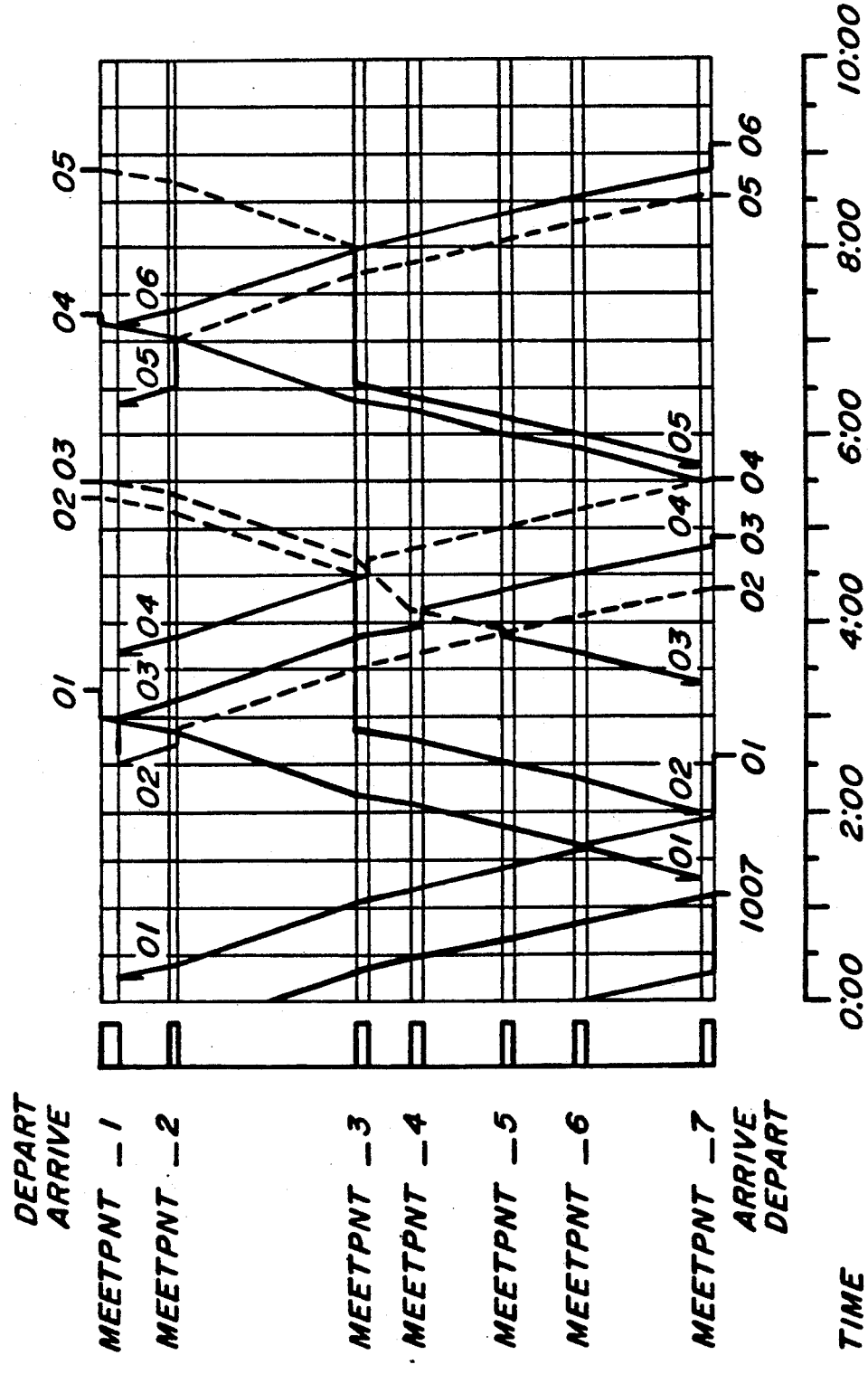
FIGS. 16 and 17 illustrate additional graphical output provided in accordance with the practice of the present invention.
Figure 17:
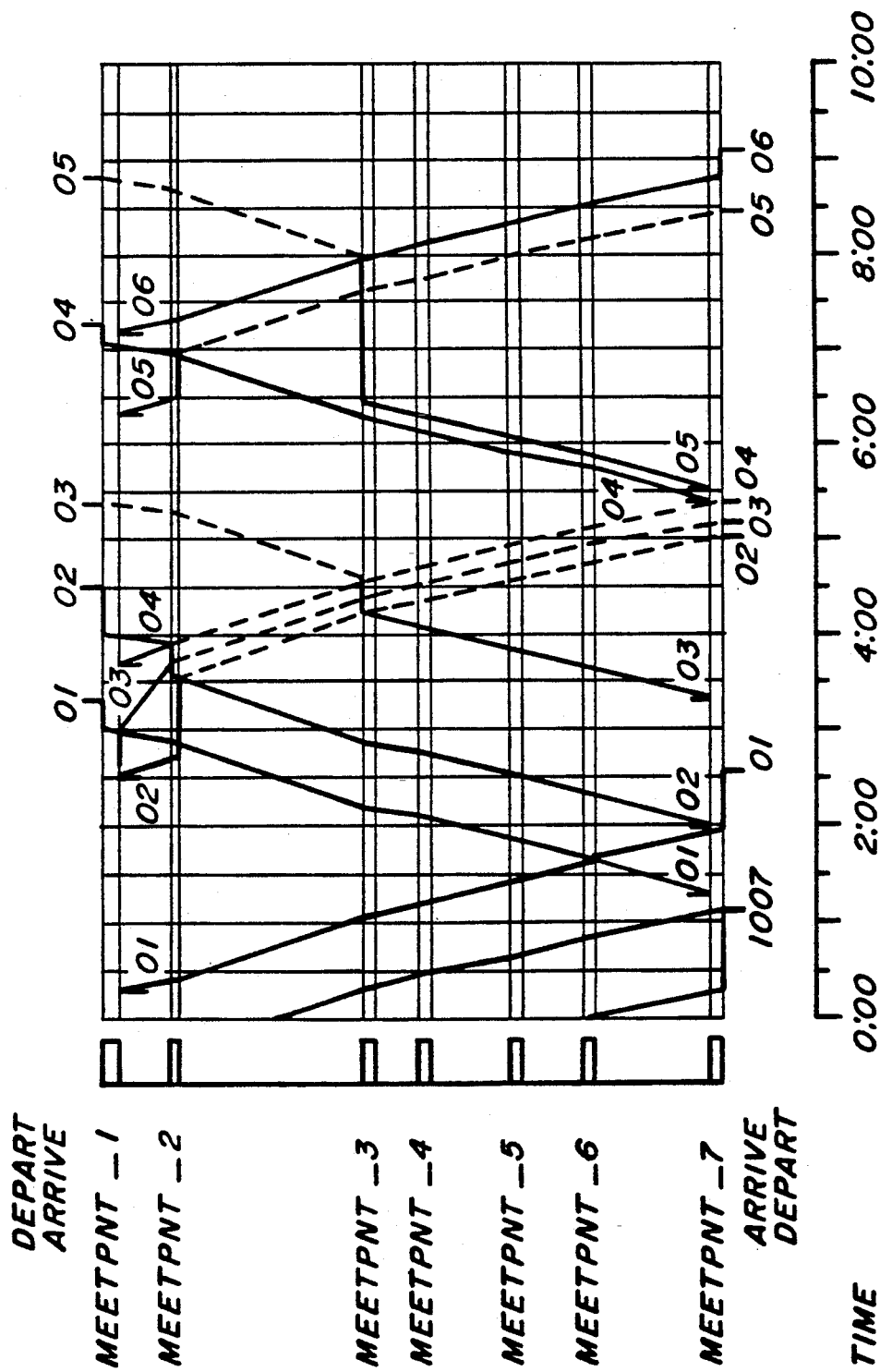

Various branches from fathomed paths of the search tree are discarded or partially enumerated in this manner until the node corresponding to the meeting of Outbound train 04 and Inbound train 02; after shifting this meet to a point below point 2, a new path from this branching point has produced the better solution, plan number 3, shown in FIG. 16. The search process now continues from the bottom of the path corresponding to plan number 3 until it branches at the level where Outbound 02 meets Inbound 02 at point 3; this branch contains the optimum solution shown in FIG. 17. The search now continues form the bottom of the path corresponding to plan number 4, and after discarding or enumerating (with finding a better solution) all branches up through the first level (corresponding to the meeting of Outbound 01 and Inbound 01 at point 6) were fathomed without obtaining a lower-cost solution, plan number 4 was proven optimal.

D. Accelerated Heuristic Lower Bound-Based Algorithm

The accelerated heuristic algorithm differs from the exact lower bound-based pruning algorithm of FIGS. 14A through 14H only with regard to the path of the search tree used for pruning of potential branches. After the initial branching from the most recent plan, all meet-shift benefits are calculated from the fathomed path. Even if the search has progressed above the initial branch from the plan, all meet-shift benefits are calculated from the fathomed path, a path that starts at the root node and ends with the last fathomed node, rather than the appropriate branching plan, as is done in the exact algorithm.

In particular, the accelerated algorithm differs from the exact algorithm of FIGS. 14A through 14H only to the extent that no track is kept of "Last Branch From Plan Level" and steps 604, 608, and 670 are not used. From step 602, the algorithm flow proceeds directly to step 610, and from 650, TRUE, step 670 is omitted. This seemingly small change significantly decreases the amount of branches and nodes searched and, thus, the computational time, but potentially produces a less optimal solution.

1. Numerical Example of the Lower Bound-Based Heuristic Algorithm

Figure 18:
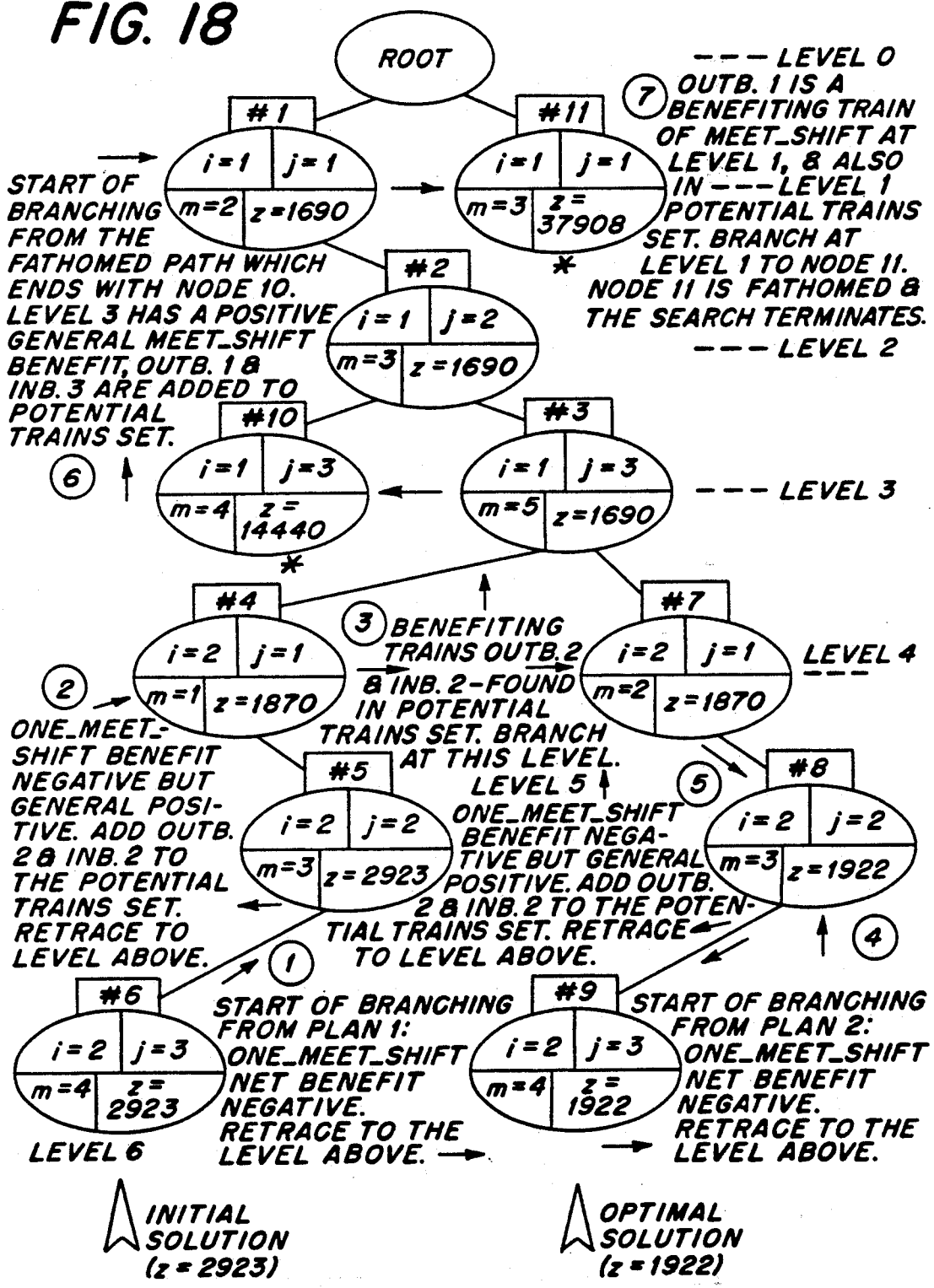
FIG. 18 illustrates node branches provided by an accelerated lower-bound based pruning algorithm according to the present invention.

The complete search tree for the 5-train, 6-meet example using the lower bound-based heuristic algorithm is presented in FIG. 18. The accelerated lower bound-based pruning algorithm proceeds in exactly the same manner as the exact pruning algorithm of FIGS. 14A through 14H up to the fathoming of node number 10 at level 3, since both branches explored up to and including this node were opened from the plan path: the branch at level 3 from plan number 1 and at level 3 from plan number 2. After node 10, however, the search proceeds by looking for a branch from fathomed path ending with node 10 A summary of meet-shift costs and benefits calculates for the fathomed path ending with node 10 is presented in Table 8. "Branching Plan Number" is set to 0 in step 500 of the algorithm of FIGS. 14A et seq. Meet-shift costs and benefits for level 3 of the fathomed path are calculated in step 620. The general meet-shift benefit at level 3 is positive, so the trains involved in the meet at level 3, Outbound 1 and Inbound 3, are added to their respective 'potential' sets in step 660. Since the potential maximum benefit of the meet shift at level 3, both general and one-meet, is 12750, and the objective value at the end of the fathomed path is 14440, the lower bound of the potential plan contained in a branch from the fathomed path at level 3 is 14440−12750=1690, which is lower than the upper bound of 1922, as checked in step 650, second condition. Thus, conditions for a promising branch from a fathomed path are satisfied. Indeed, branching from the fathomed path at level 3 (step 260 coming from step 650, TRUE) would produce the initial feasible solution. However, since both branches from node number 2 at level 3 have been already explored, there are no non-enumerated meetpoints left at level 3, and step 650, first condition is not met. The search retraces up to the 2 in step 320 and, after checking for stopping conditions in step 330, loops back to step 610. Branching at level 2 is eliminated since both meet-shift benefits are negative and the only benefitting train, Inbound 2, is not in the 'potential' Inbound trains set with branching plan index 0 (fathomed path). Note that the exact pruning algorithm did explore a branch at this level, since it was using meet-shift benefits and benefitting trains calculated from plan number 2.

The algorithm retraces to level 1, where one of the benefitting trains, Outbound 1, is in the 'potential' Outbound trains set; thus, a new branch at level 1 is opened at step 260 and node number 11 is enumerated. Since the cumulative cost at node 11 exceeds the upper bound, node 11 and the new branch at level 1 are fathomed and the search is completed after the algorithm retraces to level 0, as checked in step 330, second condition. The accelerated low bound-based pruning algorithm has enumerated 11 nodes versus 12 for the exact pruning algorithm.

Numerical testing shows that, in most cases, the accelerated algorithm combined with one-meet-shift heuristic enumerates a significantly smaller number of nodes than the exact lower-bound based pruning algorithm combined with the one-meet-shift heuristic while producing an optimal, or near optimal solution. This difference in speed stems from the fact that fathomed non-plan paths (i.e., those paths that do not contain a meet-pass plan) contain a smaller number of nodes and thus, less conflicts than a plan path; when assessing branches from such a path, one encounters fewer 'promising' meets and 'potential' trains which results in a larger number of branches being discarded a priori or pruned. Of course, there is no guarantee that the accelerated algorithm will not discard a branch that contains an improved or even the optimum solution.

E. Numerical Testing of Algorithms

Table 9 provides a comparison of an implicit enumeration algorithm (all branches are searched) lower band based pruning algorithm and an accelerated lower bound method for a real-world scenario. The example provided in Table 9 is based on 98 conflicts among 76 outbound trains and 77 inbound trains, travelling over 55 track segments, when the trains' average slack time is 19.9%. As can be seen, the lower bound algorithm can provide optimal solutions within seconds whereas the implicit enumeration algorithm could require days.

The pseudo-code for these algorithms including an example of the accelerated heuristic algorithm is provided in Appendix A.

While the invention has been described and illustrated with references to specific embodiments, those skilled in the art will recognize that modification and variations may be made without departing from the principles of the invention as described herein above and set forth in the following claims.

TABLE NO. 1

| Train $f_i(e)$ | Tardiness Cost Func. | Sched. Dprt. Time [min] $\delta_i$ | Sched. Arriv. Time [min] $\alpha_i$ | Minimum Travel Time Between Points | | | | | | Schedule Slack [min] |
|---|---|---|---|---|---|---|---|---|---|---|
| | | | | 1-2 $\tau_i^1$ | 2-3 $\tau_i^2$ | 3-4 $\tau_i^3$ | 4-5 $\tau_i^4$ | 5-6 $\tau_i^5$ | 6-7 $\tau_i^6$ | |
| Outbound 1 | $10e^2$ | 150 | 248 | 10 | 41 | 7 | 14 | 10 | 16 | 0 |
| Outbound 2 | $10e^2$ | 155 | 295 | 10 | 41 | 7 | 14 | 10 | 16 | 42 |
| Inbound 1 | $13e^2$ | 80 | 195 | 7 | 41 | 7 | 14 | 10 | 21 | 15 |
| Inbound 2 | $13e^2$ | 121 | 270 | 7 | 41 | 7 | 14 | 10 | 21 | 49 |

TABLE NO. 1-continued

| Train | Tardiness Cost Func. $f_i(e)$ | Sched. Dprt. Time [min] $\delta_i$ | Sched. Arriv. Time [min] $\alpha_i$ | Minimum Travel Time Between Points | | | | | | Schedule Slack [min] |
|---|---|---|---|---|---|---|---|---|---|---|
| | | | | 1-2 $\tau_i^1$ | 2-3 $\tau_i^2$ | 3-4 $\tau_i^3$ | 4-5 $\tau_i^4$ | 5-6 $\tau_i^5$ | 6-7 $\tau_i^6$ | |
| Inbound 3 | $20e^2$ | 202 | 300 | 7 | 40 | 7 | 14 | 10 | 20 | 0 |

Data for the 5-train, 6 meet small example. All 5 trains can fit on any of the 7 sidings; meeting headways ($p^m_{ij}$) are assumed to be 0, and following headways ($\eta^m_{ij}$) are all equal to 10 minutes.

TABLE NO. 6

| Meet At Level No. | Out-bound Train | In-bound Train | Delayed Train Direc. | Meet-Pnt. No. | Max. Cost Reduction | 1-meet-shift Min. Cost Increase | General-meet-shift Min. Cost Increase | 1-meet-shift Max. Net Benefit | General-meet-shift Max. Net Benefit | Meet-Shift Reduces Delay to Trains | |
|---|---|---|---|---|---|---|---|---|---|---|---|
| | | | | | | | | | | Outb. | Inb. |
| 1 | 01 | 01 | Outb | 2 | 1870 | 37908 | 37908 | −36038 | −36038 | 1, 2 | 3, 2 |
| 2 | 01 | 02 | Inb | 3 | 0 | 27470 | 27470 | −27470 | −27470 | — | 2 |
| 3 | 01 | 03 | Inb | 5 | 180 | 12750 | 12750 | −12570 | −12570 | 2 | 3 |
| 4 | 02 | 01 | Outb | 1 | 1053 | 0 | 0 | +1053 | +1053 | 2 | 2 |
| 5 | 02 | 02 | Inb | 3 | 1053 | 23040 | 490 | −21987 | +563 | — | 2 |
| 6 | 02 | 03 | Outb | 4 | 0 | 7820 | 0 | −7820 | 0 | 2 | — |

Meet-shift costs and benefits for plan number 1 of 5-train, 6-meet example. The objective value for the initial solution is 2923.

TABLE NO. 2

Structure of meet-shift cost reductions for first 3 meets of plan number 1 of 5-train, 6-meet example.

Meet at level 1: Outb. 01 and Inb. 01, shift from point 2 to point 3 (or below).
Reduction of Outb. 1 tardiness: in current solution Outb. 1 is delayed by Inb. 1 by 13 minutes, which, given schedule slack of 0, translates into tardiness of 13 minutes
Max. potential cost reduction: 1690.
Reduction of Inb. 2 tardiness: in current solution Inb. 2 is delayed by Outb. 1 at point 3 by 41 minutes, which, given schedule slack of 49, produces no tardiness.
Max. potential cost reduction: 0.
Reduction of Inb. 3 tardiness: in current solution Inb. 3 is delayed by Outb. 1 at point 5 by 3 minutes, which, given schedule slack of 0, translates into tardiness of 3 minutes. Reducing delay of Outb. 1 by 17 minutes can reduce the delay of Inb. 3 by 3 minutes.
Max. potential cost reduction: 180.
Reduction of Outb. 2 tardiness: in current solution Outb. 2 is delayed by Inb. 3 at point 4 by 11 minutes, which, given remaining schedule slack at point 4 of 17 minutes produces no tardiness.
Max. potential cost reduction: 0.
Total potential cost reduction: 1870, consisting of reduction of Outb. 1 tardiness from 13 to 0 minutes (1690 cost reduction) and reduction of Inb. 3 tardiness from 3 to 0 minutes (180 cost reduction).

Meet at level 2: Outb. 01 and Inb. 02, shift from point 3 to point 2 (or above).
Reduction of Inb. 2 tardiness: in current solution Inb. 2 is delayed by Outb. 1 at point 3 by 41 minutes, which, given schedule slack of 49, produces no tardiness.
Max. potential cost reduction: 0.

Meet at level 3: Outb. 01 and Inb. 03, shift from point 5 to point 4 (or above).
Reduction of Inb. 3 tardiness: in current solution Inb. 3 is delayed by Outb. 1 at point 5 by 3 minutes, which, given schedule slack of 0, translates into tardiness of 3 minutes.
Max. potential cost reduction: 180
Reduction of Outb. 2 tardiness: in current solution Outb. 2 is delayed by Inb. 3 at point 4 by 11 minutes, which, given remaining schedule slack at point 4 of 17 minutes, produces no tardiness.
Max. potential cost reduction: 0.
Total potential cost reduction: 180, consisting of reduction of Inb. 3 tardiness from 3 to 0 minutes.

TABLE NO. 3

Structure of meet-shift cost reductions for the last 3 meets of plan number 1 of 5-train, 6-meet example.

Meet at level 4: Outb. 02 and Inb. 01, shift from point 1 to point 2 (or below).
Reduction of Outb. 2 tardiness: in current solution Outb. 2 is delayed by Inb. 1 at point 1 by 20 minutes, which, given remaining schedule slack of 37 (after being delayed 5 minutes by the preceding train, Outb. 1 in order to maintain the 10 minutes minimum headway between following trains), produces no tardiness.
Max. potential cost reduction: 0.
Reduction of Inb. 2 tardiness: in current solution Inb. 2 is delayed by Outb. 2 at point 3 by 17 minutes, which, given remaining schedule slack of 8 minutes, produces tardiness of 9 minutes and tardiness cost of $13 \times 9^2 = 1053$.
Delay reduction of 17 minutes produces max. potential cost reduction: 1053.
Total potential cost reduction: 1053, consisting of reduction of Inb. 2 tardiness from 9 to 0 minutes.

Meet at level 5: Outb. 02 and Inb. 02, shift from point 3 to point 2 (or above).
Reduction of Inb. 2 tardiness: in current solution Inb. 2 is additionally delayed by Outb. 2 at point 3 by 17 minutes, which, given remaining schedule slack of 8 minutes, produces tardiness of 9 minutes and tardiness cost of $13 \times 9^2 = 1053$.
Delay reduction of 17 minutes produces max. potential cost reduction: 1053.

TABLE NO. 3-continued

Structure of meet-shift cost reductions for the last 3 meets of plan number 1 of 5-train, 6-meet example.

| | |
|---|---|
| reduction: | |
| Meet at level 6: | Outb. 02 and Inb. 03, shift from point 4 to point 5 (or below). |
| Reduction of Outb. 2 tardiness: | in current solution Outb. 2 is delayed by Inb. 3 at point 4 by 11 minutes, which, given remaining schedule slack of 17 minutes, produces no tardiness. |
| Max. potential cost reduction: | 0 |

TABLE NO. 4

Structure of meet-shift minimum cost increase for first three meets of plan number 1 of 5-train, 6-meet example.

| | |
|---|---|
| Meet at level 1: | Outb. 01 and Inb. 01, shift from point 2 to point 3 (or below). |
| One meet-shift minimum cost increase: | Outb. 1 arrives, without previous delays, at meetpoint 3 at 201 minutes. Inb. 1 arrives, without previous delays, at meetpoint 3 at 132 minutes. Minimum delay to Inb. 1 is 69 minutes which, given schedule slack of 15 minutes and no tardiness in plan 1, translates into 54 minutes of tardiness costing $13 \times 54^2 = 37908$. |
| General meet-shift minimum cost increase: | Same as the one-meet shift |
| Meet at level 2: | Outb. 01 and Inb. 02, shift from point 3 to point 2 (as above). |
| One-meet shift minimum cost increase: | Outb. 1 arrives, without previous delays, at meetpoint 2 at 160 minutes, and could depart, after delay, at 173 minutes. Inb. 2 arrives, without previous delays, at meetpoint 2 at 214 minutes. Minimum additional delay to Outb. 1 is 41 minutes which, given schedule slack of 0 minutes and total tardiness in plan 1 of 13 minutes, translates into additional cost of $10 \times (41 + 13)^2 - 10 \times 13^2 = 27470$. |
| General meet-shift minimum cost increase: | Same as the one-meet-shift |
| Meet at level 3: | Outb. 01 and Inb. 03, shift from point 5 to point 4 (or above). |
| One-meet shift minimum cost increase: | Outb. 1 arrives, with previous delay of 13 minutes, at meetpoint 4 at 221 minutes. Inb. 3 arrives, without previous delays, at meetpoint 4 at 246 minutes. Minimum additional delay to Outb. 1 is 25 minutes, translates into additional cost of $10 \times (25 + 13)^2 = 12750$. |
| General meet-shift minimum cost increase: | Same as the one-meet-shift. |

TABLE NO. 5

Structure of meet-shift minimum cost increase for last three meets of plan number 1 of 5-train, 6-meet example.

| | |
|---|---|
| Meet at level 4: | Outb. 02 and Inb. 01, shift from point 1 to point 2 (or below). |
| One meet-shift minimum cost increase: | Outb. 2 could arrive, without delay in this meet, at meetpoint 2 at 170 minutes. Inb. 1 arrives, without previous delays, at meetpoint 2 at 173 minutes. No minimum delay required to Inb. 01 by shifting this meet. |
| Minimum cost increase: | 0. |
| General meet-shift minimum cost increase: | 0. |
| Meet at level 5: | Outb. 02 and Inb. 02, shift from point 3 to point 2 (or above). |
| One-meet-shift minimum cost increase: | Outb. 2 arrives, with previous delay of 25 minutes, at meetpoint 2 at 190 minutes. Inb. 2 arrives, with previous delay of 41 minutes, at meetpoint 2 at 255 minutes with 8 minutes slack. Minimum additional delay to Outb. 2 is 65 minutes which, given its remaining schedule slack of 17 minutes and no tardiness in plan 1, translates into additional cost of $10 \times (65 - 17)^2 = 23040$. |
| General meet-shift minimum cost increase: | Outb. 2 could arrive, without previous delays, at meetpoint 2 at 170 minutes, with slack of 37 minutes. Inb. 2 could arrive, without previous delays, at meetpoint 2 at 214 minutes. Minimum additional delay to Outb. 2 is 44 minutes which, given remaining schedule slack of 37 minutes and no tardiness in plan 1, translates into additional tardiness of 7 minutes and minimum cost of $10 \times 7^2 = 490$. |
| Meet at level 6: | Outb. 2 and Inb. 03, shift from point 4 to point 5 (or below). |
| One-meet-shift minimum cost increase: | Outb. 2 arrives, with delay of 25 minutes, at meetpoint 5 at 252 minutes. Inb. 3 arrives, without previous delays, at meetpoint 5 at 232 minutes and departs, delayed by Outb. 1, at 235 minutes. Minimum additional delay to Inb. 3 is 17 minutes which, given total tardiness in plan 1 of 3 minutes, translates into additional tardiness of 17 minutes and cost of $20 \times (17 + 3)^2 - 20 \times 3^2 = 7820$. |
| General meet-shift minimum cost increase: | Outb. 2 could arrive, without previous delays, at meetpoint 5 at 227 minutes. Inb. 3 could arrive, without previous delays, at meetpoint 5 at 232 minutes with zero slack. There is no required delay in Inb. 3 and minimum cost increase of 0. |

TABLE NO. 7

| Meet At Level No. | Outbound Train | Inbound Train | Delayed Train Direc. | Meet Pnt. No. | Max. Cost Reduction | 1-meet-shift Min. Cost Increase | General-meet-shift Min. Cost Increase | 1-meet-shift Max. Net Benefit | General-meet-shift Max. Net Benefit | Meet-Shift Reduces Delay to Trains Outb. | Inb. |
|---|---|---|---|---|---|---|---|---|---|---|---|
| 1 | 01 | 01 | Outb | 2 | 1922 | 37908 | 37908 | −35986 | −35986 | 1, 2 | 1, 2, 3 |
| 2 | 01 | 02 | Inb | 3 | 0 | 39270 | 27470 | −39270 | −27470 | — | 2 |
| 3 | 01 | 03 | Inb | 5 | 180 | 12750 | 12750 | −12570 | −12570 | 2 | 3 |
| 4 | 02 | 01 | Outb | 2 | 0 | 0 | 0 | 0 | 0 | — | 1 |
| 5 | 02 | 02 | Inb | 3 | 52 | 23040 | 40 | −22988 | +12 | — | 2 |

TABLE NO. 7-continued

| Meet At Level No. | Out- bound Train | In- bound Train | Delay- ed Train Direc. | Meet- Pnt. No. | Max. Cost Reduc- tion | 1-meet- shift Min. Cost Increase | General- meet-shift Min. Cost Increase | 1-meet- shift Max. Net Benefit | General- meet-shift Max. Net Benefit | Meet-Shift Reduces Delay to Trains | |
|---|---|---|---|---|---|---|---|---|---|---|---|
| | | | | | | | | | | Outb. | Inb. |
| 6 | 02 | 03 | Outb | 4 | 0 | 3200 | 0 | −3200 | 0 | 2 | — |

Meet-shift costs and benefits for plan number 2 of 5-train, 6-meet example. This is the optimal solution with the objective value of 1922.

TABLE NO. 8

| Meet At Level No. | Out- bound Train | In- bound Train | Delay- ed Train Direc. | Meet- Pnt. No. | Max. Cost Reduc- tion | 1-meet- shift Min. Cost Increase | General- meet-shift Min. Cost Increase | 1-meet- shift Max. Net Benefit | General- meet-shift Max. Net Benefit | Meet-Shift Reduces Delay to Trains | |
|---|---|---|---|---|---|---|---|---|---|---|---|
| | | | | | | | | | | Outb. | Inb. |
| 1 | 01 | 01 | Outb | 2 | 1690 | 37908 | 37908 | −36218 | −36218 | 1 | 2 |
| 2 | 01 | 02 | Inb | 3 | 0 | 14720 | 14720 | −14720 | −14720 | — | 2 |
| 3 | 01 | 03 | Inb | 4 | 12750 | 180 | 0 | +12570 | +12570 | 1 | — |

Meet-shift costs and benefits for fathomed path ending with mode number 10 at level 3 of 5-train, 6-meet example. The objective value at node 10 is 14440.

TABLE NO. 9

| Solu- tion | Upper Bound | Lower Bound | Accel. Algo. | | Exact Algo. | | Implicit Enumeration | |
|---|---|---|---|---|---|---|---|---|
| | | | Nodes | CPU sec | Nodes | CPU sec | Nodes sear. | CPU sec. |
| 1. | 396604 | 0 | 200 | 1.31 | 200 | 1.56 | 200 | 1.56 |
| 2. | 395884 | 0 | —+ | —+ | —+ | —+ | 13499125 | 13.76 hrs |
| 3. | 375542 | 84328 | 399 | 2.63 | 399 | 3.14 | —+ | —+ |
| 4. | 373489 | 84328 | 671 | 4.20 | 671 | 4.45 | — | — |
| 5. | 372982 | 84328 | 939 | 5.52 | 939 | 6.28 | — | — |
| 6. | 372282 | 84328 | 1181 | 7.08 | 1181 | 7.86 | — | — |
| 7. | 351018 | 84328 | 1374 | 8.13 | 1374 | 8.91 | — | — |
| 8. | 317278 | 84328 | 1844 | 10.48 | 1844 | 11.27 | — | — |
| 9. | 312676 | 84328 | 1986 | 11.80 | 1986 | 12.58 | — | — |
| 10. | 309974 | 84328 | 2239 | 13.38 | 2239 | 14.16 | — | — |
| 11. | 309714 | 84328 | 2630 | 15.73 | 2630 | 16.52 | — | — |
| 12. | 244144 | 84328 | 2791 | 16.78 | 2791 | 17.56 | — | — |
| 13. | 242352 | 84328 | 3067 | 18.61 | 3067 | 19.39 | — | — |
| 14. | 236042 | 84328 | 3151 | 19.41 | 3151 | 20.19 | — | — |
| 15. | 234470 | 84328 | 3225 | 20.19 | 3225 | 20.97 | 56075463 | 57.84 hrs |
| 16. | 225799 | 84328 | 3311 | 20.97 | 3311 | 21.48 | 56075772 | 57.85 hrs |
| 17. | 225266 | 84328 | 3346 | 21.50 | 3346 | 22.28 | — | — |
| 18. | 224954 | 84328 | 3379 | 22.03 | 3379 | 22.80 | — | — |
| 19. | 208847 | 84328 | 3400 | 22.55 | 3400 | 23.33 | — | — |
| 20. | 205197 | 92946 | 3627 | 24.64 | 3825 | 25.95 | 56076159 | 57.86 hrs |
| 21. | 203144 | 93913 | 3827 | 28.05 | 4025 | 27.52 | 56223185 | 58.00 hrs |
| 22. | 202527 | 101641 | — | — | — | — | 72508087 | 75.41 hrs |
| 23. | 202444 | 101641 | 4218 | 30.67 | 4416 | 29.61 | >90 mill. | >78 hrs |
| 24. | 202424 | 101641 | 22936 | 139.98 | >52 hr | >52 hr | >90 mill. | >78 hrs |
| — | Search | finish: | 36500 | 230.95 | >52 hr | >52 hr | >90 mill. | >78 hrs |

Comparison of pure implicit enumeration and lower bound-based pruning algorithms on a large-scale example. Scheduling lane, HAV-SPO, 20% double-track, 55 track segments, 76 out. + 77 inb. trains, average schedule slack per train 19.9%, 98 meets.
+Implicit enumeration did not employ the one-meet-shift local improvement heuristic.

APPENDIX A

Basic Implicit Enumeration Algorithm

Notation, Definitions and Data

To begin the description of the algorithm, let us first define the data nomenclature and notation. Terms variable and constant are used in the computer science meaning of the words. Italicized lower-case characters and capitalized italic words represent variables and indices. Variables can hold numeric values or logical values, e.g., TRUE or FALSE Note that the opposite directions Outbound and Inbound, denoting directions along the railroad line, can be substituted by the appropriate geographical directions normally used by a particular railroad, such as Westbound and Inbound.

A line is a segment of the railroad defined by the two major stations or terminals at its ends, meetpoints inside the lane, and the trains scheduled to run across the entire lane or some portion of it. It is assumed that all trains arriving and/or departing from a station at the end of a lane have target arrival/departure times at that station. *Meetpoints* are any points along the lane, including the end stations, where trains can wait in order to meet with each other and to overtake or be overtaken, or any points where trains are scheduled to arrive at a particular time and/or perform work there for a prespecified time. Meetpoints include yards, terminals, crew-change and train inspection points, side-tracks (sidings), beginnings and ends of double track sections and crossovers (points within a double-track section where trains can cross-over to the other track). They can also include signal locations.

Let all meetpoints on the lane be consecutively numbered in the Outbound direction, starting with the station at the Inbound end of the lane, whose index, $m$, is equal to 1 and ending with the station at the Outbound end whose index is equal to $N$, the total number of meetpoints on the lane. A type of the meetpoint, $MP\_Type^m$, be represented by one of four characters: 'S' represents a siding or any other meetpoint (e.g., station, signal) on the single-track segment of the railroad line; 'D' represents a beginning of the double-track section, observing in Outbound direction, 'T' represents the end of a double-track section, and 'R' represents any other meetpoint inside the double track section (e.g., a reporting station) which is not the beginning or the end of a double-track section.

Variable arrays $a_i^m$ and $d_i^m$ represent the arrival and departure times, respectively, of the Outbound train $i$ at a meetpoint $m$. Analogously, $\hat{a}_j^m$ and $\hat{d}_j^m$ denote the arrival and departure times of the Inbound train $j$ at the meetpoint $m$.

Step 0 (Initialization)

Assign to each train $i$ following data: the index $StartPoint_i$ of the first (starting) and the index $EndPoint_i$ of the last point on train's itinerary within the lane as well as any intermediate scheduled points; the scheduled arrival time $a_i^m$ and departure time $d_i^m$ for $m = StartPoint_i$ and $EndPoint_i$, and any intermediate scheduled points, (the minimum dwell time at a scheduled point $m$ is given by $d_i^m - a_i^m$); and the vector of minimum travel times $\tau_i = (\tau_i^{\sigma_i}, \ldots, \tau_i^m, \tau_i^{m+1}, \ldots, \tau_i^{\varepsilon_i-1})$, where $\tau_i^m$ represents the minimum running time from meetpoint $m$ to $m+1$. Also, for all trains assign $f_i^m(\cdot)$, a tardiness cost function of the lateness of train $i$ at meetpoint $m$ relative to the scheduled arrival time $a_i^m$ for all scheduled points of train $i$.

Divide each train with intermediate scheduled points into a chain of 'legs' with only two scheduled points, one at each end of the leg. Each leg will be considered as a separate train linked through its earliest possible departure time to the previous leg; i.e., a succeding leg of a same train cannot depart frpm its start point before the previous leg has arrived at its end point, plus any scheduled station dwell time.

Also, any train that is scheduled to be overtaken should be split into as many legs as there are overtaking points plus one (if the overtaking point is a siding, it should be of adequate length). Assign to each train (leg) a starting point, $\sigma_i$ or $\hat{\sigma}_j$, and ending point, $\varepsilon_i$ or $\hat{\varepsilon}_j$, ordered in the direction of train travel.

Order all Outbound train legs into an array of Outbound train legs, and all Inbound trains into an array of Inbound trains. Trains should be ordered in the desired order of departure from their starting points. All suceceding 'legs' of the same original train must be ordered *after* the previous leg. All trains which are scheduled to be overtaken must be ordered *before* their passing train up to the passing point, and *after* the passing train beyond the passing point.

Note that, beside the abovementioned restrictions, overtaking and ordering of trains is arbitrary: they could be determined by a user or by a master algorithm. In the current implementation of the algorithm, a heuristic ordering based on the scheduled arrival and departure times, tardiness cost and train speeds was used. Train overtaking was planned only in following cases: at scheduled points if the arrival of the overtaken train at a point was scheduled before and the departure after the passing train, and at unscheduled points if the difference in train speeds would cause a faster following train to be delayed by a slower preceding train to the point of incurring a tardiness cost.

Based on train leg ordering, each train leg $i$ is assigned $\pi_i^m$, the index of the imediately preceding train leg at meetpoint $m$ for all meetpoints $m$ between start ($\sigma_i$) and end ($\varepsilon_i$) point. Train $i$ can arrive at meetpoint $m$ only after train $\pi_i^m$ arrival time plus the minimum headway, $\eta_{\pi_i^m}^m$, (governed by the signalling system) that allows train leg $i$ to follow train leg $\pi_i^m$ through the meetpoint $m$ without any delay.

Add a dummy Outbound train 0 to the beginning of the array of Outbound train legs, and a dummy Inbound train 0 to the beginning of the array of Inbound train legs: these two ficitious trains are used only to simplify the logic of the algorithm. Set $\sigma_0$ and $\varepsilon_0$ to 1, and set $\hat{\sigma}_0$ and to $\hat{\varepsilon}_0$ to $N$.

Set the *CurrentPoint* of each train to its starting point ($\sigma_i$ or $\hat{\sigma}_j$).

Set *CurrentLevel* = 0;

Set $i = 0, j = 0$;

Set *PreviousLevel* = UP;

Set *UpperBound* to a very large number;

Set *CumulativeCost[ CurrentLevel ]* = 0;

Set *NumberOfPlans* = 0;

Set *NoOfOutTr* to the number of Outbound train legs ;

Set *NoOfInbTr* to the number of Inbound train legs ;

Set time limit for the algorithm run; Set *Tolerance*;

Comments which are not part of the algorithm are given between braces, '{' and '}'.

The following provides descriptions of some procedures used in main steps of the algorithm:

*update_train_times_for*( TrainDirection, TrainIndex );
 BEGIN { Procedure }

> For train going in *TrainDirection* with index *TrainIndex*, starting with the train's *CurrentPoint* and ending with the train's *EndPoint*, set the arrival and departure times to the minimum values consistent with the minimum train free running times, station dwell time (if any), and minimum headways between following trains (i.e., between trains going in the same direction). More precisely, for $m =$ train's $i$ *CurrentPoint* to train's $i$ *EndPoint*$-1$, set $a_i^{m+1}$ and $d_i^{m+1}$ to maximum of $d_i^m + \tau_i^m$ and $d_{\pi_i^m}^m + \eta_{\pi_i^m}^m$. At meetpoints (stations) where the train is scheduled to spend some time, set $d_i^m$ to $a_i^m$ plus the dwell time.
>
> Record any new delays to the train caused by preceding trains and update the train's remaining slack in the schedule by substracting any additional delay from the initial slack value. If the remaining schedule slack is negative, then the train is going to be late at least by the amount by which the slack is negative.

END: { Procedure }

*retrace_train*( TrainDirection, TrainIndex );
    BEGIN { Procedure }

For train going in *TrainDirection* with index *TrainIndex*, set the train's *CurrentPoint*, arrival and departure times, *CurrentPoint*, and train's remaining schedule slack to the values they had at the search level above the *CurrentLevel*; i.e., before train's arrival and departure times were updated at the *CurrentLevel*.

END: { Procedure }

*retrace_to_the_level_above*( CurrentLevel, i, j, m );
    BEGIN { Procedure }

{ The purpose of this procedure is to restore variables to the values they had at the level in the search tree just before the *CurrentLevel* was reached. }

Set *PreviousLevel* = DOWN; Set *CurrentLevel* = *CurrentLevel* - 1;

*retrace_train*( Outbound, i ); *retrace_train*( Inbound, j );

Set: i, j, m, to the values they had at the level above the current search level.;

END: { Procedure }

*First_potentially_conflicting_train_for*( Outbound, i, j ): *train_index*;
    BEGIN { Function }

{ This function returns maximum of: index of the first train leg in the Inbound train legs array that potentially conflicts with the Outbound train leg $i, j+1$ (index of the current Inbound train, plus 1). }

Set *train_index* = 0; Set *Train_Found* = FALSE ;

REPEAT

Set *train_index* = *train_index* + 1 ;
        IF Inbound train leg *train_index* paths cross, i.e., if they are supposed to be at the same place at the same time
        THEN Set *Train_Found* = TRUE ;

UNTIL *train_index* = $j+1$
    OR *Train_Found* = TRUE;

RETURN *train_index*;

END; { Function }

Step 1
{Determine the next train conflict and meetpoints for the conflict resolution, updating train arrival/departure times}
IF *PreviousLevel* = UP THEN
    Set *CurrentLevel* = *CurrentLevel* + 1;
    IF there are NOT more Inbound trains, with index greater than $j$, which may potentially conflict with outbound train $i$ THEN
        Set $i = i + 1$;
        *update_train_times_for*( Outbound, $i$ );
        IF Out. train $i$ was made additionally late by Out. trains in front of it
            THEN Increment *CumulativeCost[ CurrentLevel ]* and decrease train's $i$ remaining schedule slack accordingly;
        Set $j$ = Min( $j + 1$, *First_potentially_conflicting_train_for*( Outbound, $i$, $j$ ) );
    END { If no more conflicts for $i$ }
    ELSE Set $j = j + 1$;
    *update_train_times_for*( Inbound, $j$ );
    If Inb. train $j$ was made additionally late by Inb. trains in front of it
    THEN Increment *CumulativeCost[ CurrentLevel ]* and decrease train's $j$ remaining schedule slack accordingly;
    Find the two closest meetpoints, *BestMP_for_InbTr* and *BestMP_for_OutTr*, (with the siding length that can accomodate at least one of the two meeting trains if not on double track) above and below the point where trains' paths intersect:
    {meeting at *BestMP_for_InbTr* would delay Outbound train $i$, and meeting at *BestMP_for_OutTr* would delay the Inbound train $j$ }
    IF train paths intersect within a double-track segment OR train paths do not intersect THEN
        Set *TrainPairInConflict[ CurrentLevel ]* = FALSE
    ELSE
        Set *TrainPairInConflict[ CurrentLevel ]* = TRUE;
        IF the *CurrentPoint* of Inbound train's $j$ preceding train at *BestMP_for_InbTr*, $\pi_{i,j}^{BestMP\_for\_InbTr}$, is *BestMP_for_InbTr*
        AND *BestMP_for_InbTr* is not equal to *StartPoint$_j$* or *EndPoint$_j$*
        AND $MP\_Type^{BestMP\_for\_InbTr}$ = 'S' THEN
            { siding is occupied by previous trains, cannot meet there at this branch of the search tree }
            Set $m$ = *BestMP_for_OutTr* ;
            Set *Next_m* = $m$;
    END {If}
    ELSE
        Set $m$ to that one of the two closest meetpoints that would result in lower additional lateness cost, or, if meeting at either of two points would not cause additional lateness to either train, one that would cause the lower train delay;
        Set *Next_m* to the other of two meetpoints;
    END: {Else}

END: {Else}
END {If *PreviousLevel* = UP}
ELSE IF *TrainPairInConflict[ CurrentLevel ]* AND *Next_m* $\neq$ $m$ THEN
    Set *PreviousLevel* = UP;
    Set $m$ = *Next_m*

END: {Else If}
ELSE
    *retrace_to_the_level_above*( *CurrentLevel*, $i$, $j$, $m$ );
    GOTO Step 4 ;
END: {Else}

Step 2
{Delay one of the conflicting trains, update remaining schedule slack and cumulative cost}
IF *TrainPairInConflict[ CurrentLevel ]* THEN
    Set *CurrentPoint* of Out. train *i* and Inb. train *j* to *m*;
    Set departure time at *m* of train that arrived earlier at *m* to arrival time of the other train plus the appropriate acceleration delay ;
    IF the delayed train is Outbound THEN *update_train_times_for*( Outbound, *i* )
    ELSE *update_train_times_for*( Inbound, *j* );
    Decrease remaining schedule slack of the delayed train by the amount of new delay ;
    IF the delayed train is additionally late (i.e. remaining slack < 0)
        THEN Increment *CumulativeCost[ CurrentLevel ]* for the additional tardiness cost ;
END ; {If *TrainPairInConflict[ CurrentLevel ]*}

Step 3
{Determine if the node is fathomed and if we have a new plan/solution}
IF *CumulativeCost[ CurrentLevel ]* < *UpperBound* THEN
    IF *i = NoOfOutTr* AND *j = NoOfOutTr* THEN { all meets resolved }
        Set *UpperBound = CumulativeCost[ CurrentLevel ]*;
        Save best plan (solution) so far, under number *NumberOfPlans*;
        Set *NumberOfPlans = NumberOfPlans + 1*;
        *retrace_to_the_levelAbove*( *CurrentLevel, i, j, m, CumulativeCost* );
    END; {If}
END {If *CumulativeCost[ CurrentLevel ]* < *UpperBound* }
ELSE *retrace_to_the_levelAbove*( *CurrentLevel, i, j, m* );
{ this node in the branch-and-bound tree is fathomed }

Step 4
{Check for algorithm stop conditions}
IF *CurrentLevel* = 0 THEN { retraced to the root of the search tree }
    Set *OptimalityProven* = TRUE;
    STOP.
    {Search completed. *UpperBound* is the minimum objective value, optimum solution is the latest plan.}
ELSE IF *UpperBound - LowerBound* ≤ *Tolerance* THEN
    STOP.
    {Optimal or near-optimal solution found, search stopped; *UpperBound* is the best objective value found and the latest plan is the best solution found.}
ELSE IF time limit exceeded AND *NumberOfPlans* > 0 THEN
    STOP.
    {Search interrupted. *UpperBound* is the best objective value found and the latest plan is the best solution found.}
ELSE GOTO Step 1: { continue search }

The one-meet-shift heuristic is added to the basic enumeration algorithm by changing Step 3 as follows:
Step 3
{If we have a better plan/solution, try to improve it by one-meet shifts}
IF *CumulativeCost[ CurrentLevel ]* < *UpperBound* THEN
    IF *i = NoOfOutTr* AND *j = NoOfOutTr* THEN { all meets resolved }
        Set *UpperBound = CumulativeCost[ CurrentLevel ]*;
        Save best plan (solution) so far, under number *NumberOfPlans*;
        Set *NumberOfPlans = NumberOfPlans + 1*;
        Calculate maximum cost reduction and minimum cost increase associated with one-meet-shift for all levels of the plan number *NumberOfPlans*;
        Calculate one-meet-shift maximum net benefit for all levels as one-meet-shift maximum cost reduction for the level minus one-meet-shift minimum cost increase for the level ;
Assign levels with positive maximum net benefit to the *PotentialLevelsSet*;
WHILE *PotentialLevelsSet* NOT EMPTY DO Remove the lowest level number from the *PotentialLevelsSet* and test a solution with the meet at that level shifted to the other of the two best meetpoints:
    IF the above solution is better than the best previous solution
      THEN GOTO Step 3;
END; {While}
END; {If}
END {If *CumulativeCost[ CurrentLevel ]* < *UpperBound*}
ELSE *retrace_to_the_levelAbove( CurrentLevel, i, j, m )*;
{ this node in the branch-and-bound tree is fathomed }

The lower bound-based elimination of branches from a plan path and from a fathomed path in the exact prunning algorithm is implemented by changing Step 3 of the basic enumeration algorithm as follows:

Step 3
IF *CumulativeCost[ CurrentLevel ]* < *UpperBound* THEN
    IF $i$ = *NoOfOutTr* AND $j$ = *NoOfOutTr* THEN { all meets resolved }
      Set *PlanCost[ NoOfPlans ]* = *CumulativeCost[ CurrentLevel ]*;
      Set *UpperBound* = *CumulativeCost[ CurrentLevel ]*;
      Set *NumberOfPlans* = *NumberOfPlans* + 1;
      Set *BranchingPlanNo* = *NumberOfPlans*;
      Save best plan (solution) so far, as plan no. *NumberOfPlans*;
      Calculate one-meet-shift and general meet-shift maximum cost decrease and minimum cost increase for all levels with conflict in the plan, and store under plan number *NumberOfPlans*;
      Calculate global *LowerBound* by merging cost reductions for meets with no general meet-shift minimum cost increase and adding maximum general meet-shift net benefits for meets with positive both the general meet-shift net benefit and cost increase;
      Set *PotentialOutTrainsSet[ BranchingPlanNo ]* to empty;
      Set *PotentialInbTrainsSet[ BranchingPlanNo ]* to empty;
      REPEAT
        IF general meet-shift net benefit from plan number *BranchingPlanNo* of the meet at the current level is positive THEN
          Add $i$ to *PotentialOutTrainsSet[ BranchingPlanNo ]*;
          Add $j$ to *PotentialInbTrainsSet[ BranchingPlanNo ]*;
        END; {If}
        *retrace_to_the_levelAbove( CurrentLevel, i, j, m )*;
      UNTIL one-meet-shift net benefit of the meet at the level below is positive
      OR shift of the meet at the level below could benefit (decrease their delay) some train(s) in *PotentialOutTrainsSet[ BranchingPlanNo ]* and *PotentialInbTrainsSet[ BranchingPlanNo ]*;
      Set *LastBranchFromPlanLevel* = *CurrentLevel*;
    END; {If}
END {If *CumulativeCost[ CurrentLevel ]* < *UpperBound* }

ELSE {the path ending with the current node has been fathomed}
    Set *BranchingPlanNo* = 0;
    Set *PlanCost[ BranchingPlanNo ]* = *CumulativeCost[ CurrentLevel ]*;
    Set *MergedMaxNetBenefit* = 0;
    Set *PotentialOutTrainsSet[ BranchingPlanNo ]* to empty;
    Set *PotentialInbTrainsSet[ BranchingPlanNo ]* to empty;
    REPEAT

```
IF CurrentLevel = LastBranchFromPlanLevel THEN
    Set BranchingPlan.No = NumberOfPlans;
    Set MergedMaxNetBenefit = PlanCost[ NoOfPlans ];
END: {If}
IF BranchingPlan.No = 0 THEN
```
Calculate one-meet-shift and general meet-shift maximum cost decrease and minimum cost increase for *CurrentLevel* in the fathomed path. and store under pian number 0;

Calculate one-meet-shift and general meet-shift maximum net benefit for *CurrentLevel* in the fathomed path as maximum cost reduction for the level minus minimum cost increase for the level. and store under plan number 0;
```
END: {If}
IF general meet-shift net benefit for CurrentLevel from plan number BranchingPlan.No
is greater than 0 THEN
    IF MergedMaxNetBenefit = 0 THEN Set MergedMaxNetBenefit to general meet-
    shift net benefit for CurrentLevel from plan number BranchingPlan.No
```
ELSE merge benefit for *CurrentLevel* from plan number *BranchingPlan.No* with positive general meet-shift benefits of all levels below *CurrentLevel* until the end of fathomed path. and set *MergedMaxNetBenefit* to the merged value;
Add *i* to *PotentialOutTrainsSet[ BranchingPlanNo ]*;
Add *j* to *PotentialInbTrainsSet[ BranchingPlanNo ]*;
```
END: {If}
retrace_to_the_level_above( CurrentLevel. i, j, m );
UNTIL ( PlanCost[ BranchingPlan.No ] - MergedMaxBenefit) < UpperBound AND
```
( one-meet-shift net benefit of the meet at the level below is positive OR
shift of the meet at the level below could benefit (decrease their delay) some train(s) in *PotentialOutTrainsSet[ BranchingPlan.No ]* and *PotentialInbTrainsSet[ BranchingPlan.No ]*);
```
IF BranchingPlan.No ≠ 0 THEN Set LastBranchFromPlanLevel = CurrentLevel;
END: {Else}
```

Accelerated (Heuristic) Lower Bound-Based Algorithm

The accelerated (heuristic) lower bound-based algorithm differs from the exact lower bound-based algorithm only in Step 3, with regard to the path of the search tree used for calculation of maximum meet-shift cost reduction and minimum cost increase.

In particular, the only difference from the exact lower bound-based algorithm is in not keeping track of the level of the last branch from the plan, *LastBranchFromPlanLevel*. and continuing to branch from the fathomed path regardless of the previous branch level, which could have been from a plan. The differences could be easily detected by comparing the statements that refer to *LastBranchFromPlanLevel* in the exact algorithm versus the absence of these statements in the accelerated algorithm.

This small change significantly decreases the amount of branches and nodes searched but produces a potentially less optimal solution.

Step 3
```
IF CumulativeCost[ CurrentLevel ] < UpperBound THEN
    IF i = NoOfOutTr AND j = NoOfOutTr THEN { all meets resolved }
        Set PlanCost[ NoOfPlans ] = CumulativeCost[ CurrentLevel ];
        Set UpperBound = CumulativeCost[ CurrentLevel ];
        Set NumberOfPlans = NumberOfPlans + 1;
        Set BranchingPlanNo = NumberOfPlans;
```
Save best plan (solution) so far, as plan no. *NumberOfPlans*;
Calculate one-meet-shift and general meet-shift maximum cost decrease and minimum cost increase for each conflicting level in the plan, and store under plan number *NumberOfPlans*;
Calculate one-meet-shift and general meet-shift maximum net benefit for all levels in the plan as maximum cost reduction for the level minus minimum cost increase for the level, and store under plan number *NumberOfPlans*; ;
Calculate global *LowerBound* by merging cost reductions for meets with no general meet-shift min. cost increase and adding max. general meet-shift net benefits for meets with positive both the general meet-shift net benefit and cost increase;
Add levels with positive one-meet-shift maximum net benefit to the *PotentialLevelsSet*;
WHILE *PotentialLevelsSet* NOT EMPTY DO
    Remove the lowest level number from the *PotentialLevelsSet* and test a solution with the meet at that level shifted to the other of the two best meetpoints;
    IF the above solution is better than the best previous solution
        THEN GOTO Step 3;
END; {While}
Set *PotentialOutTrainsSet[ BranchingPlanNo ]* to EMPTY;
Set *PotentialInbTrainsSet[ BranchingPlanNo ]* to EMPTY;
REPEAT
    IF general meet-shift net benefit of the meet at the current level is positive THEN
        Add *i* to *PotentialOutTrainsSet[ BranchingPlanNo ]*;
        Add *j* to *PotentialInbTrainsSet[ BranchingPlanNo ]*;
    END; {If}
    *retrace_to_the_levelabove( CurrentLevel, i, j, m )*;
UNTIL one-meet-shift benefit of the meet at the level below is positive OR
shift of the meet at the level below could benefit (decrease their delay) some train(s) in *PotentialOutTrainsSet[ BranchingPlanNo ]* and *PotentialInbTrainsSet[ Branching-PlanNo ]*;
END: {If}
END {If *CumulativeCost[ CurrentLevel ] < UpperBound* }

ELSE {the path ending with the current node has been fathomed}
    Set *BranchingPlanNo* = 0;
    Set *PlanCost[ BranchingPlanNo ] = CumulativeCost[ CurrentLevel ]*;
    Set *MergedMaxNetBenefit* = 0;
    Set *PotentialOutTrainsSet[ BranchingPlanNo ]* to empty;
    Set *PotentialInbTrainsSet[ BranchingPlanNo ]* to empty;

REPEAT
    Calculate one-meet-shift and general meet-shift maximum cost decrease and minimum cost increase for *CurrentLevel* in the fathomed path, and store under plan number 0;
    Calculate one-meet-shift and general meet-shift maximum net benefit for *CurrentLevel* in the fathomed path as maximum cost reduction for the level minus minimum cost increase for the level, and store under plan number 0;
    IF general meet-shift net benefit for *CurrentLevel* from plan number *BranchingPlanNo* is greater than 0 THEN
        IF *MergedMaxNetBenefit* = 0 THEN Set *MergedMaxNetBenefit* to general meet-shift maximum net benefit for *CurrentLevel* from plan number *BranchingPlanNo*
        ELSE merge benefit for *CurrentLevel* from plan number *BranchingPlanNo* with positive general meet-shift benefits of all levels below *CurrentLevel* until the end of fathomed path, and set *MergedMaxNetBenefit* to the merged value;
        Add *i* to *PotentialOutTrainsSet[ BranchingPlanNo ]*;
        Add *j* to *PotentialInbTrainsSet[ BranchingPlanNo ]*;
    END; {If}
    *retrace_to_the_levelabove( CurrentLevel, i, j, m )*;

UNTIL (*PlanCost[ BranchingPlanNo ] − MergedMaxNetBenefit*) < *UpperBound* AND
( one-meet-shift net benefit of the meet at the level below is positive OR
shift of the meet at the level below could benefit (decrease their delay) some train(s)

in *PotentialOutTrainsSet[ BranchingPlanNo ]* and *PotentialInbTrainsSet[ BranchingPlanNo ]*);

END; {Else}

What is claimed is:

1. A method for controlling the movement of vehicles traveling in a transportation system, comprising the steps of:

(a) inputting data into a processor indicative of at least i) a physical description of a routing network on which said vehicles travel, and ii) a proposed transportation schedule for each vehicle traveling in said transportation system, each proposed schedule having at least a time of departure from a specified origin and a time of arrival at a specified destination;

(b) identifying potential conflicts between two vehicles based on said proposed schedules, and a set of conflict resolution points based upon said routing network and said potential conflicts, each conflict resolution point being a meetpoint at which one of said two vehicles can be delayed to permit the other of said two vehicles to pass thereby avoiding a collision between said two vehicles, said potential conflicts being chronologically sequenced based on said proposed schedules and said conflict resolution points being identified according to said chronological sequence and taking into consideration a possible delay of said one vehicle in each identified potential conflict;

(c) generating an initial meet-pass plan using a depth-first search bounded by delay costs arising from delaying said one vehicle at one of said identified conflict resolution points for each potential conflict for an amount of time such that each potential conflict is resolved without a collision, said initial plan having a delay cost substantially equal to an accumulation of all delay costs resulting from said one vehicle being delayed in each potential conflict, said delay cost defining an upper bound;

(d) estimating a maximum cost benefit arising from shifting from said one conflict resolution point used to resolve each respective potential conflict in said initial meet-pass plan to another conflict resolution point, said shifting resulting in a potential alternative plan;

(e) generating alternative meet-pass plans using the depth-first search bounded by delay costs from said other conflict resolution point in each potential alternative plan where said estimated maximum cost benefit is positive, said alternative meet-pass plan having a delay cost substantially equal to an accumulation of all delay costs resulting from said one vehicle being delayed in each potential conflict, and if said delay cost of said alternative meet-pass plan so generated is lower than said upper bound, the step further comprising replacing said upper bound with said delay cost of said alternative meet-pass plan;

(f) identifying one meet-pass having a substantially minimal delay cost among said initial and alternative meet-pass plans so generated by comparing each alternative meet-pass plan generated to said upper bound; and (g) controlling the movement of said vehicles according to said identified meet-pass plan, said vehicles being delayed at said identified conflict resolution points for the amount of time specified by said identified meet-pass plan.

2. The method of claim 1, wherein a substantially minimal delay cost is determined according to at least one of the following conditions:

i) said upper bound is zero;

ii) said upper bound is less than or equal to a predetermined value indicative of an acceptable delay cost;

iii) a predetermined time has expired for generating said one identified meet-pass plan and at least said initial meet-pass plan has been generated; and iv) substantially all alternative meet-pass plans according to step (e) have been generated.

3. The method of claim 1, further comprising the step of:

(h) providing an output indicative of a measure of feasibility of said proposed transportation schedules.

4. The method of claim 1, wherein the step of estimating a maximum cost benefit further comprises the step of:

determining a one meet shift maximum net benefit for each potential conflict by shifting said conflict resolution point at which said one vehicle is delayed in said initial meet-pass plan to a conflict resolution point at which said other vehicle of said two vehicles is delayed defining an alternate conflict resolution point;

said step of generating said alternative meet-pass plan being initiated from each alternate conflict resolution point if said one meet shift maximum net benefit so determined is positive.

5. The method of claim 1, wherein the step of estimating delay costs, further comprises the step of:

determining a general meet shift maximum net benefit for each potential conflict by shifting from the conflict resolution at which the one vehicle is delayed in the initial meet-pass plan to a conflict resolution point at which the other vehicle of the two vehicles is delayed defining an alternate conflict resolution point;

generating a lower bound indicative of a lowest delay cost arising from any possible meet-pass plan, said lower bound being further indicative of said delay cost of said initial meet-pass plan minus a sum of one or more of said general meet shift maximum net benefits;

said identified meet-pass plan being determined based on a difference of said upper bound and said lower bound being less than a predetermined tolerance.

6. The method of claim 5, wherein said lower bound is generated after merging said delay costs of each vehicle having at least one of i) a lower delay cost at said identified conflict resolution point and ii) a lesser amount of time delayed at said alternate conflict resolution point as compared to the amount of time delayed at said identified conflict resolution point.

7. The method of claim 1, wherein said vehicles are trains.

8. The method of claim 1, wherein said proposed schedules are revised based upon said identified meet-pass plan.

9. In a transportation system having a plurality of vehicles, each vehicle having a scheduled departure time from an origin and a scheduled arrival time at a destination, there being a routing network defined by travel paths between the origin and destination, and delay points along each path for permitting one vehicle to wait until a second vehicle passes so as to avoid collision, a method comprising the steps of:

(a) inputting into a computer system at least one of the following data indicative of:
  (i) a description of said routing network;
  (ii) speed and mobility characteristics of each vehicle;
  (iii) proposed transportation schedules for each vehicle specifying at least scheduled departure and arrival times;
  (iv) a vehicle tardiness function for each vehicle indicative of an importance of each vehicle arriving at its destination on time;
  (v) any changes in said routing network,
  (vi) any changes in a physical characteristic of any path in said routing network; and,
  (vii) vehicle status in said routing network;

(b) initializing at least one of:
  (i) a first variable indicative of a maximum cost due to vehicle delays for said proposed transportation schedules input in step (a), said first variable defining an upper bound;
  (ii) a second variable indicative of the minimum cost due to vehicle delays for said proposed transportation schedules input in step (a), said second variable defining a lower bound;

(c) grouping said vehicles into vehicle pairs having a first and second vehicle comprising substantially all possible combinations;

(d) determining, based upon the data input in (a), whether a potential conflict exists between said two vehicles of each vehicle pair, and if so, identifying said vehicle pair as a level, (e) identifying substantially all delay points at a first level where at least one vehicle in said vehicle pair could be delayed so that the second vehicle in said pair could pass without collision therebetween, defining said delay points so identified as conflict resolution points, (f) selecting one conflict resolution point identified in step (e) for said first level;

(g) determining an amount of time at least one vehicle in said vehicle pair must be delayed at said selected conflict resolution point so that the second vehicle can pass by without collision therebetween, said amount of time said vehicle is delayed defining a delay time;

(h) updating said vehicles' scheduled departure and arrival times based upon said delay times determined in step (g);

(i) repeating steps (e) through (i) for each level identified in step (d);

(j) calculating a delay cost, based upon each delay time determined in step (g) and said respective vehicle tardiness functions input in step (a), for each vehicle delayed in step (g);

(k) calculating a cumulative delay cost by adding together said delay costs calculated in step (j), and defining said cumulative delay cost as a plan cost when said delay costs for substantially all levels have been added together;

(l) defining the arrival and departure times for each vehicle at each point along the vehicle's travel path between said origin and destination as a current plan if said plan cost is less than said upper bound, and setting said upper bound equal to said plan cost;

(m) selecting an alternative conflict resolution point from said conflict resolution points identified in step (e) but not selected in step (f);

(n) identifying substantially all vehicles whose delays determined in step (g) could be reduced by shifting said selected conflict resolution point to said alternative conflict resolution point selected in step (m), the vehicles so identified defining benefitted vehicles;

(o) estimating, based on said alternative conflict resolution point, an amount indicative of a potential net cost reduction by computing a difference in potential delay reductions at other levels and any delay increases, where said delay reductions and delay increases result from shifting to said alternate conflict resolution point in step (m), said difference computed defining a first maximum net benefit;

(p) repeating step (o), wherein the computation is based on said vehicles arriving at said alternate conflict resolution point on time with respect to their scheduled arrival times, said difference so computed defining a second maximum net benefit;

(q) estimating, based on said alternative conflict resolution point, any cost reduction to said plan cost by merging delays of vehicles which are delayed at different levels over at least partially the same time interval thereby determining each vehicle's actual delay time, said estimated cost reduction defining a merged cost decrease;

(r) redefining said lower bound by subtracting at least one of: (i) said second maximum net benefit; and (ii) said merged cost decrease (s) defining said set of conflict resolution points selected in step (f) and (m), the vehicles delayed in step (g) and their respective delay times, and said cumulative delay cost as a fathomed path if any cumulative delay cost is greater than said upper bound, and redefining the cumulative delay cost of said path as said upper bound;

(t) identifying vehicle pairs at levels having both a positive second maximum net benefit and negative first maximum net benefit, and defining the vehicles of said vehicle pairs so identified as potential vehicles;

(u) repeating steps (h) through (l) based on said alternate conflict resolution point selected in step (m) when at least one of the following occurs:
  (i) said level for which said alternate conflict resolution point has been selected has a positive first maximum net benefit; and
  (ii) at least one benefitted vehicle is a potential vehicle for said level and second maximum net benefits at previous levels are negative;

(v) repeating step (u) until one of the following events:
  (i) no alternative conflict resolution points are available to be selected in one of steps (f) and (m);
  (ii) said plan cost is less than a tolerance indicative of an acceptable difference between said upper bound and said lower bound, a plan having said plan cost defining a feasible plan; and
  (iii) a predetermined time limit has expired and no feasible plans have been identified the step further comprising identifying said current plan as an optimal plan when one of said events has occurred; and (w) controlling the movement of said vehicles so that the arrival and departure times for each vehicle at each point along the vehicle's respective travel path between said origin and said destination is controlled according to said optimal plan.

10. The method of claim 9, wherein step (c) further comprises the steps of:
   (i) ordering said vehicles chronologically;
   (ii) incrementing said level to a next level and defining said next level as said current level;
   (iii) selecting each vehicle pair based upon said order determined in step (i).

11. The method of claim 9, wherein said selection in step (f) is based upon one of the following:
   (a) which of said conflict resolution points results in less delay cost where said delay will result in additional cost, and
   (b) which of said conflict resolution points will result in less vehicle delay where said delay will not produce additional delay cost.

12. The method of claim 9, wherein said selection in step (m) further comprises the following step:
   (i) selecting at least one conflict resolution point identified in step (e) at said current level by determining which conflict resolution point is both physically located closest to said conflict resolution point selected in step (f) and closest to said location of potential conflict, said conflict resolution point defining a meet-shift resolution point.

13. The method of claim 12, wherein step (O) further comprises the following steps:
   (i) calculating at least one delay time indicative of a time at least one vehicle is required to wait at said meet-shift resolution point for said other vehicle of said vehicle pair to pass without collision therebetween, thereby reducing said delay time calculated in step (g);
   (ii) identifying substantially all delay reductions arising from delaying at least one vehicle at said meet-shift resolution point and thereby reducing said plan cost calculated in step (k);
   (iii) summing substantially all potential cost reductions of said current plan which are both later in time than said meet-shift resolution point and physically located in the direction of movement of said delayed vehicle, said summed cost reductions defining a meet-shift maximum cost decrease;
   (iv) calculating said delay cost of said delayed vehicle at said meet-shift resolution point and redefining said delay cost as a meet-shift minimum additional cost;
   (v) subtracting said meet-shift minimum additional cost from said meet-shift maximum cost decrease resulting in a difference, said difference being the first maximum net benefit.

14. The method of claim 12, wherein step (r) further comprises:
   (vi) subtracting said second maximum net benefit from said plan lower bound resulting in a difference, said difference redefining said lower bound if said general-meet-shift minimum additional cost is positive.

15. The method of claim 9, wherein step (p) further comprises the following steps:
   (i) determining a reduced delay time compared to said delay time calculated in step (g) which would result if said vehicles delayed at said meet-shift resolution point incurred no previous delay;
   (ii) identifying substantially all further cost reductions of said current plan arising from said reduced delay determined in step (i) of this claim 15;
   (iii) summing substantially all the additional cost reductions of said current plan arising from delays at conflict resolution points which are both later in time than said meet-shift resolution point and physically located in the direction of movement of said delayed vehicle, said summed delay costs defining a general-meet-shift maximum cost decrease;
   (iv) calculating, based on the reduced delay time determined in step (i) of this claim 12, said resulting delay cost and identifying that amount as said general-meet-shift minimum additional cost;
   (v) subtracting said general-meet-shift minimum additional cost from the general-meet-shift maximum cost decrease resulting in a difference, said difference being said second maximum net benefit.

16. The method of claim 9, wherein said transportation schedules are train schedules and said vehicles are trains.

* * * * *